United States Patent
Meyer et al.

(10) Patent No.: US 9,481,411 B2
(45) Date of Patent: Nov. 1, 2016

(54) ROLLER FOR A MACHINE UNDERCARRIAGE

(71) Applicant: Caterpillar Inc., Peoria, IL (US)

(72) Inventors: Robert L. Meyer, Metamora, IL (US); Gregory J. Kaufmann, Metamora, IL (US); Mark S. Diekevers, Metamora (IL); Timothy A. Thorson, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 503 days.

(21) Appl. No.: 13/926,451

(22) Filed: Jun. 25, 2013

(65) Prior Publication Data

US 2014/0001826 A1 Jan. 2, 2014

Related U.S. Application Data

(60) Provisional application No. 61/666,550, filed on Jun. 29, 2012.

(51) Int. Cl.
*B62D 55/14* (2006.01)
*B62D 55/15* (2006.01)
*B62D 55/21* (2006.01)
*B62D 55/28* (2006.01)

(52) U.S. Cl.
CPC ............ *B62D 55/14* (2013.01); *B62D 55/15* (2013.01); *B62D 55/21* (2013.01); *B62D 55/28* (2013.01)

(58) Field of Classification Search
CPC .... B62D 55/10; B62D 55/14; B62D 55/145; B62D 55/15; B62D 55/20; B62D 55/21; B62D 55/28
See application file for complete search history.

(56) References Cited

U.S. PATENT DOCUMENTS

| | | | | |
|---|---|---|---|---|
| 1,495,708 A | * | 5/1924 | Matteson | 305/201 |
| 2,295,531 A | * | 9/1942 | Heaslet | 474/187 |
| 2,906,564 A | * | 9/1959 | Richardson | 384/563 |
| 3,603,650 A | * | 9/1971 | Miller | 305/137 |
| 3,913,986 A | * | 10/1975 | Schaffner | 305/195 |
| 4,229,053 A | * | 10/1980 | Cline | 305/109 |
| 4,890,892 A | | 1/1990 | Haslett | |
| 5,207,489 A | * | 5/1993 | Miller | 305/137 |
| 5,553,931 A | | 9/1996 | Diekevers | |
| 5,829,849 A | * | 11/1998 | Lawson | 305/193 |
| 6,074,023 A | * | 6/2000 | Satou et al. | 305/116 |
| 6,129,426 A | * | 10/2000 | Tucker | B62D 55/065 305/136 |
| 6,220,378 B1 | * | 4/2001 | Oertley et al. | 180/9.62 |
| 6,454,366 B1 | * | 9/2002 | Egle | 305/202 |

(Continued)

FOREIGN PATENT DOCUMENTS

| | | |
|---|---|---|
| CN | 1390739 | 1/2003 |
| EP | 2269898 | 1/2011 |

OTHER PUBLICATIONS

Photographs taken at Bauma trade show in China in Nov. 2011 (11 pages).

*Primary Examiner* — Katy M Ebner
(74) *Attorney, Agent, or Firm* — Finnegan, Henderson, Farabow, Garrett & Dunner, LLP

(57) ABSTRACT

A roller for a machine undercarriage may include a roller body constructed from a single, unitary piece of parent material. The roller may also include a first roller tread disposed between a first end of the roller body and a second end of the roller body. Additionally, the roller may include a second roller tread disposed between the first and second ends of the roller body.

18 Claims, 59 Drawing Sheets

(56) References Cited

U.S. PATENT DOCUMENTS

| | | | |
|---|---|---|---|
| 6,474,754 B1* | 11/2002 | Hasselbusch | 305/136 |
| 6,702,406 B2* | 3/2004 | Yoshida | B62D 55/14 |
| | | | 305/100 |
| 8,590,987 B2* | 11/2013 | Angot et al. | 305/199 |
| 2004/0084961 A1* | 5/2004 | Yamamoto et al. | 305/136 |
| 2005/0253453 A1* | 11/2005 | Miller | 305/136 |
| 2008/0265667 A1* | 10/2008 | Livesay | 305/202 |
| 2009/0102281 A1* | 4/2009 | Diekevers et al. | 305/104 |
| 2010/0096195 A1 | 4/2010 | Vanderveen | |
| 2010/0133898 A1* | 6/2010 | Johannsen et al. | 305/137 |
| 2012/0153714 A1* | 6/2012 | Yelistratov | 305/137 |
| 2012/0228926 A1* | 9/2012 | Bair | B62D 55/14 |
| | | | 305/136 |

* cited by examiner

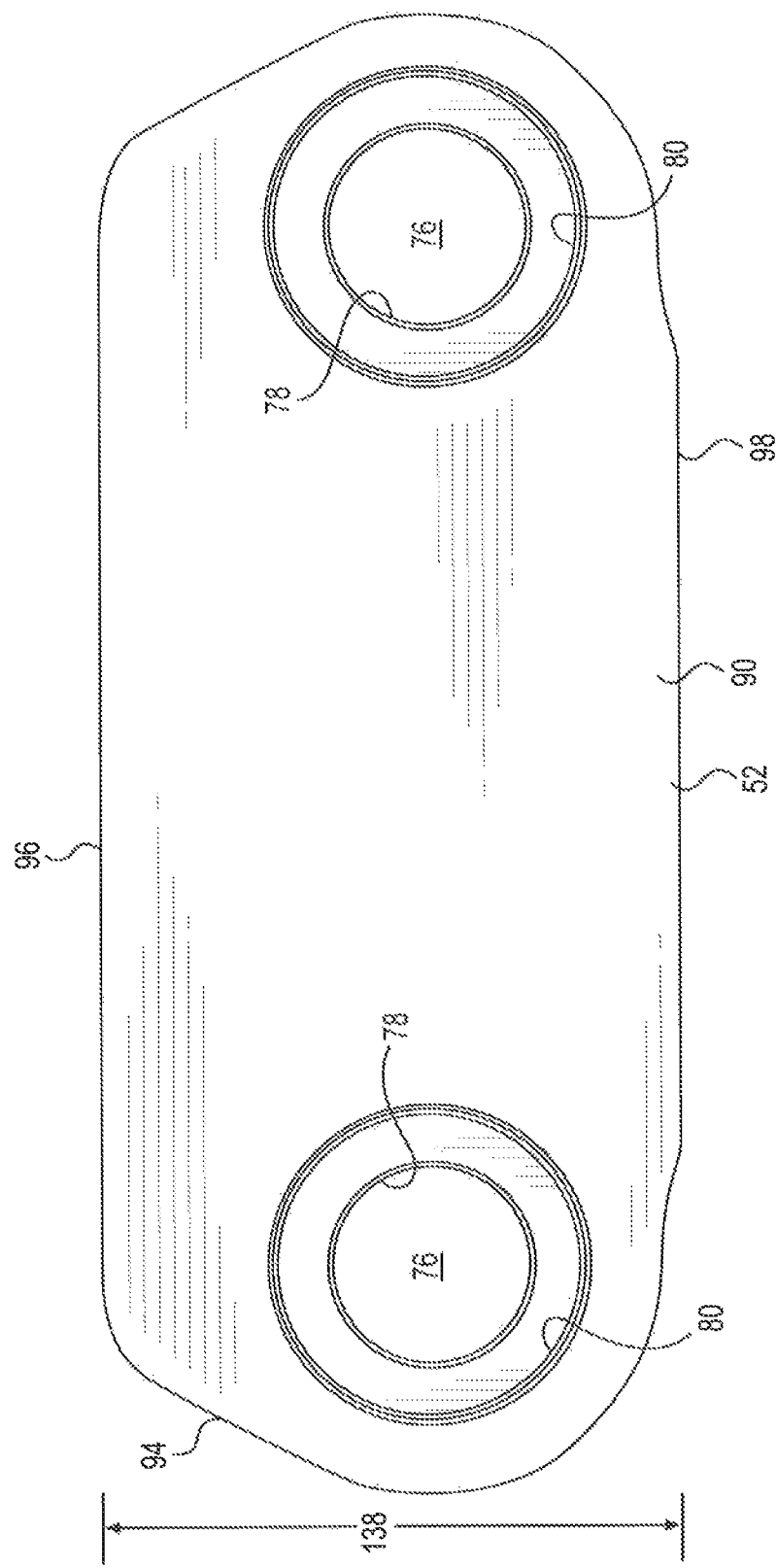

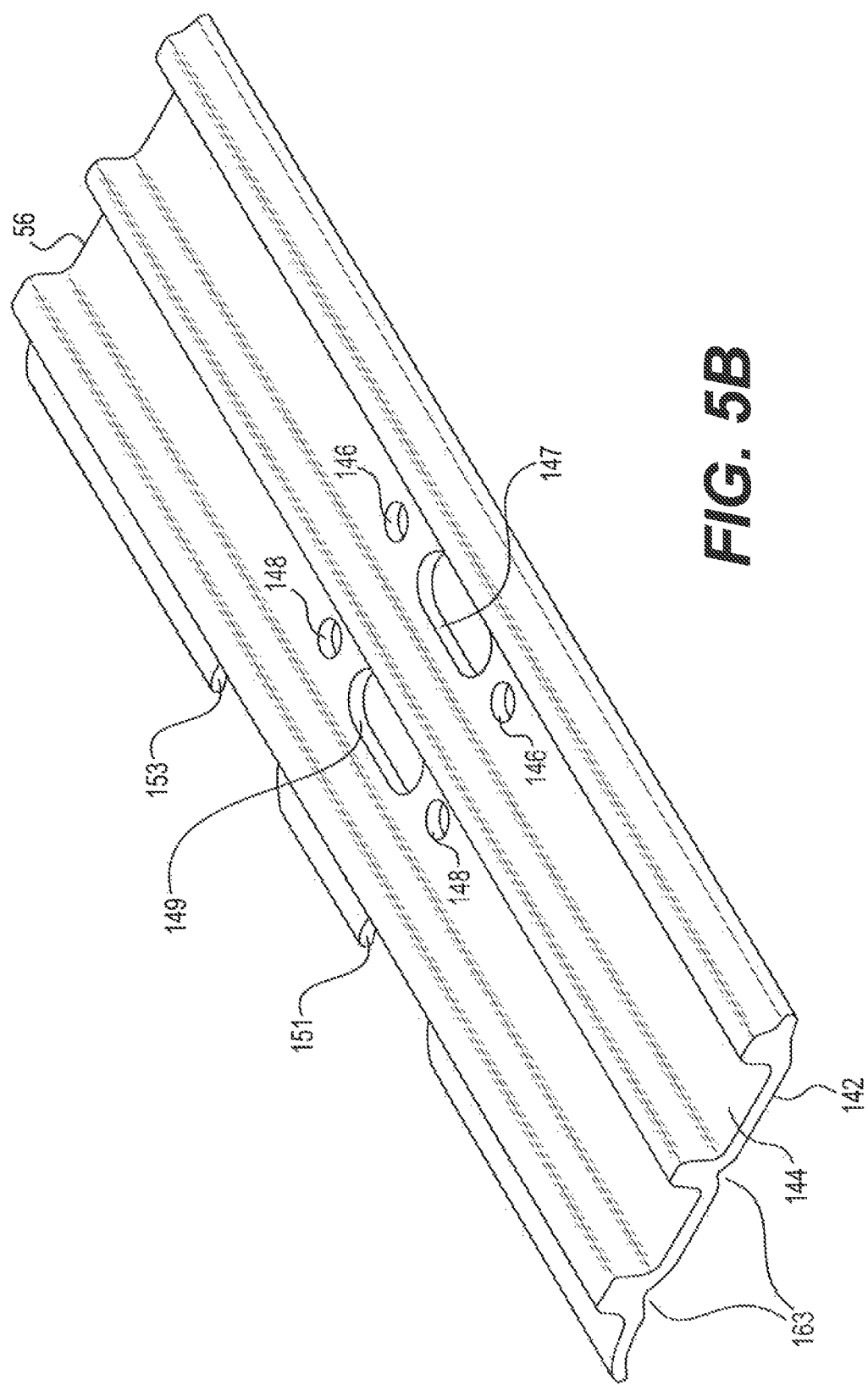

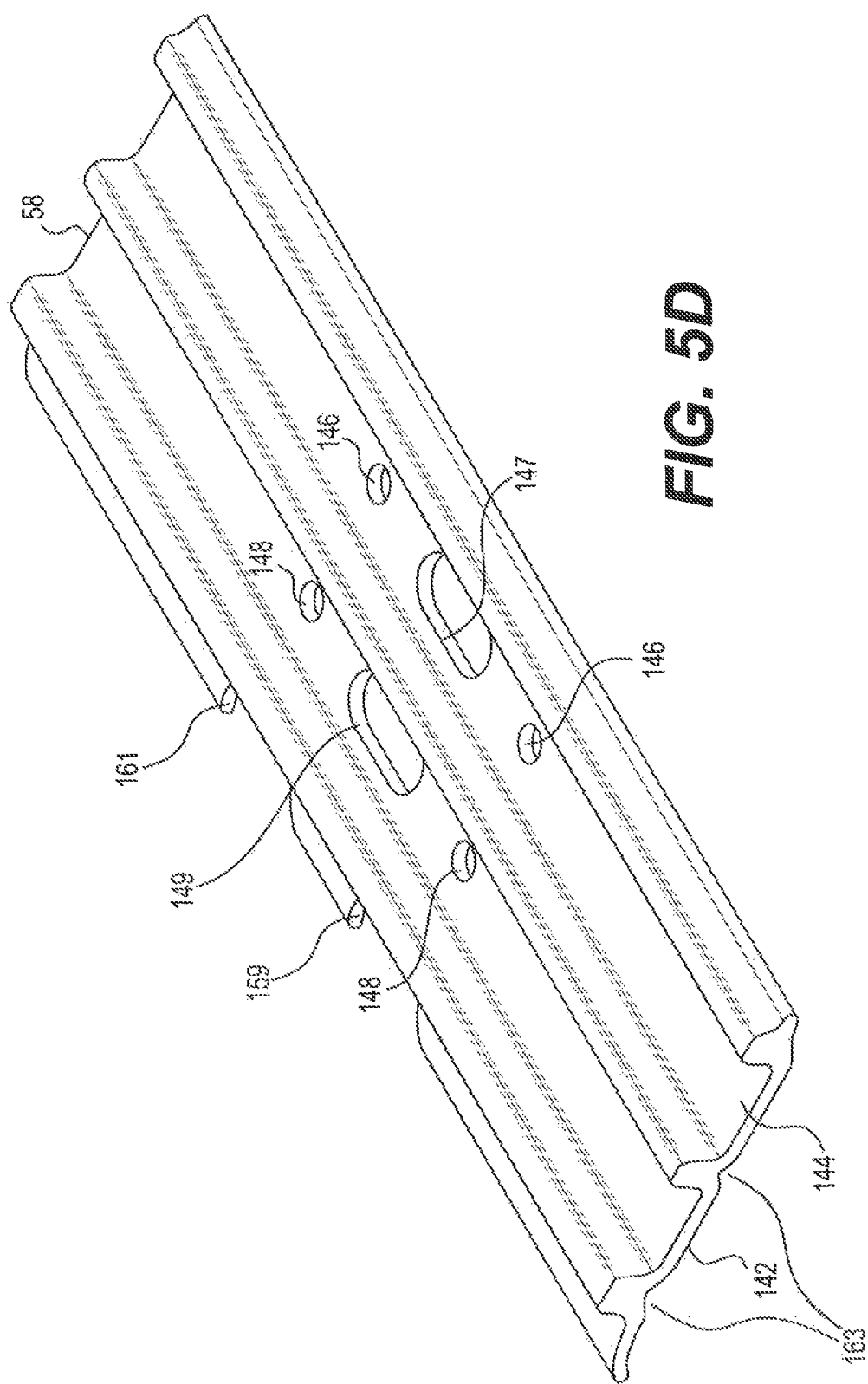

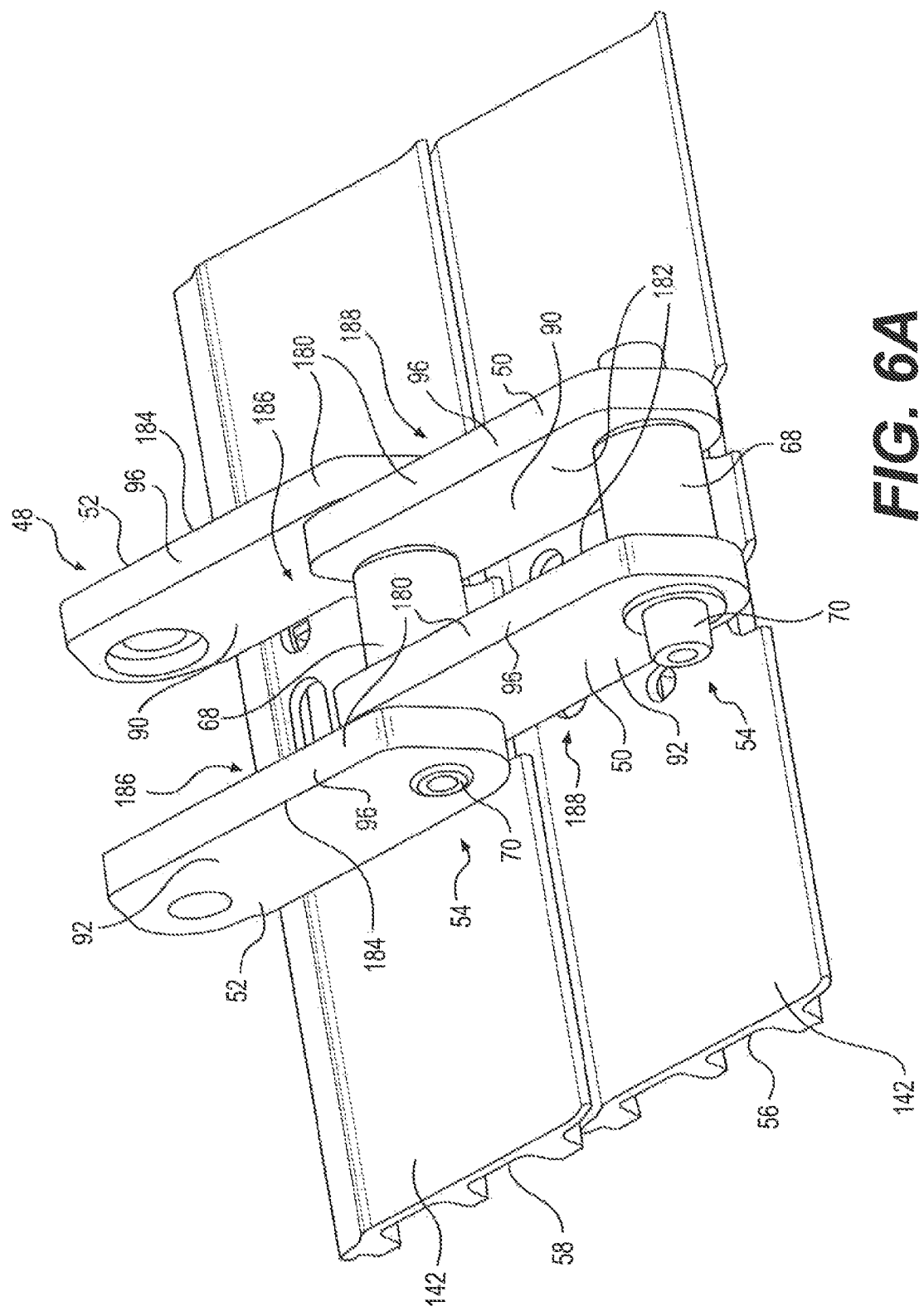

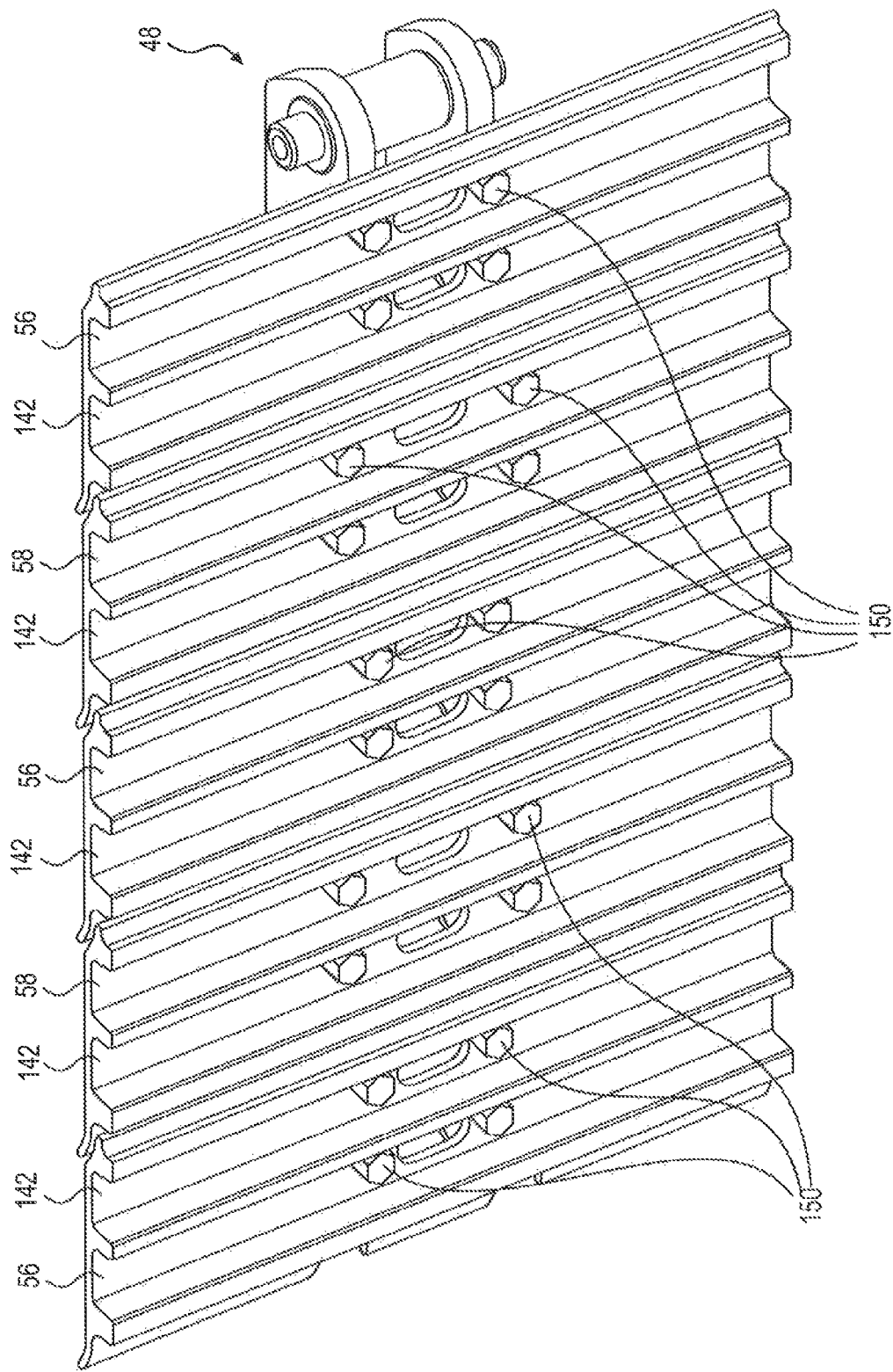

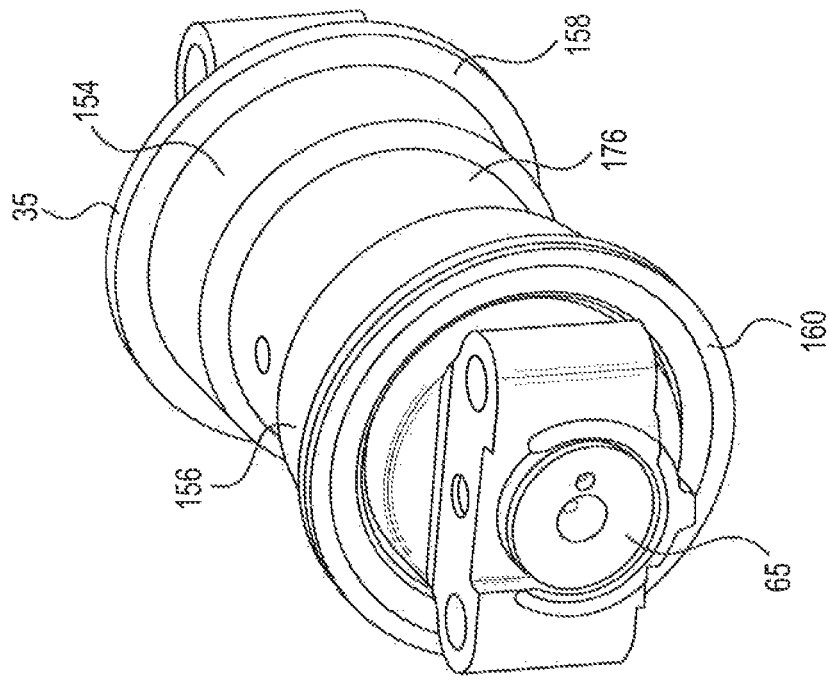
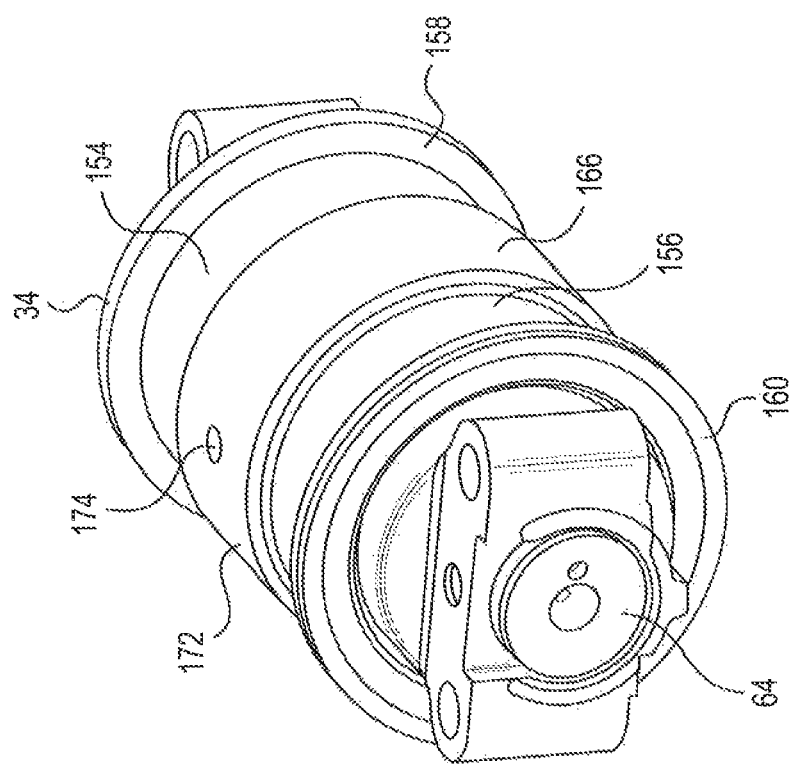

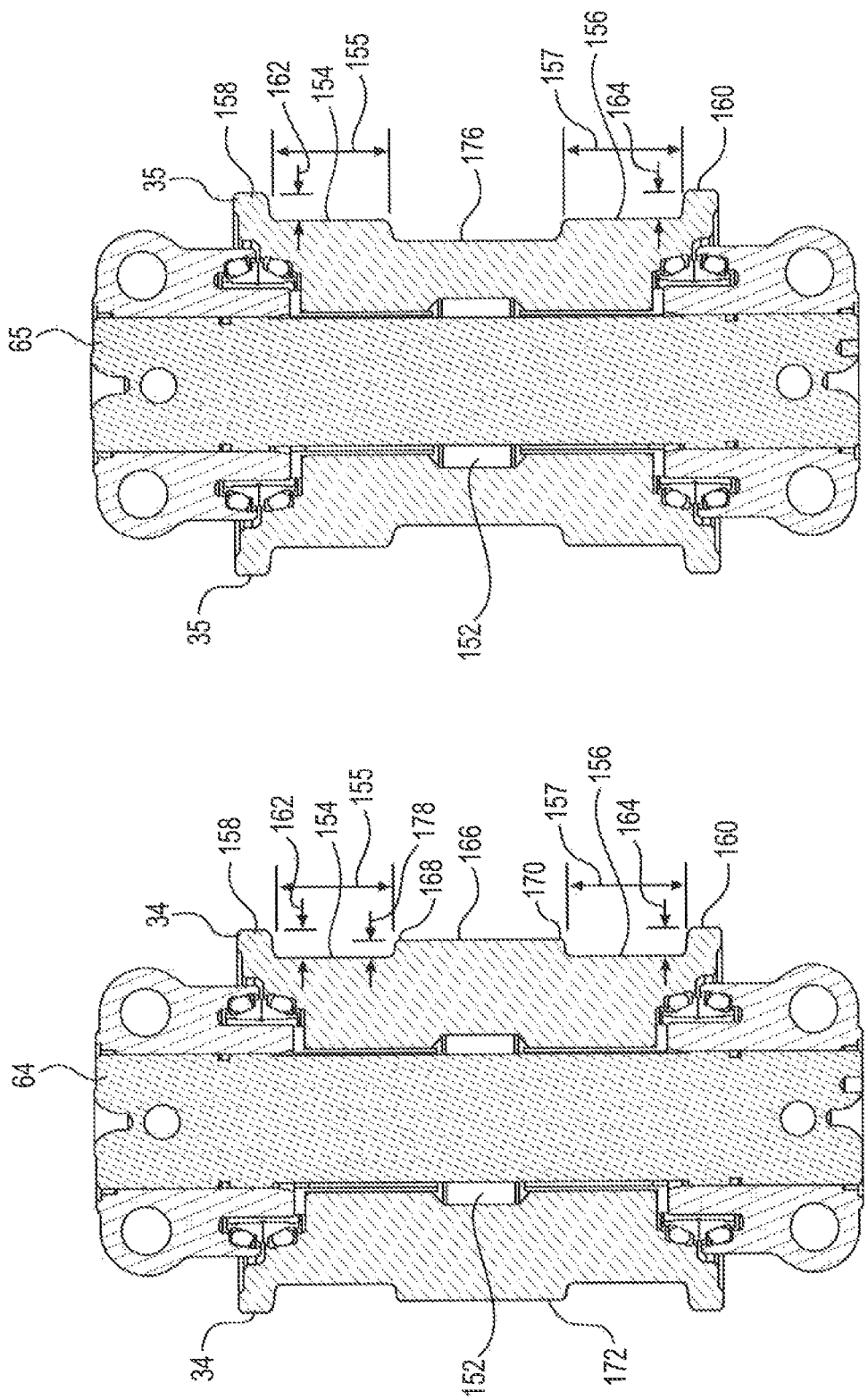

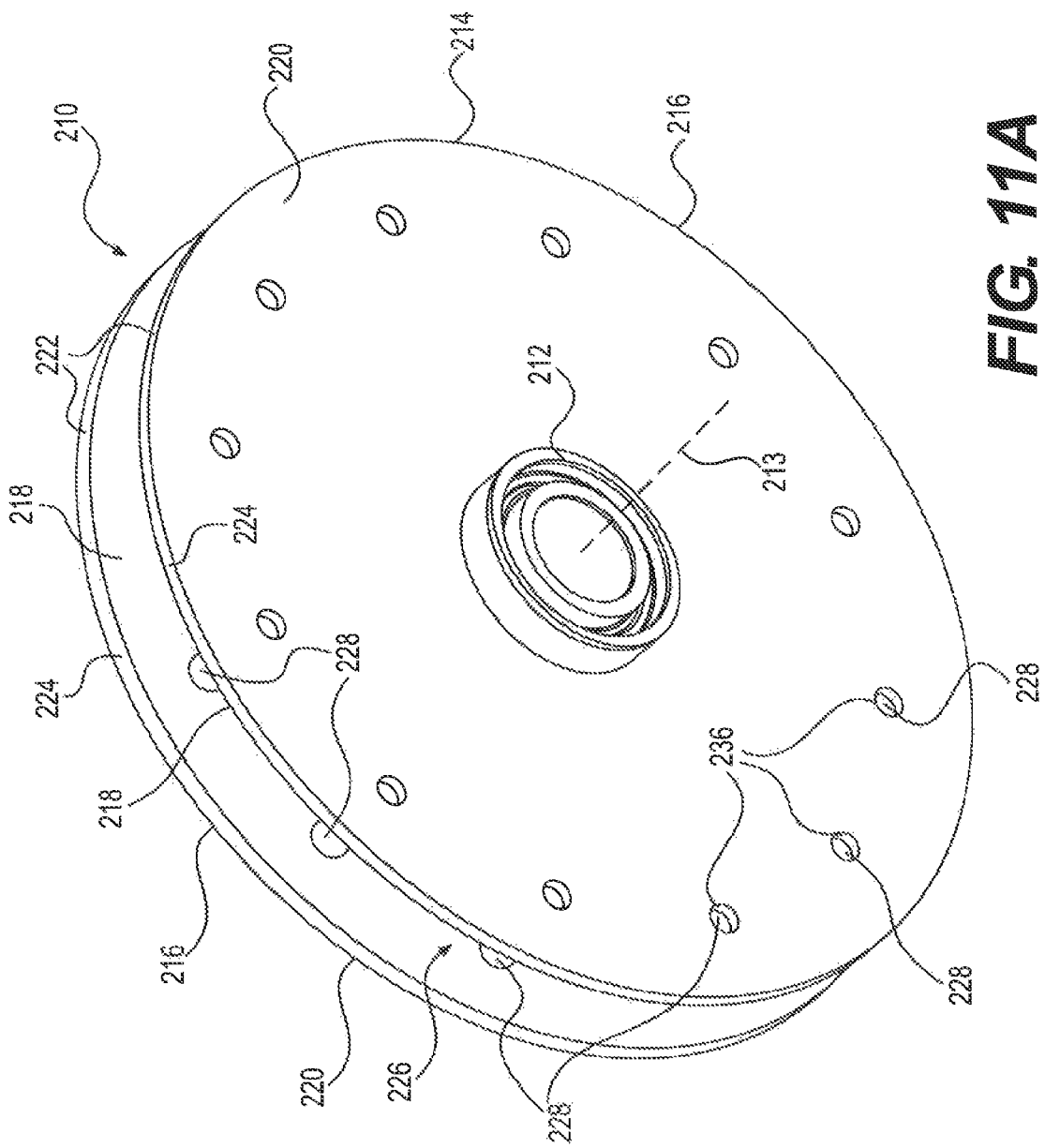

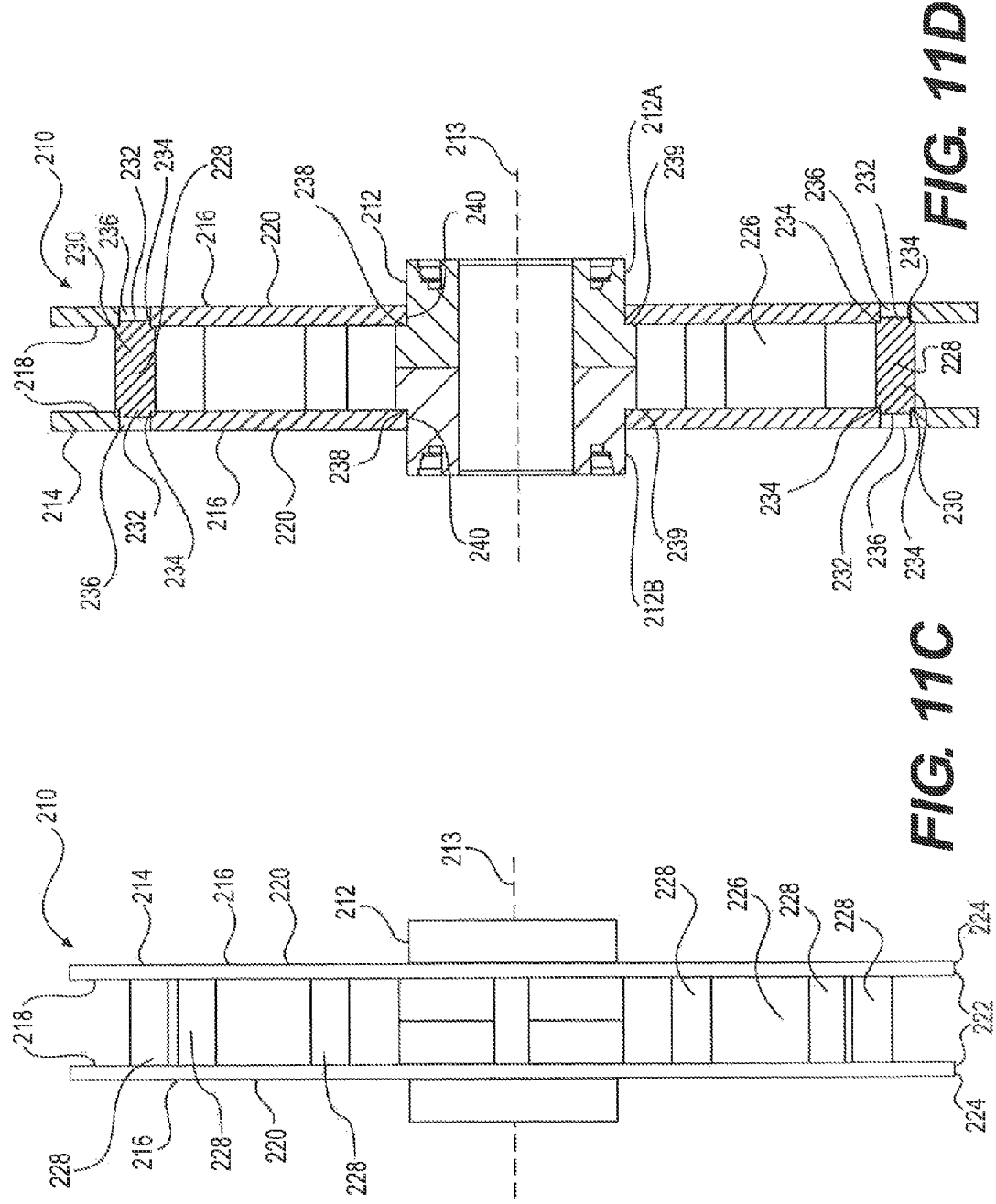

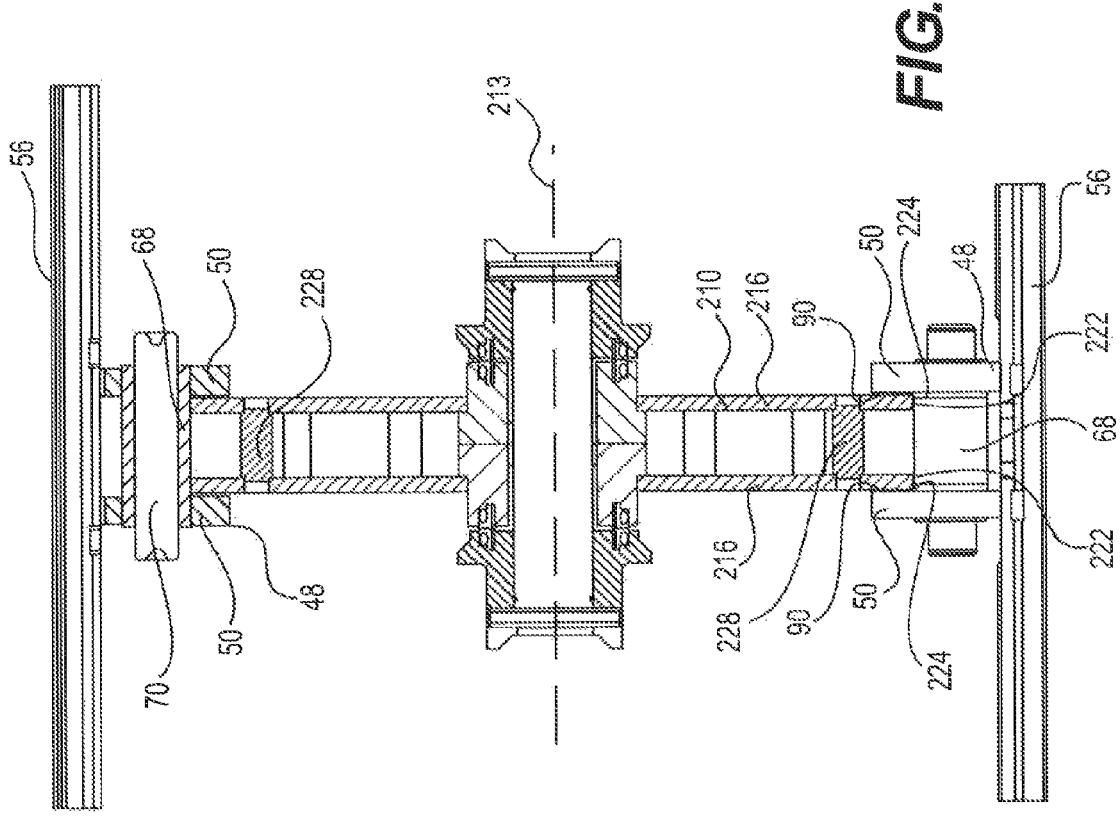

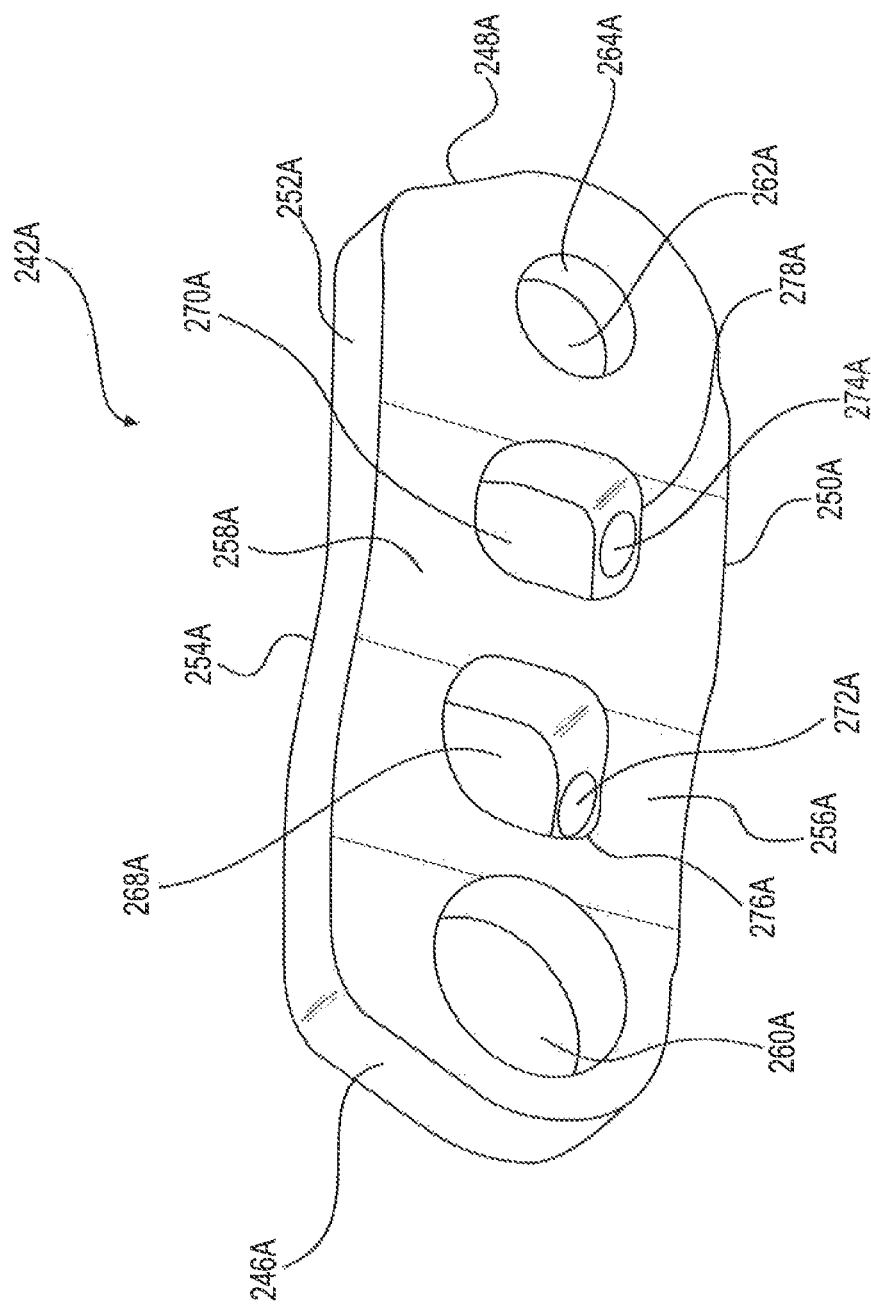

ROLLER FOR A MACHINE UNDERCARRIAGE

CROSS-REFERENCE TO RELATED APPLICATION

This application claims the benefit of U.S. Provisional Patent Application No. 61/666,550, filed Jun. 29, 2012, which is hereby incorporated by reference in its entirety.

TECHNICAL FIELD

The present disclosure relates to mobile machines and, more particularly, tracked undercarriages for mobile machines.

BACKGROUND

Many mobile machines have tracked undercarriages that move along the ground as the machine travels. For example, many earthmoving machines like tractors and excavators may have such undercarriages. In known undercarriage designs, many of the parts have complex geometric designs that drive considerable manufacturing costs. FIGS. 1A-1C provide examples of certain undercarriage components and their complex designs.

FIG. 1A shows a portion of a prior art link assembly 400, which serves as the flexible backbone of the endless track of an undercarriage. Link assembly 400 includes a plurality of links 401 assembled into laterally spaced pairs connected to one another at pivot joints 403. Each link 401 includes sides 402. Additionally, each of links 401 includes a roller rail 405 on which rollers (not shown) of the undercarriage ride during operation. Collectively, the roller rails 405 of links 401 form two roller rails 407 of the link assembly 400.

As FIG. 1A shows, links 401 have complex shapes. The sides 402 of links 401 have complex contours with curves, recesses, and projections. Additionally, the roller rail 405 of each link has a wide portion in the middle and laterally offset narrower portions on its ends. At each pivot joint 403, laterally offset narrow portions of the roller rails 405 of two connected links 401 sit beside one another and collectively provide a bearing surface of substantially the same width as that provided by the center portion of the roller rail 405 of each link 401. This gives each overall roller rail 407 of the link assembly 400 a substantially constant width. This also ensures that each of roller rails 407 presents a substantially continuous straight outer guide surface 412 with which outer guide flanges of the rollers can remain substantially continuously engaged.

Opposite roller rails 405, links 401 include provisions for attaching track shoes (not shown) to the links. Each link includes windows 406 in its sides 402. Below each window 406, each link 401 includes a hole 409 for receiving a bolt, as well as a nut seat 408 for receiving a nut to secure the bolt. To secure a track shoe to each link 401, the track shoe may be placed against the side of the link below the holes 409, bolts may be inserted through holes in the track shoe and the holes 409, and a nut may be secured on the bolt against nut seat 408.

FIGS. 1B and 1C show a prior art idler 414 for an undercarriage. Similar to links 401, idler 414 has a complex design. FIG. 1B provides a perspective view of the idler 414, and FIG. 1C provides a cross-section through a rotational axis of the idler 414. Idler 414 includes a hub 416 and a body 418. Hub 416 is constructed of two pieces welded together in the middle. Body 418 is hollow with a cavity 420 inside it. Body 418 includes side plates 422 and a rim 424. Side plates 422 are frustoconical discs that are welded to hub 416. Side plates 422 extend away from one another as they extend radially outward from hub 416. Rim 424 may be a ring that extends around radially outer portions of webs 422. Rim 424 may be welded to the radially outer portions of webs 422. Rim 424 may include a center flange 426 flanked by a pair of tread shoulders 428. Tread shoulders 428 may be disposed radially inward of the outer surface of center flange 426. In operation, center flange 426 may sit between links 401, and tread shoulders 428 may ride on the roller rails 407 of link assembly 400.

Geometrically complex designs like those shown in FIGS. 1A-1C may provide certain benefits that are particularly important for some applications. However, these complicated designs also have certain drawbacks. For example, manufacturing components like those shown in FIGS. 1A-1C may prove undesirably expensive. Manufacturing links 401 with their offset roller rails 405 and other complex geometric features may involve expensive processes, such as forging or casting. Manufacturing the complex shapes of the webs 422 and rim 424 of idler 414 also involve expensive processes like forging or other forming processes. All of these expensive manufacturing processes may undesirably increase the cost of the undercarriage. The disclosed embodiments may help solve these issues.

SUMMARY

One disclosed embodiment relates to a roller for a machine undercarriage. The roller may include a roller body constructed from a single, unitary piece of parent material. The roller body may include a first roller tread disposed between a first end of the roller body and a second end of the roller body. Additionally, the roller body may include a second roller tread disposed between the first and second ends of the roller body.

Another disclosed embodiment relates to a roller for a machine undercarriage. The roller may include a first outer guide flange and a second outer guide flange. The roller may also include a first roller tread disposed between the first outer guide flange and the second outer guide flange. Additionally, the roller may include a second roller tread disposed between the first outer guide flange and the second outer guide flange. The roller may also include a single center guide flange disposed between the first roller tread and the second roller tread.

A further disclosed embodiment relates to a roller for a machine undercarriage. The roller may include a roller body constructed from a single, unitary piece of parent material. The roller body may include a first outer guide flange, a second outer guide flange, a first roller tread disposed between the first outer guide flange and the second outer guide flange, a second roller tread disposed between the first outer guide flange and the second outer guide flange, and a single center guide flange disposed between the first roller tread and the second roller tread. The single center guide flange may have a height of at least about 10% of a width of the first roller tread.

BRIEF DESCRIPTION OF THE DRAWING

FIG. 4N is a side view of the track link of FIG. 4K from the side shown in FIG. 4L;

FIG. 5B is a perspective view of the track shoe of FIG. 5A from another side;

FIG. 5D is a perspective view of the track shoe of FIG. 5C from another side;

FIG. 6A is a perspective view from one side of a portion of a track link assembly according to the present disclosure with track shoes attached;

FIG. 6B is a perspective view from another side of a portion of a track link assembly according to the present disclosure with track shoes attached;

FIG. 7A is a perspective view of one track roller according to the present disclosure;

FIG. 7B is a perspective view of another track roller according to the present disclosure;

FIG. 7C is a cross-section of the track roller of FIG. 7A through its rotational axis;

FIG. 7D is a cross-section of the track roller of FIG. 7B through its rotational axis;

FIG. 11A is a perspective view of another embodiment of an idler according to the present disclosure;

FIG. 11C is an end view of the idler of FIG. 11A;

FIG. 11D is a cross-sectional view of the idler of FIG. 11A through its rotational axis;

FIG. 11E is a cross-sectional view of the idler of FIG. 11A engaging a track link assembly and shoes according to the present disclosure;

FIG. 12B is a perspective view of one track link of the embodiment of FIG. 12A from one side;

DETAILED DESCRIPTION

Figure 2:
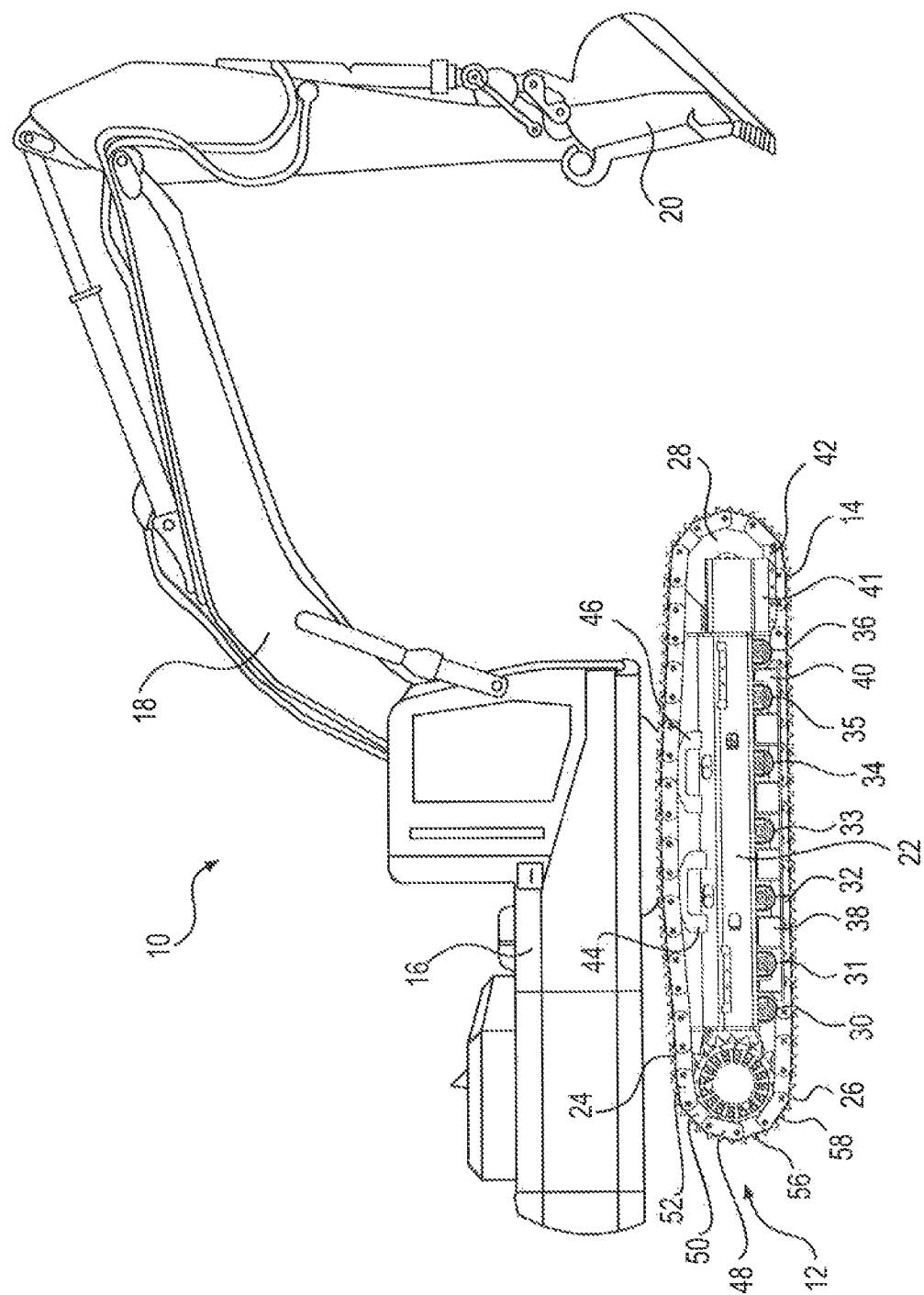
FIG. 2 is a side view of a machine with an undercarriage according to the present disclosure.

FIG. 2 illustrates a machine 10 with a chassis 12 having an undercarriage system 14 according to the present disclosure. Machine 10 may be any type of machine that includes a tracked undercarriage system 14. In the example shown in FIG. 2, machine 10 is an excavator having a superstructure 16 pivotally supported from chassis 12. In this embodiment, machine 10 may include an implement 18, which may have an excavating bucket 20 attached to it for digging. Machine 10 may alternatively be another type of machine, including, but not limited to, a track-type tractor.

Figure 3A:
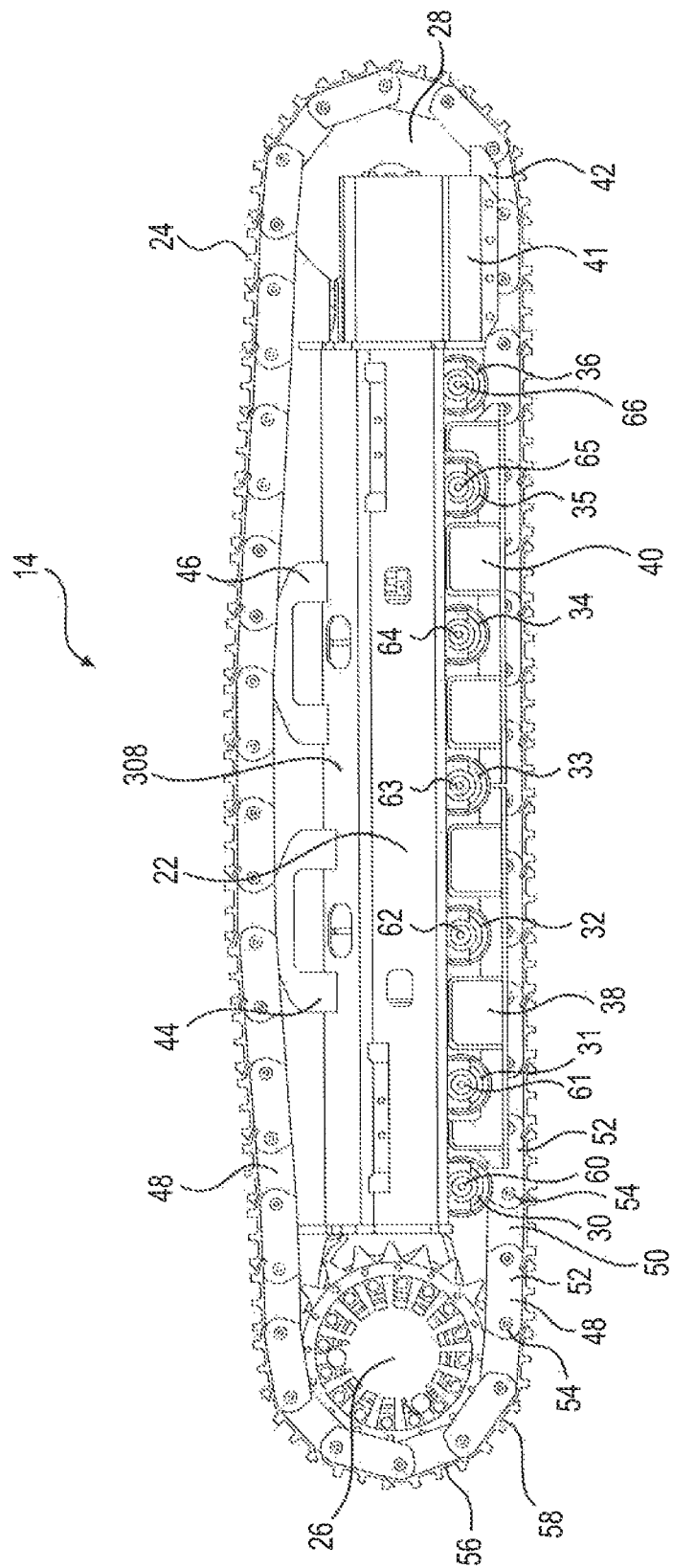
FIG. 3A is a side view of an undercarriage system according to the present disclosure.
Figure 3B:
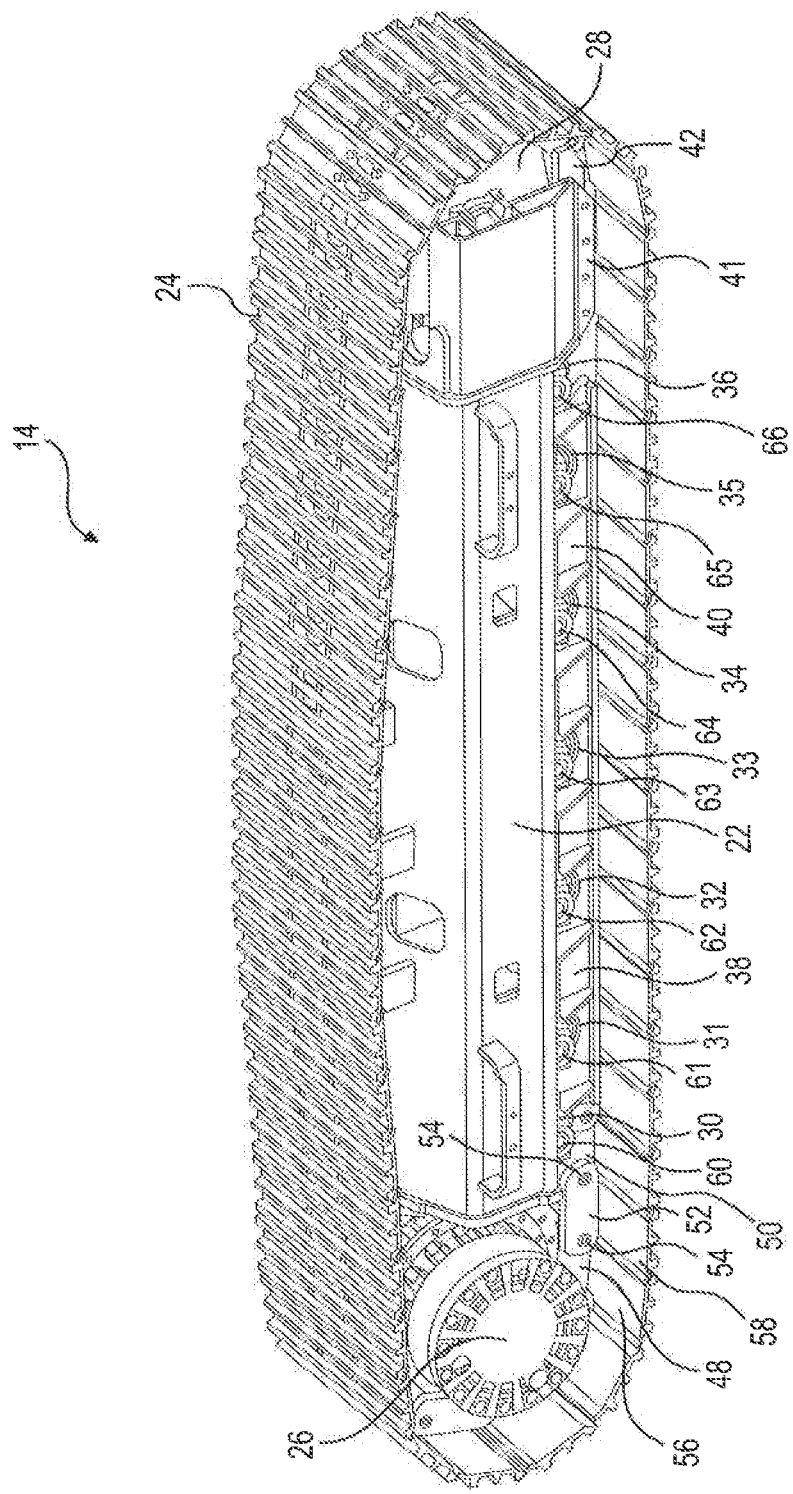
FIG. 3B is a perspective view of the undercarriage system shown in FIG. 3A.

Undercarriage 14 may be configured to support machine 10 from and move along the ground, roads, and/or other types of terrain. As best shown in FIGS. 3A and 3B, undercarriage 14 may include a track roller frame 22, various guiding components connected to track roller frame 22, and an endless track 24 engaging the guiding components. In the embodiment shown in FIGS. 3A and 3B, the guiding components of the undercarriage 14 include a drive sprocket 26, an idler 28, a roller 30, a roller 31, a roller 32, a roller 33, a roller 34, a roller 35, a roller 36, track guiding 38, track guiding 40, track guiding 41, track guiding 42, a carrier 44, and a carrier 46.

Track 24 may include a link assembly 48 that forms a flexible backbone of track 24, as well as a plurality of shoes 56, 58 secured to link assembly 48. Link assembly 48 may include a plurality of links 50, 52 connected to one another at pivot joints 54. In FIGS. 3A and 3B, only half of the links 50, 52 of link assembly 48 can be seen. For each link 50 visible in these figures, link assembly 48 includes a corresponding laterally spaced link 50. Similarly, for each link 52 visible in these figures, link assembly 48 includes a corresponding laterally spaced link 52. This pairing of links 50 and links 52 will be explained in greater detail below. Link assembly 48 may extend in an endless chain around drive sprocket 26, rollers 30-36, idler 28, and carriers 44, 46. Shoes 56, 58 may be secured to the perimeter of link assembly 48. For example, track 24 may include one shoe 56 attached to the outside edges of each laterally spaced pair of links 50, and one shoe 58 attached to the outside edges of each laterally spaced pair of links 52.

Rollers 30-36 and track guiding 38, 40 may guide the lower portion of track 24. Rollers 30-36 may each be suspended beneath track roller frame 22. For example, each roller 30-36 may be rotationally supported on an axle 60-66 suspended from track roller frame 22. The undersides of rollers 30-36 may ride on and guide the links 50, 52 in the lower portion of the endless chain formed by link assembly 48. Track guiding 38, 40 may also be suspended from track roller frame 22. Track guiding 38, 40 may extend adjacent sides of links 50, 52 in the lower portion of the endless chain formed by link assembly 48, thereby further guiding this portion of link assembly 48.

Carriers 44, 46 may guide the upper portion of track 24. To do so, carriers 44, 46 may extend upward from track roller frame 22 and engage a portion of link assembly 48 in an upper portion of its endless chain. Carriers 44, 46 may have various configurations. As shown in FIG. 3A, in some embodiments, carriers 44, 46 may be skids on which link assembly 48 rides. As discussed in more detail below, in some embodiments carriers 44, 46 may engage bushings 68 of link assembly 48 in a manner such that carriers 44, 46 help guide link assembly 48. In addition to or instead of skids, carriers 44, 46 may include rollers on which link assembly 48 rides.

Drive sprocket 26 and idler 28 may guide the end portions of track 24. Drive sprocket 26 and idler 28 may be suspended from opposite ends of track roller frame 22. The ends of the endless chain formed by link assembly 48 may wrap around drive sprocket 26 and idler 28. One or more portions of drive sprocket 26 may project into spaces between laterally spaced pairs of links 50 and laterally spaced pairs of links 52. As described in more detail below, one or more portions of idler 28 may also project into spaces between laterally spaced pairs of links 50 and laterally spaced pairs of links 52. Drive sprocket 26 and idler 28 may rotate about lateral axes to guide the ends of link assembly 48 through approximately semicircular paths between the lower and upper portions of the endless chain formed by the link assembly 48. Additionally, because they extend into spaces between laterally spaced pairs of links 50, 52, sprocket 26 and idler 28 may guide link assembly 48 in lateral directions. Sprocket 26 may be rotated by an external power source (not shown) to move one end of link assembly 48 between the top and bottom stretches. Driven by sprocket 26, link assembly 48 may, in turn, rotate idler 28 and rollers 30-36 around their rotation axes. As shown in FIGS. 3A and 3B, drive sprocket 26 may be located adjacent the ground at a height approximately the same as idler 28. Alternatively, in some embodiments, drive sprocket 26 may be elevated significantly above the ground at a height significantly higher than idler 28. For example, drive sprocket 26 may be positioned above track roller frame 22.

Track guiding 41 and track guiding 42 may help guide the end of track 24 adjacent idler 28. If track 24 should separate from rollers 30-36, track guiding 41, 42 may help guide track 24 back into proper engagement with rollers 30-36. Track guiding 41 may extend down beside link assembly 48 adjacent idler 28. Track guiding 42 may extend from track roller frame 22 adjacent a side of links 50, 52 as they extend around idler 28. Thus, track guiding 41, 42 may help keep link assembly 48 properly aligned laterally as it extends around idler 28.

Figure 4A:
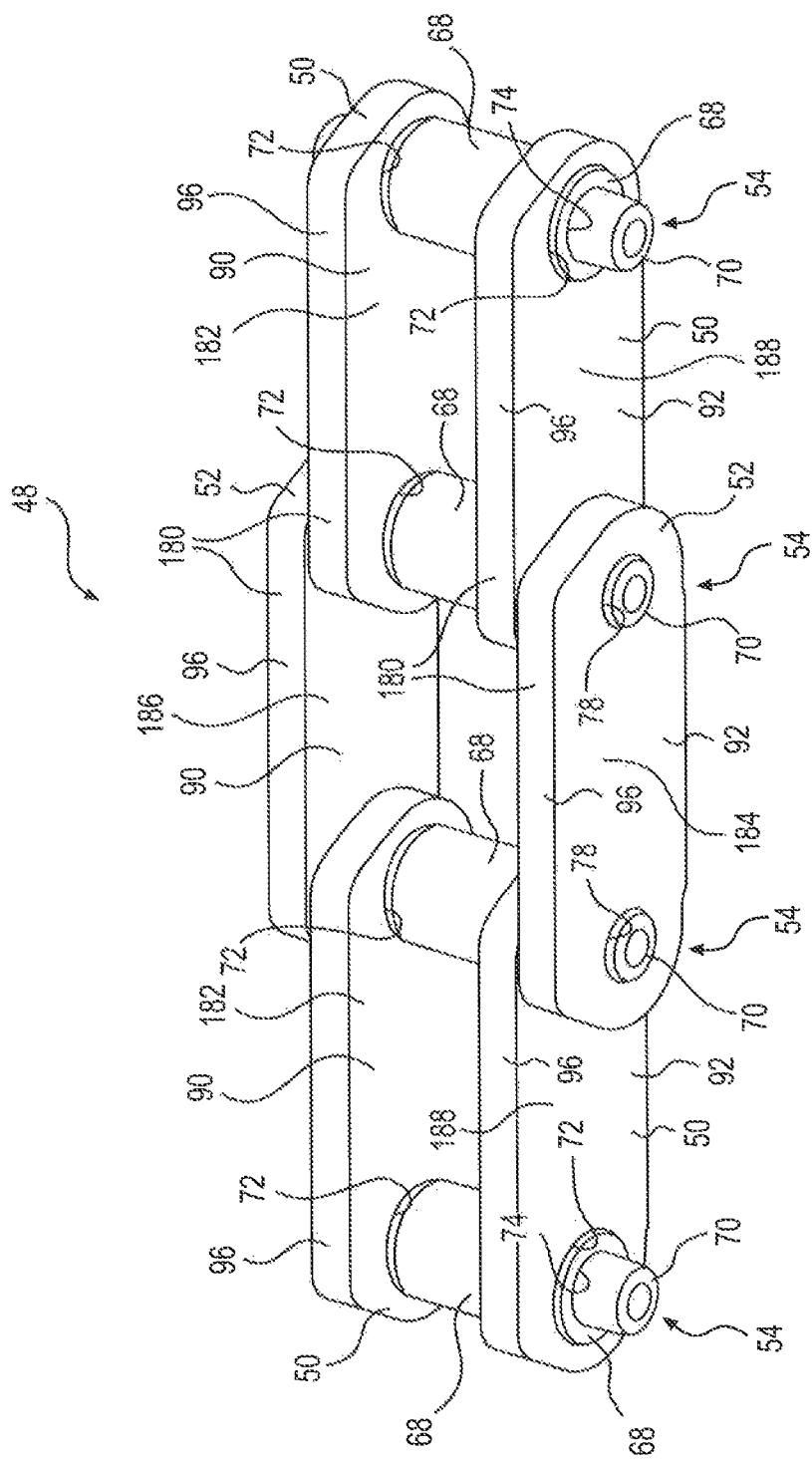
FIG. 4A is a perspective view of a portion of a track link assembly according to the present disclosure.
Figure 4B:
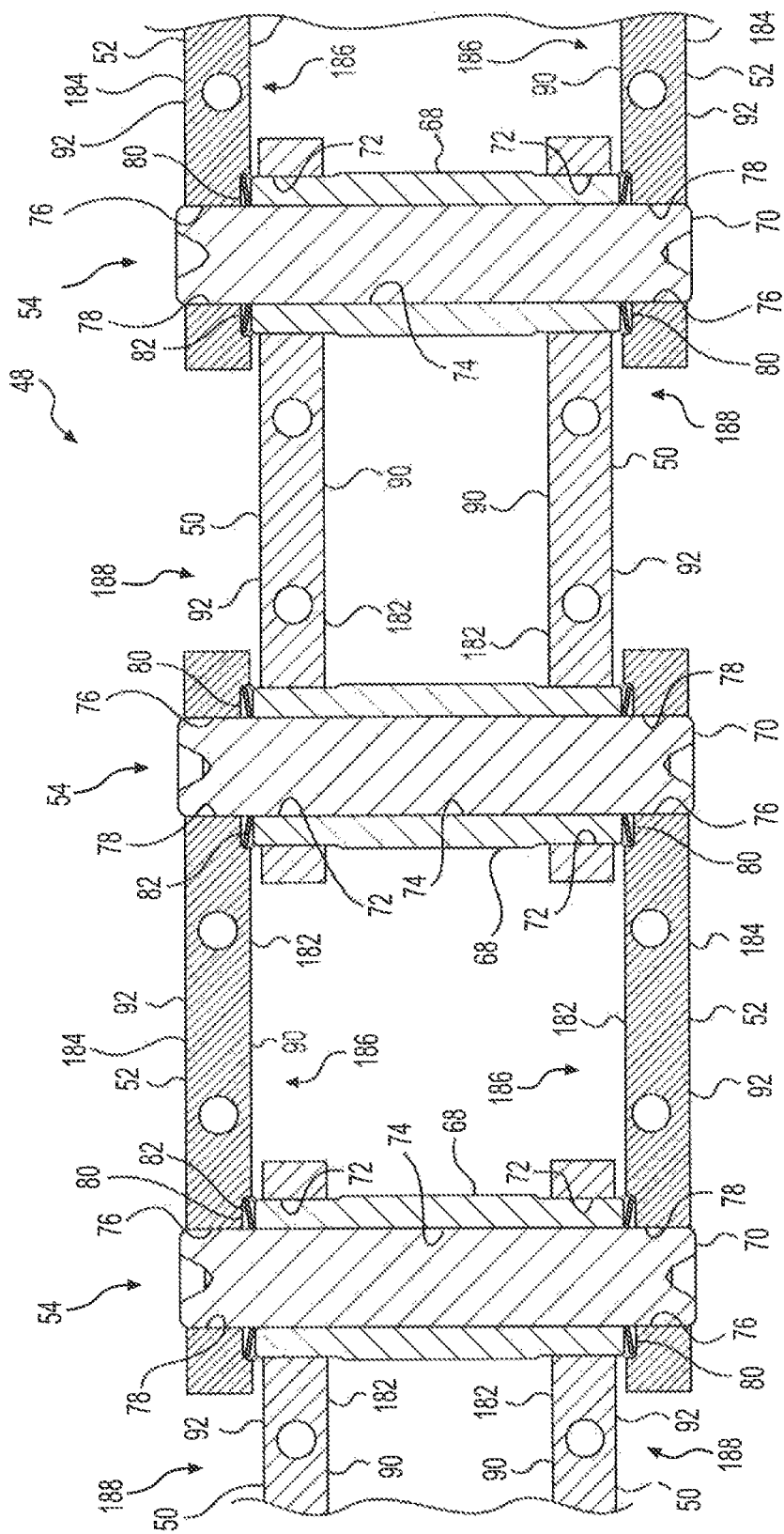
FIG. 4B is a lateral cross-section of the track link assembly shown in FIG. 4A.
Figure 4C:
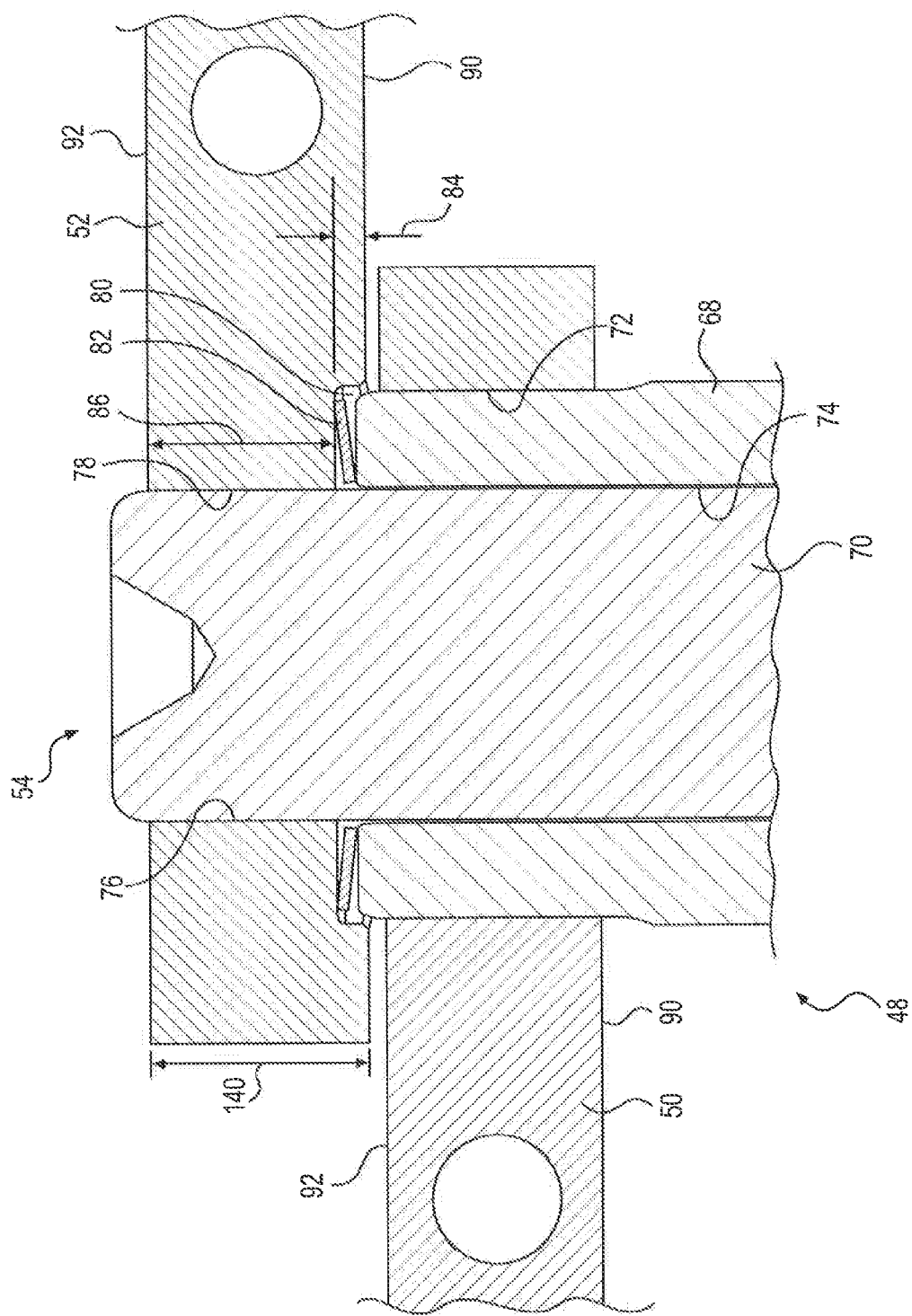
FIG. 4C is an enlarged view of a portion of FIG. 4B.
Figure 4D:
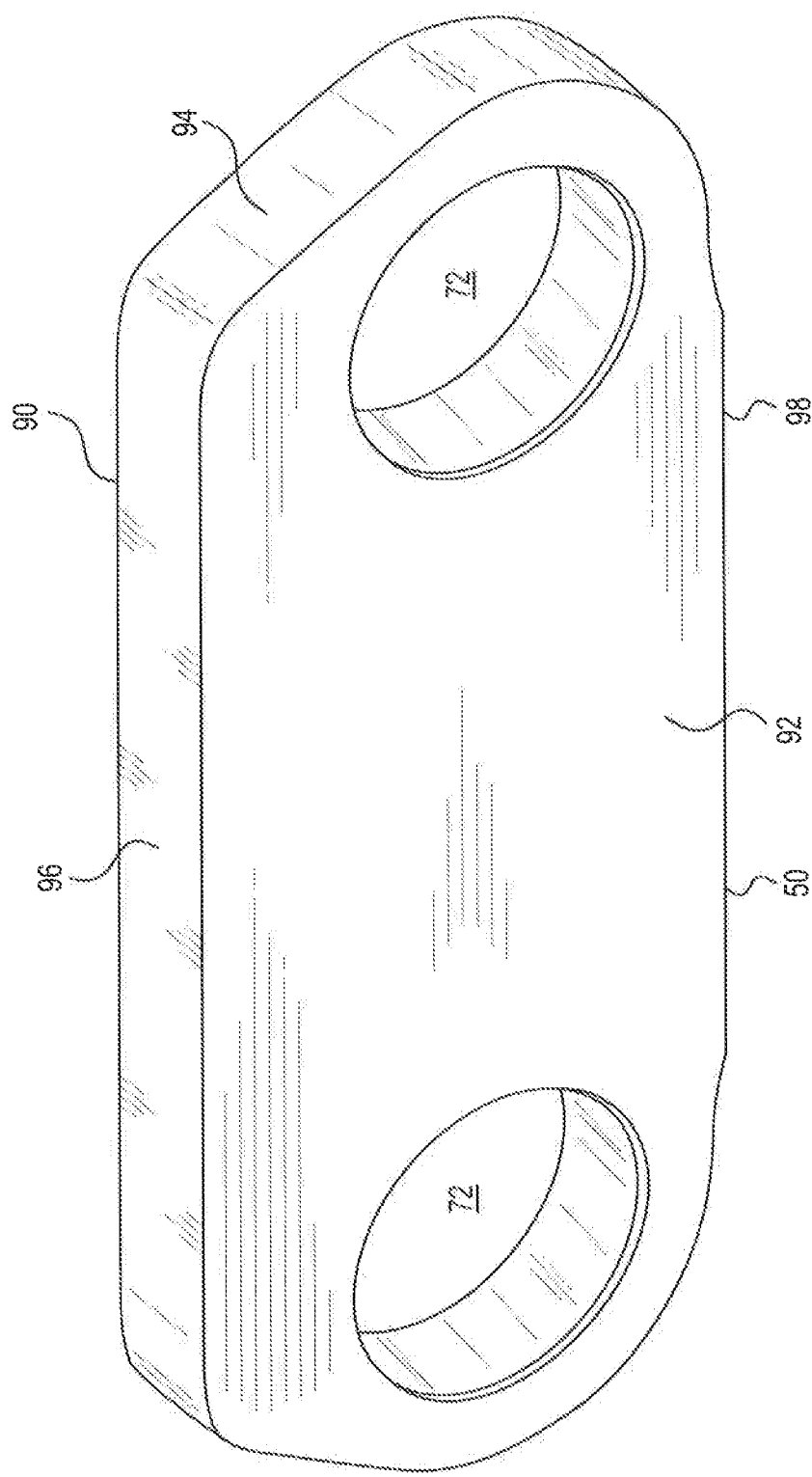
FIG. 4D is a perspective view of one track link according to the present disclosure from one side.
Figure 4E:
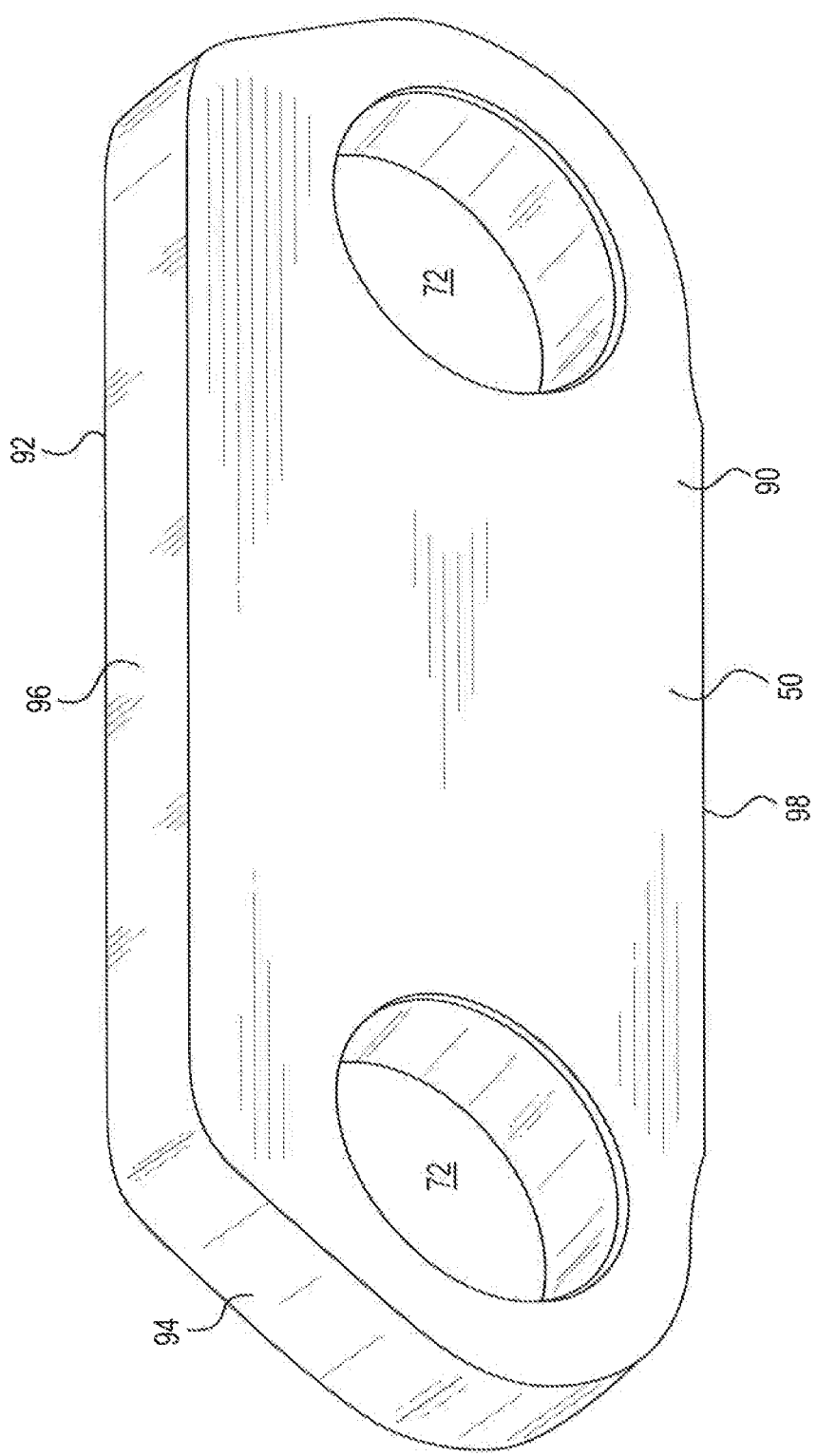
FIG. 4E is a perspective view of the track link of FIG. 4D from another side.
Figure 4F:
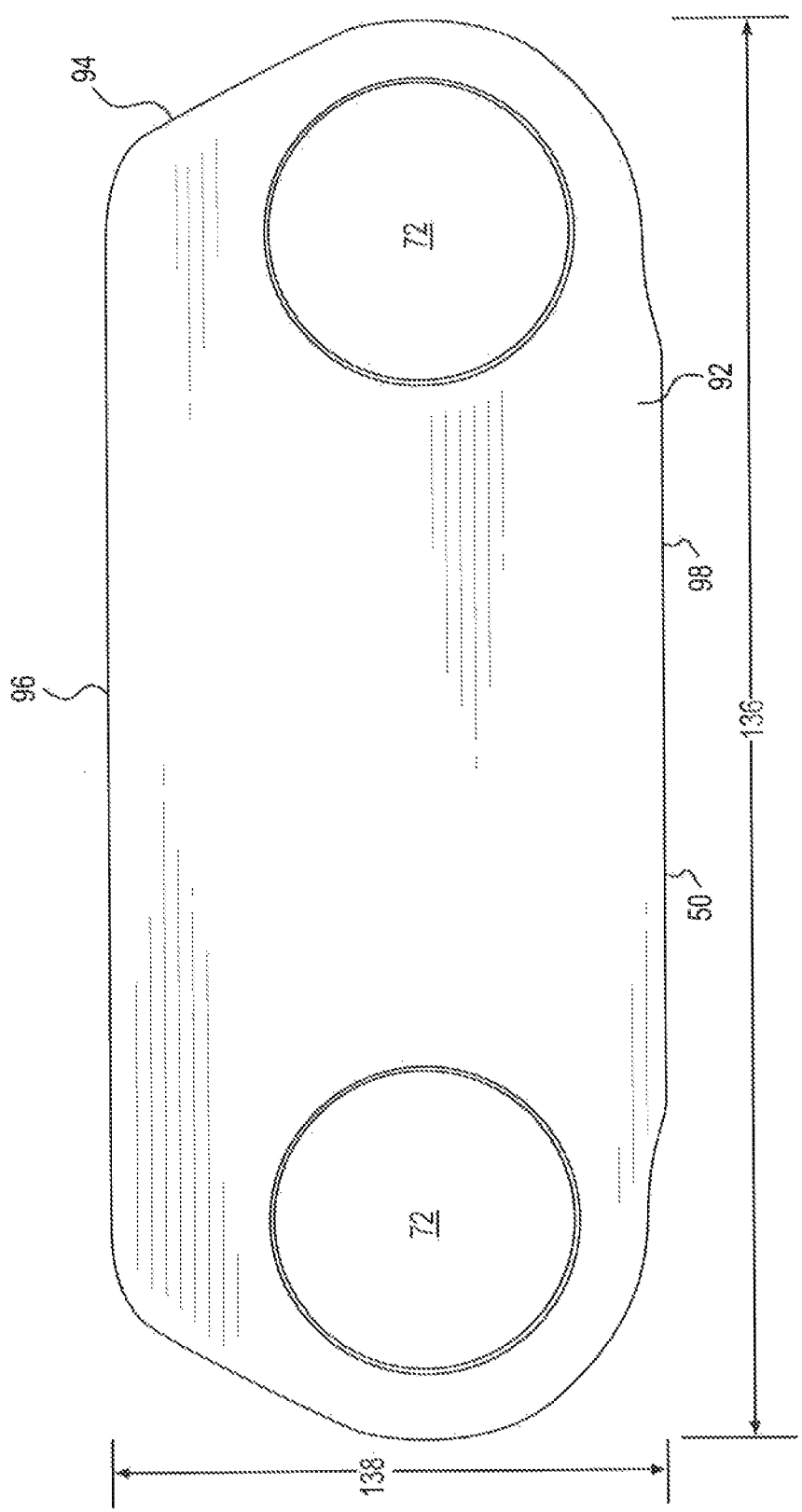
FIG. 4F is a side view of the track link of FIG. 4D from the side shown in FIG. 4D.
Figure 4G:
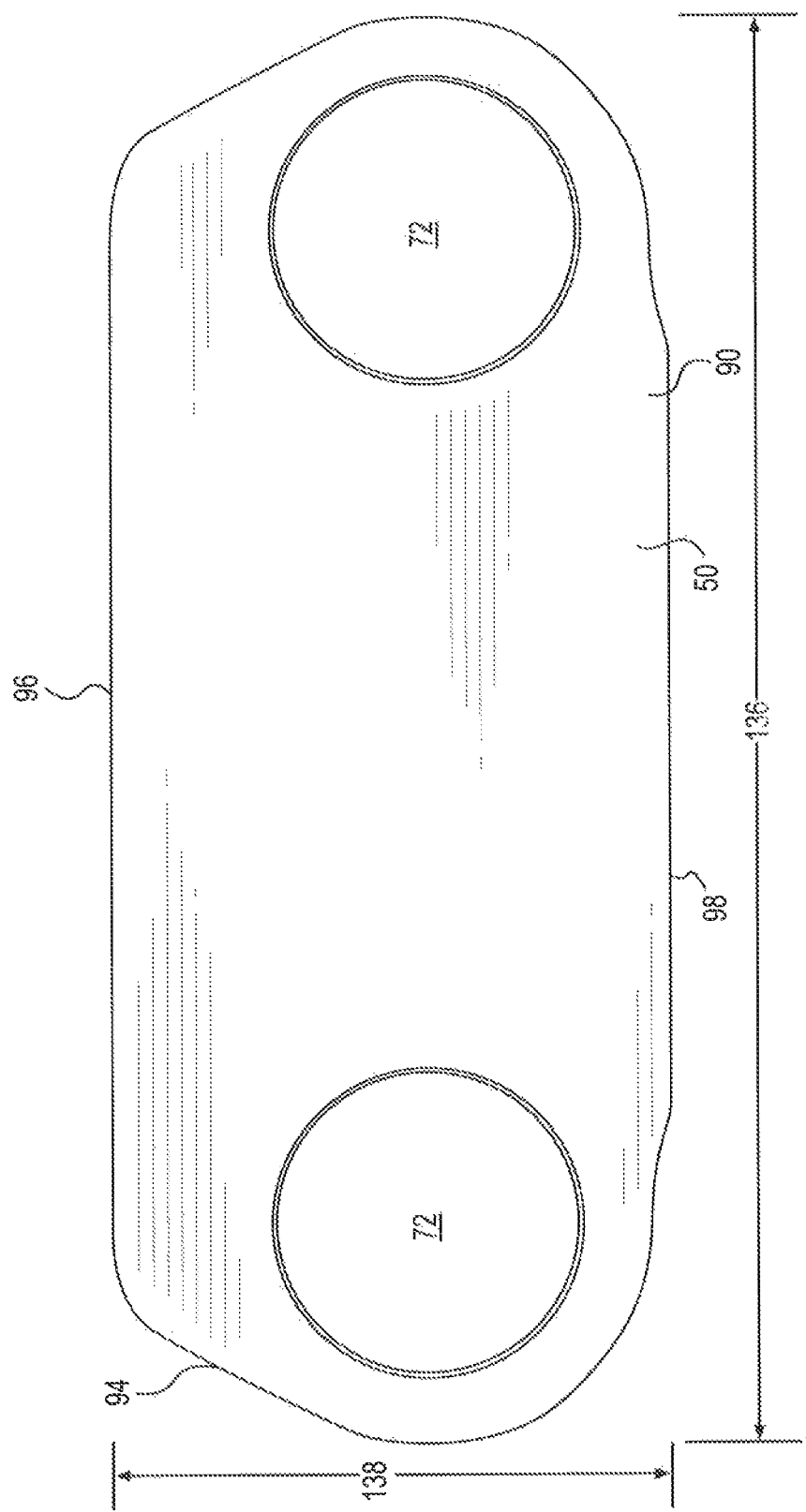
FIG. 4G is a side view of the track link of FIG. 4D from the side shown in FIG. 4E.
Figure 4H:
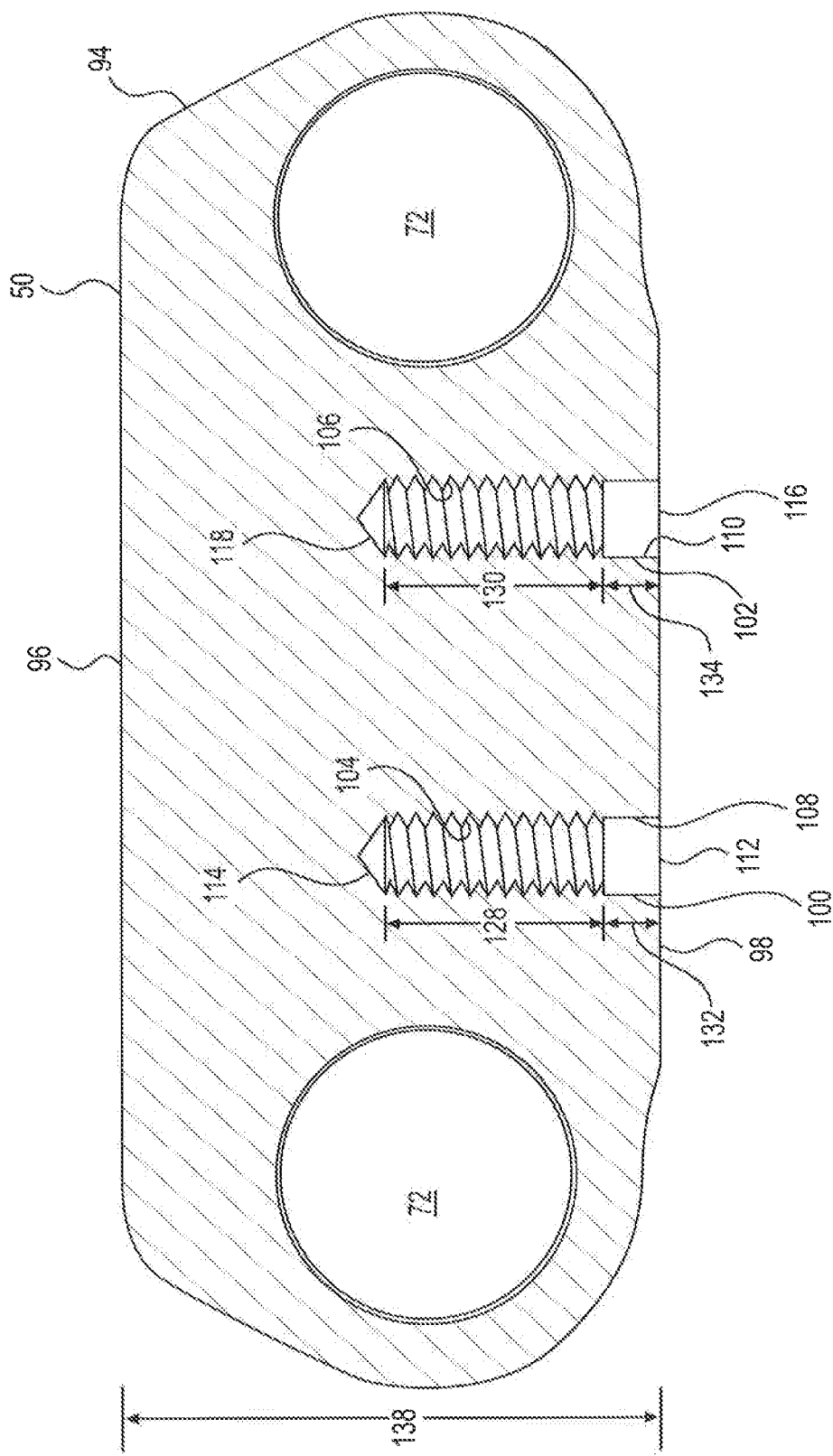
FIG. 4H is a longitudinal cross-section of the track link of FIG. 4D.
Figure 4I:
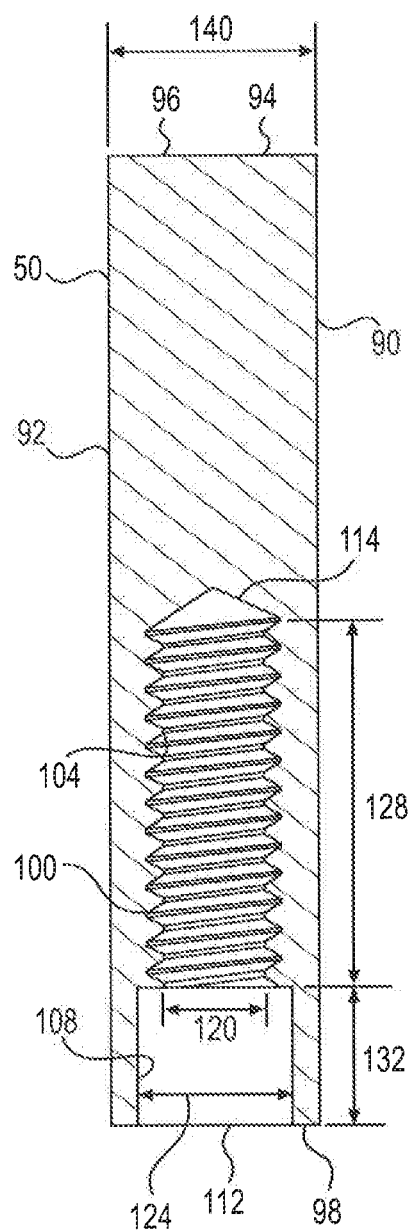
FIG. 4I is a lateral cross-section of the track link of FIG. 4D through one mounting hole.
Figure 4J:
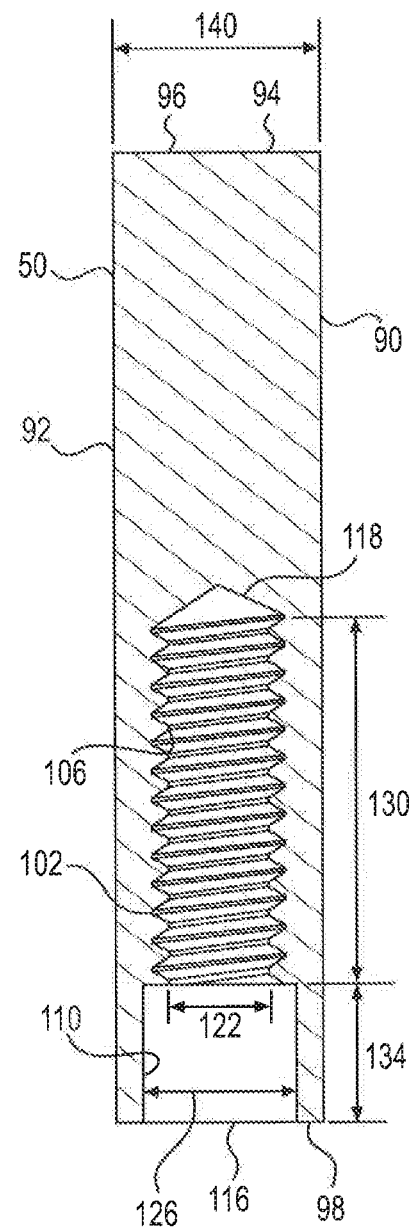
FIG. 4J is a lateral cross-section of the track link of FIG. 4D through another mounting hole.
Figure 4K:
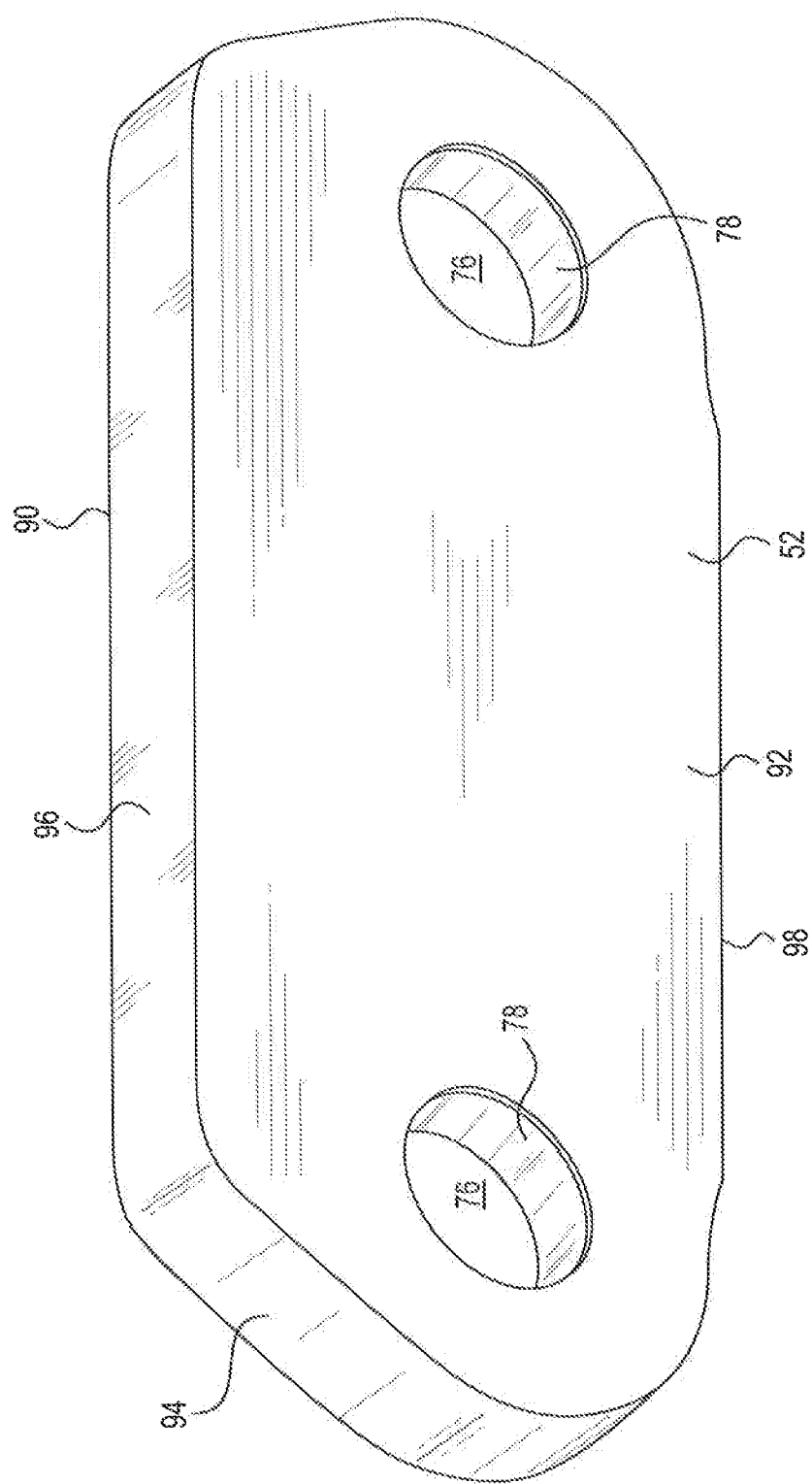
FIG. 4K is a perspective view of another track link according to the present disclosure from one side.
Figure 4L:
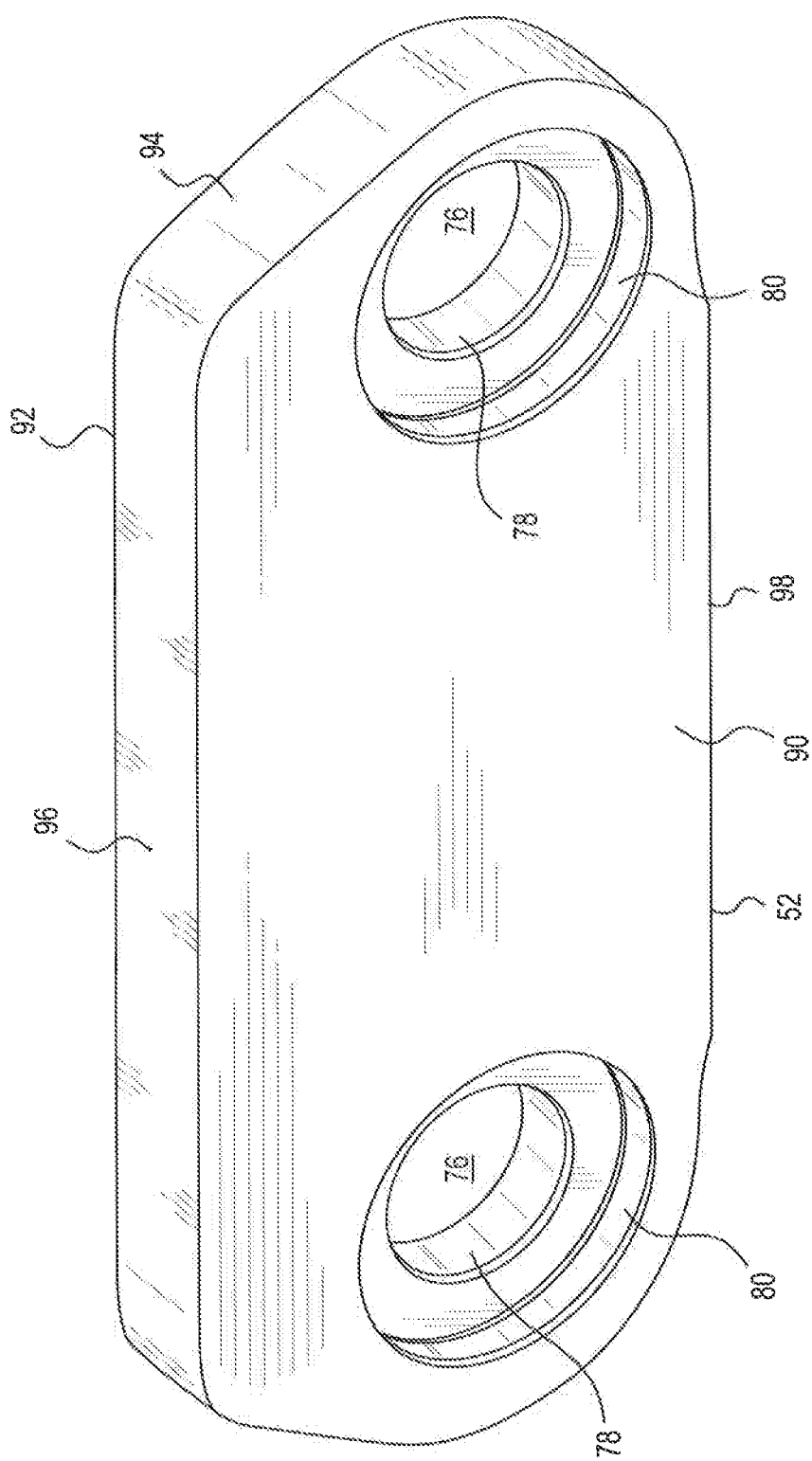
FIG. 4L is a perspective view of the track link of FIG. 4K from another side.
Figure 4M:
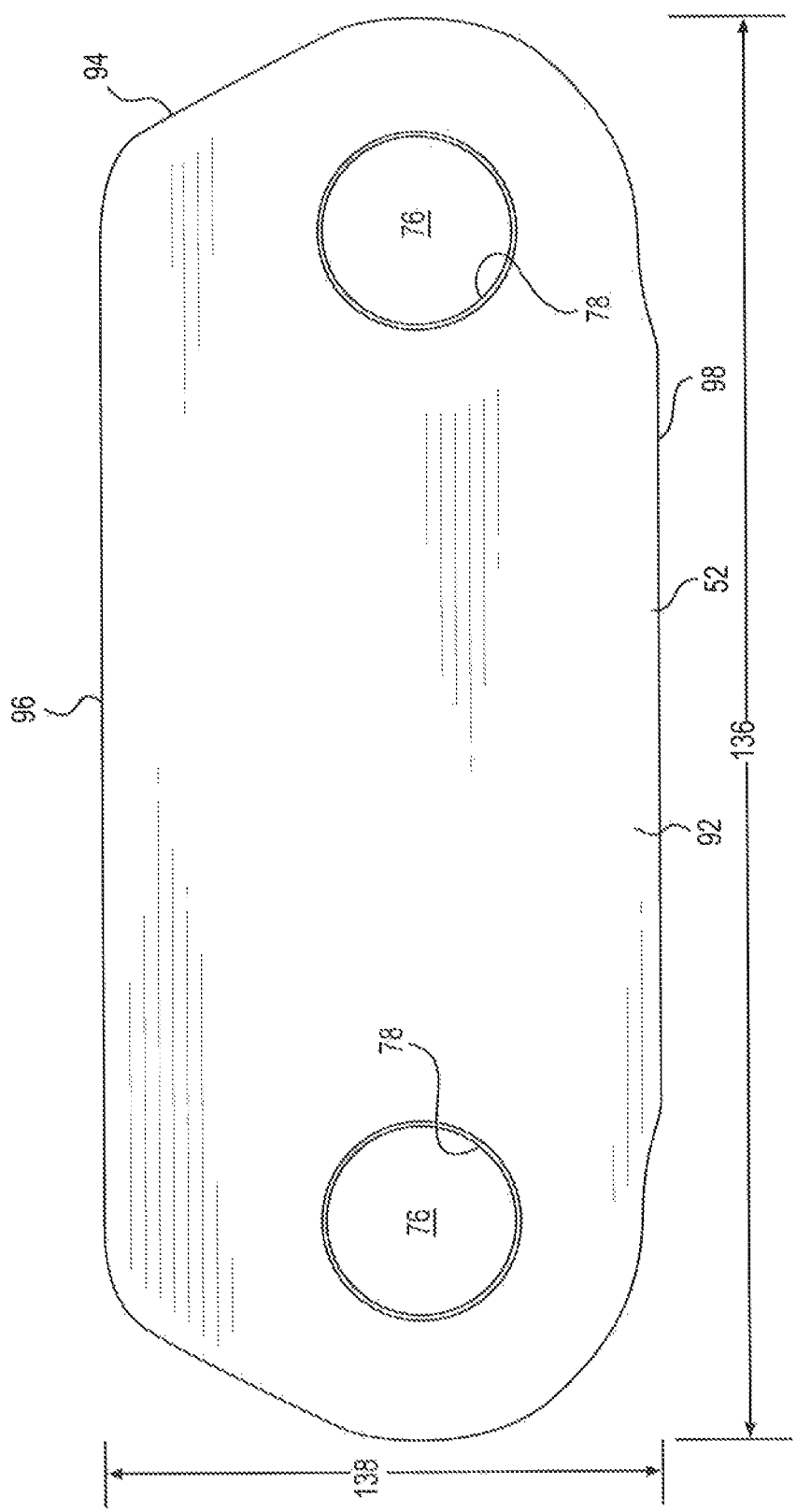
FIG. 4M is a side view of the track link of FIG. 4K from the side shown in FIG. 4K.
Figure 4O:
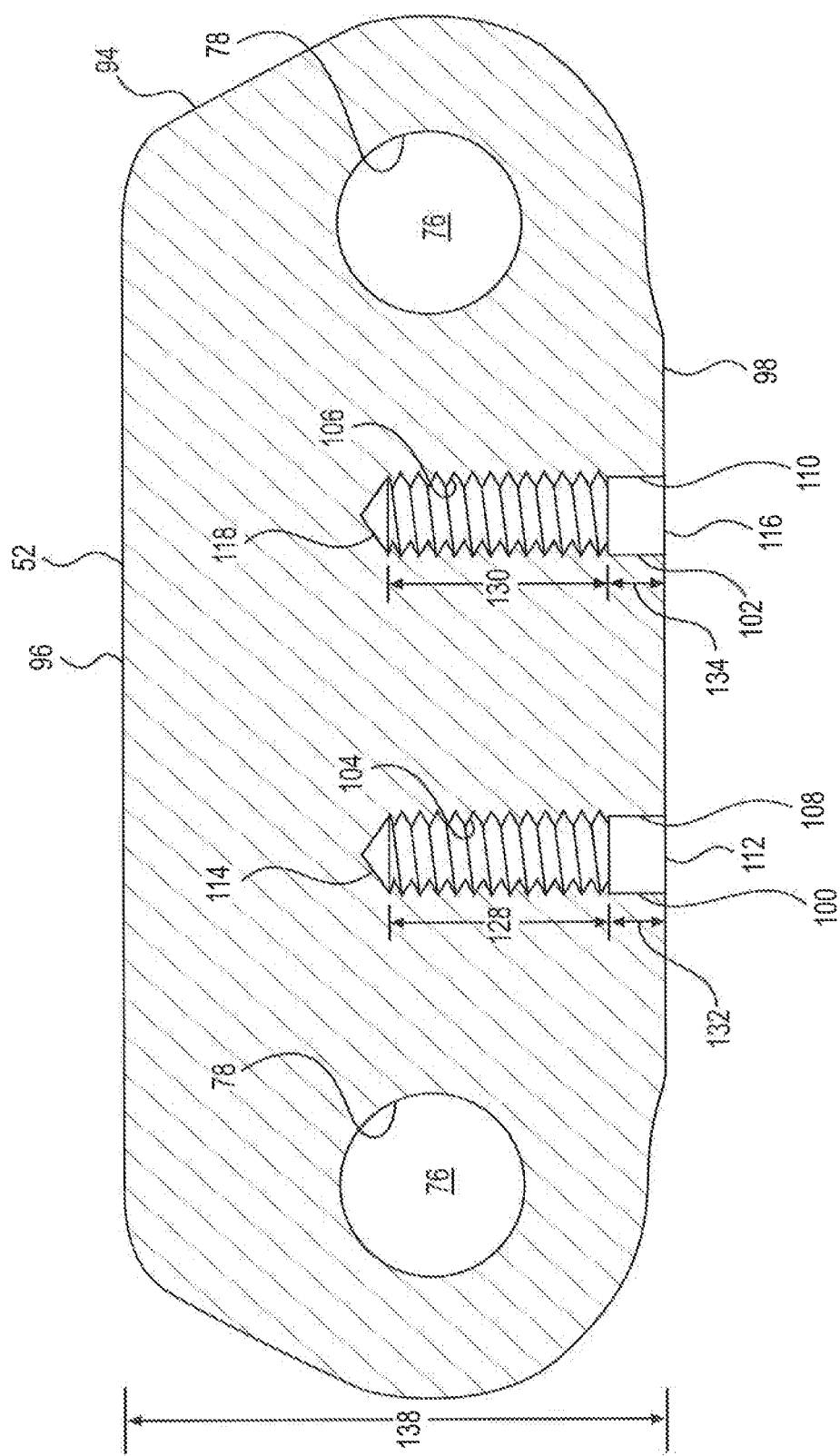
FIG. 4O is a longitudinal cross-section of the track link of FIG. 4K.
Figure 4P:
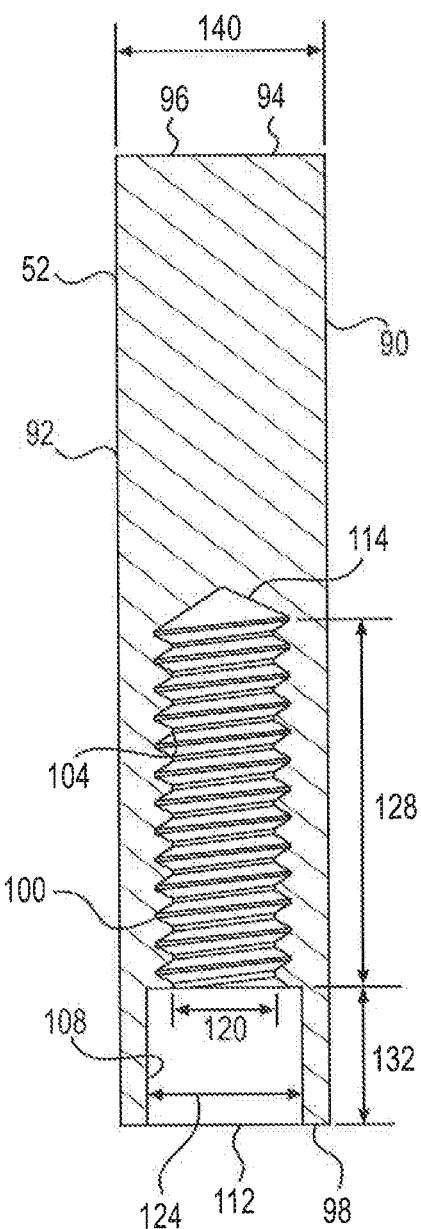
FIG. 4P is a lateral cross-section of the track link of FIG. 4K through one mounting hole.
Figure 4Q:
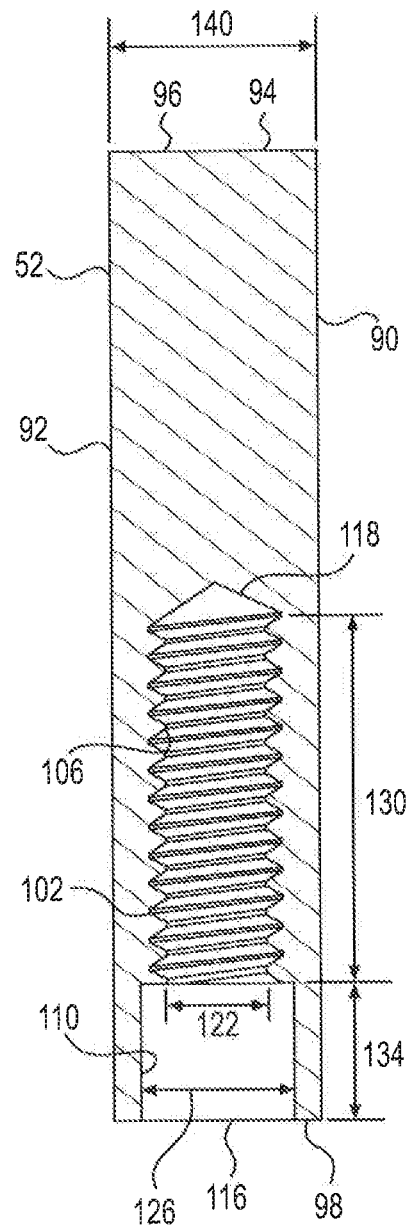
FIG. 4Q is a lateral cross-section of the track link of FIG. 4K through another mounting hole.

FIGS. 4A-4Q provide greater details regarding the construction of link assembly 48 and links 50, 52 thereof. FIGS. 4A-4C illustrate portions of link assembly 48; FIGS. 4D-4J provide various views of one of links 50; and FIGS. 4K-4Q provide various views of one of links 52.

As FIG. 4A shows, link assembly 48 may include laterally spaced pairs of links 50 alternating with laterally spaced pairs of links 52. Links 50 may be positioned laterally between links 52. Thus, the lateral spacing between each pair of links 52 may be greater than the lateral spacing between each pair of links 50. Accordingly, links 50 may be considered inner links, and links 52 may be considered outer links.

As noted above, links 50, 52 may be connected to one another at pivot joints 54. The connection at each pivot joint 54 may be accomplished with a bushing 68 and a pin 70. Each inner link 50 may include a pair of longitudinally spaced through bores 72. Each through bore 72 may receive a bushing 68. In some embodiments, one inner link 50 may have its through bores 72 press-fit onto ends of two bushings 68, and another inner link 50 may have its through bores 72 press-fit onto ends of the same bushings 68. This may fix the two inner links 50 in laterally spaced relationship to one another on the bushings 68. To allow a press-fit between through bores 72 and bushings 68, at least a portion of the through bores 72 of inner links 50 may have a diameter slightly smaller than the mating portion of the exterior of the bushing 68. In some embodiments, the ends of each bushing 68 may protrude slightly from the through bores 72 of inner links 50. Alternatively, the ends of bushings 68 may be flush with or recessed inward of the ends of through bores 72 of inner links 50.

Each bushing 68 may itself have a through bore 74. One of pins 70 may be installed in the through bore 74 of each bushing 68. Each pin 70 may be longer than each bushing 68, such that ends of each pin 70 may protrude beyond the ends of the bushing 68 receiving the pin 70. The through bore 74 of each bushing 68 and each pin 70 may be configured so that each pin 70 can rotate relatively freely within the through bore 74 of the bushing 68. For example, each pin 70 may have an outer diameter sufficiently smaller than the inner diameter of through bore 74 to provide sufficient clearance between the pin 70 and through bore 74 to allow free rotation.

Each of outer links 52 may include provisions for registering with the portions of bushings 68 and pins 70 protruding from inner links 50. For example, as best shown in FIGS. 4C, 4K, and 4L, each of outer links 52 may include a pair of openings 76. Each opening 76 may include a pin bore 78 configured to receive an end of a pin 70, as well as a counterbore 80 configured to register with the end of one of bushings 68. Each counterbore 80 may be sized to allow clearance between the counterbore 80 and the end of bushing 68, so that bushing 68 and outer link 52 may rotate freely relative to one another about the axis of pin 70 and bushing 68. In some embodiments, pin bore 78 may be sized to have a press fit with the end of pin 70.

As best shown in FIGS. 4B and 4C, each outer link 52 may have each of its pin bores 78 press fit onto an end of one of pins 70 with the associated counterbore 80 facing inward. This may fix the outer links 52 in laterally spaced pairs on the ends of pins 70 with longitudinal ends of the laterally spaced pairs of inner links 50 connected to and sandwiched between longitudinal ends of the laterally spaced pairs of outer links 52. With outer links 52 fixed to pin 70 and inner links 50 fixed to bushing 68, pin 70 may pivot within bushing 68, allowing outer links 52 and pin 70 to pivot relative to inner links 50 and bushing 68.

In the assembled state of link assembly 48, each counterbore 80 may register with the end of one of bushings 68. In embodiments where the ends of bushings 68 protrude from inner links 50, the end of each bushing 68 may extend partially into the associated counterbore 80.

Link assembly 48 may also have lubricant, such as oil or grease, contained in pivot joint 54. For example, lubricant may be contained within the space between pin 70 and bushing 68. As best shown in FIG. 4C, to prevent this lubricant from leaking out of pivot joint 54, link assembly 48 may include a seal 82 in each counterbore 80 of each outer link 52. As shown in FIG. 4C, seal 82 may be a washer seal that engages an end face of bushing 68 and an opposing face inside counterbore 80 to prevent lubricant from escaping pivot joint 54 between these two surfaces, as well as to prevent debris from entering pivot joint 54 between these two surfaces. Alternatively, seal 82 may have any other suitable configuration for sealing lubricant in and debris out of pivot joint 54.

Figure 1A:
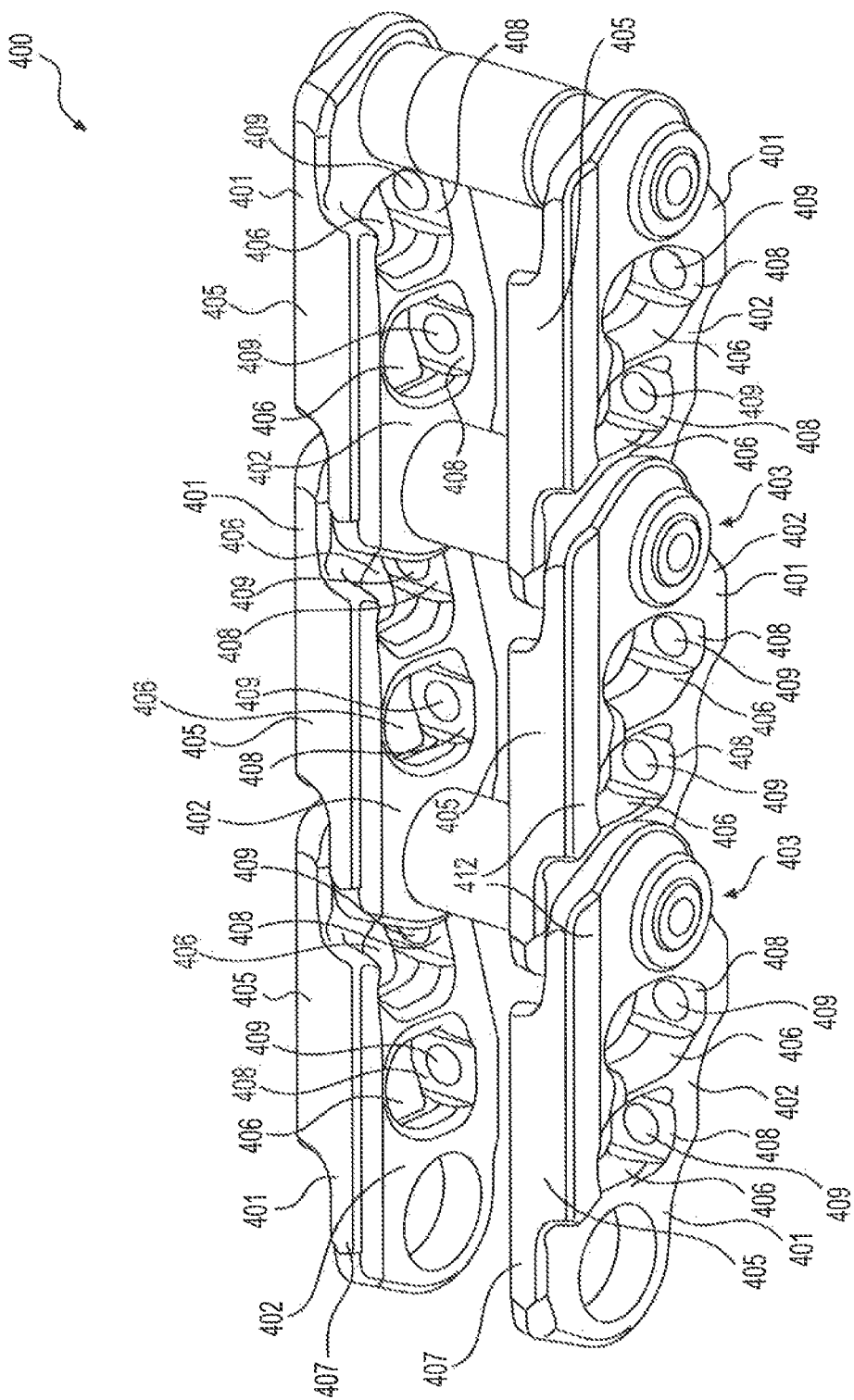
FIG. 1A is a perspective view of a prior art track link assembly.

Inner link 50 may have various configurations. As shown in FIGS. 4D-4J, in some embodiments, inner link 50 may have a monolithic construction with substantially planar side surfaces 90, 92. Side surfaces 90, 92 may also be substantially parallel to one another. The body of inner link 50 may, for example, comprise a flat metal plate with through bores 72 and a perimeter 94. Thus, the side surfaces 90, 92 of inner link 50 may omit the protrusions, depressions, and other complex geometric features on the sides 402 of the links 401 shown in FIG. 1A. Side surfaces 90, 92 may be monoplanar. Inner link 50 may also omit the windows 406 and nut seats 408 of the links shown in FIG. 1A. Omitting windows 406 and 408 may tend to enhance the strength of inner link 50. However, the configuration of inner link 50 is not limited to the example shown in the drawings. Some embodiments of inner link 50 may have windows. Such embodiments may include or omit nut seats.

Perimeter 94 of inner link 50 may have various shapes. In some embodiments, perimeter 94 may have a roller rail 96 on its top side and a shoe face 98 on its bottom side. In some embodiments, the edges of roller rail 96 may be substantially straight and parallel to one another. Similarly, the edges of shoe face 98 may be substantially straight and parallel to one another. In some embodiments, roller rail 96 and shoe face 98 may be substantially planar. Alternatively, roller rail 96 and/or shoe face 98 may have other shapes. For example, in some embodiments, roller rail 96 may arch away from shoe face 98 as it extends toward the longitudinal center of inner link 50. Additionally, shoe face 98 may include one or more arches and/or projections. As discussed below, shoe 56 may include reliefs 163 on an inner face 142. Inner link 50 may include one or more projections on shoe face 98 configured to extend into reliefs 163 and help hold inner link 50 and shoe 56 in proper relative positions. In some embodiments, such projections on shoe face 98 may have substantially the same shape as reliefs 163. Adjacent the longitudinal ends of roller rail 96, perimeter 94 may curve and/or slope toward shoe face 98. Similarly, adjacent longitudinal ends of shoe face 98, perimeter 94 may curve and/or slope toward roller rail 96.

Inner link 50 may include track-shoe-mounting structure configured to secure a shoe 56 to inner link 50. With no windows or nut seats in inner link 50, the track-shoe-mounting structure may take various forms. In some embodiments, the track-shoe-mounting structure may include mounting holes extending from shoe face 98 into the body of inner link 50 toward roller rail 96. For example, as shown in the cross-sections illustrated in FIG. 4H-4J, inner link 50 may include a mounting hole 100 and a mounting hole 102. FIG. 4H shows a longitudinal cross-section of inner link 50 through mounting holes 100, 102. Each of FIGS. 4I and 4J shows a lateral cross-section of inner link 50 through one of mounting holes 100, 102, respectively. Mounting hole 100 may have an open end 112 at shoe face 98 and a closed end 114 inside the body of inner link 50. Similarly, mounting hole 102 may have an open end 116 at shoe face 98 and a closed end 118 inside the body of inner link 50.

Mounting holes 100, 102 may include threaded portions 104, 106 and unthreaded counterbores 108, 110. Counterbores 108, 110 may be disposed between threaded portions 104, 106 and open ends 112, 116 of mounting holes 100, 102 at shoe faces 98. As discussed in greater detail below, the inclusion of counterbores 108, 110 may facilitate achieving relatively large amounts of bolt stretch in the hardware used to mount shoe 56 to inner link 50. This may help ensure that shoe 56 remains securely connected to inner link 50. Threaded portions 104, 106 and counterbores 108, 110 may have various configurations. Threaded portions 104, 106 may have diameters 120, 122, and counterbores 108, 110 may have diameters 124, 126. The diameters 124, 126 of counterbores 108, 110 may be larger than the diameters of threaded portions 104, 106 to allow the threads of bolts to pass freely through counterbores 108, 110 on the way to threaded portions 104, 106. Threaded portions 104, 106 may have lengths 128, 130, and counterbores 108, 110 may have lengths 132, 134. These lengths 128, 130, 132, 134 will be discussed in greater detail below.

Mounting holes 100, 102 may be located in various lateral and longitudinal positions within link 50. As shown in FIG. 4H, in some embodiments, mounting holes 100, 102 may be placed equidistant from a longitudinal center of link 50. As shown in FIGS. 4I and 4J, in some embodiments, mounting holes 100, 102 may each be centered laterally between side surfaces 90, 92 of link 50. The lateral and longitudinal positions of mounting holes 100, 102 are not limited to the examples provided in the drawings. One or both of mounting holes 100, 102 may be located at different lateral and/or longitudinal positions than shown in the drawings.

The external dimensions of the body of inner link 50 may have various values based on various considerations. As shown in FIGS. 4F-4J, inner link 50 may have a length 136, a height 138, and a width 140. The length 136 may be determined in large part based on a desired distance between through bores 72 and the amount of material necessary between the ends and the through bores 72 to provide suitable structural integrity. Similarly, the height 138 may be determined based in large part on the size of through bores 72 and the amount of material required above and below through bores 72 to provide suitable structural integrity and wear life.

As best understood by referring to FIGS. 4I and 4J, in some embodiments, the width 140 of inner link 50 may be determined based in part on considerations related to the structural integrity of the portions of inner link 50 between threaded portions 104, 106 of mounting holes 100, 102 and side surfaces 90, 92. Width 140 of inner link 50 may have a value that ensures sufficient material to withstand loads applied to threaded portions 104, 106 by bolts installed therein. For example, width 140 may have a value of at least about 1¼ times the diameters 120, 122 of threaded portions 104, 106. In some embodiments, width 140 may have a value of at least about 1½ times the diameters 120, 122 of threaded portions 104, 106.

As noted below, in some embodiments, provisions other than threaded fasteners may be used to mount shoe 56 to inner link 50. For example, in some embodiments, shoe 56 may be welded to inner link 50. In such embodiments, inner link 50 may omit mounting holes 100, 102. This may allow making width 140 of inner link 50 narrower, as inner link 50 would not need to be wide enough to accommodate mounting holes 100, 102.

FIGS. 4K-4Q show outer link 52 in detail. Outer link 52 may have a configuration similar to inner link 50. In some embodiments, outer link 52 may be substantially identical to inner link 50, except openings 76 may differ from through bores 72. In such embodiments, the above-discussed characteristics of inner link 50 other than openings 72, including its shape and size and its mounting holes 100, 102, may also be included in outer link 52.

As noted above, each opening 76 of outer link 52 may include a pin bore 78 and a counterbore 80. Each counterbore 80 may have any suitable dimensions for accommodating seal 82. As shown in FIG. 4C, counterbore 80 may have a length 84, pin bore 78 may have a length 86, and the sum of length 84 and length 86 may equal a width 140 of outer link 52. Making counterbore 80 long enough to allow counterbore 80 to fully contain seal 82 and to receive at least a portion of the end of the associated bushing 68 may provide certain advantages. For example, this may create a labyrinth of surfaces that lubricants and debris must traverse to escape or enter the interior of pivot joint 54. On the other hand, making counterbore 80 relatively short may provide a relatively long pin bore 78. This may provide relatively greater friction between pin 70 and pin bore 78, which may provide a relatively secure engagement between pin 70 and outer link 52. By providing a counterbore 80 with a length 84 slightly greater than the in-use length of seal 82, the embodiment shown in the figures may achieve both of these advantages. Counterbore 80 may, for example, have a length 84 of between about 1 and about 5 times the in-use length of seal 82. Additionally, the length 84 of counterbore 80 may less than about ¼ of the width 140 of outer link 52. Thus, where pin bore 78 and counterbore 80 extend across the entire width 140 of outer link 52, the length 84 of counterbore 80 may be less than about ⅓ of the length 86 of pin bore 78.

In some embodiments, link assembly 48 may have different provisions for accommodating seal 82. For example, in some embodiments, link assembly 48 may house seal 82 at least partially in one or more spaces within inner link 50. In some such embodiments, each bushing 68 have its ends recessed inward of the outer end of each through bore 72 of inner links 50. This may provide space within the end of each through bore 72 adjacent the end of the bushing 68 for seal 82. Each seal 82 may be housed partially or fully within this space at the end of each through bore 72. This may allow pin bore 78 to occupy an even greater percentage of the width 140 of outer link 52, which may further enhance the engagement between pin 70 and outer link 52.

Returning to FIG. 4A, the roller rails 96 of inner and outer links 50, 52 may collectively form two roller rails 180 of link assembly 48. These roller rails 180 may provide a surface on which rollers 30-36 can ride. Additionally, the edges of roller rails 96 and side surfaces of inner and outer links 50, 52 may provide lateral guiding surfaces for rollers 30-36. For example, link assembly 48 may have inner guide surfaces 182 formed by side surfaces 90 of inner links 50 and the associated edges of roller rails 96 of inner links 50. Similarly, link assembly 48 may have outer guide surfaces 184 formed by side surfaces 92 of outer links 52 and associated edges of the roller rails 96 of outer links 52. Because inner and outer links 50, 52 have planar configurations, inner and outer guide surfaces 182, 184 of link assembly 48 may not be substantially continuous like the outer guide surfaces 412 of the link assembly 410 shown in FIG. 1A. Rather, inner guide surfaces 182 may be discontinuous, with gaps 186 large enough that inner guiding features of any given roller 30-36 may not necessarily remain in engagement with inner guide surfaces 182 at all times. Similarly, outer guide surfaces 184 may be discontinuous, with gaps 188 large enough that outer guiding features of any given roller 30-36 may not necessarily remain in engagement with outer guide surfaces 184 at all times.

As noted above, the lateral spacing between each pair of outer links 52 may be greater than the lateral spacing between each pair of inner links 50. In some embodiments, this may cause one lateral spacing between the mounting holes 100, 102 in each pair of outer links 52 and a different lateral spacing between the mounting holes 100, 102 in each pair of inner links 50. For example, in some embodiments the lateral spacing between the mounting holes 100, 102 of each pair of outer links 52 may be greater than the lateral spacing between the mounting holes 100, 102 of each pair inner links 50.

Figure 5A:
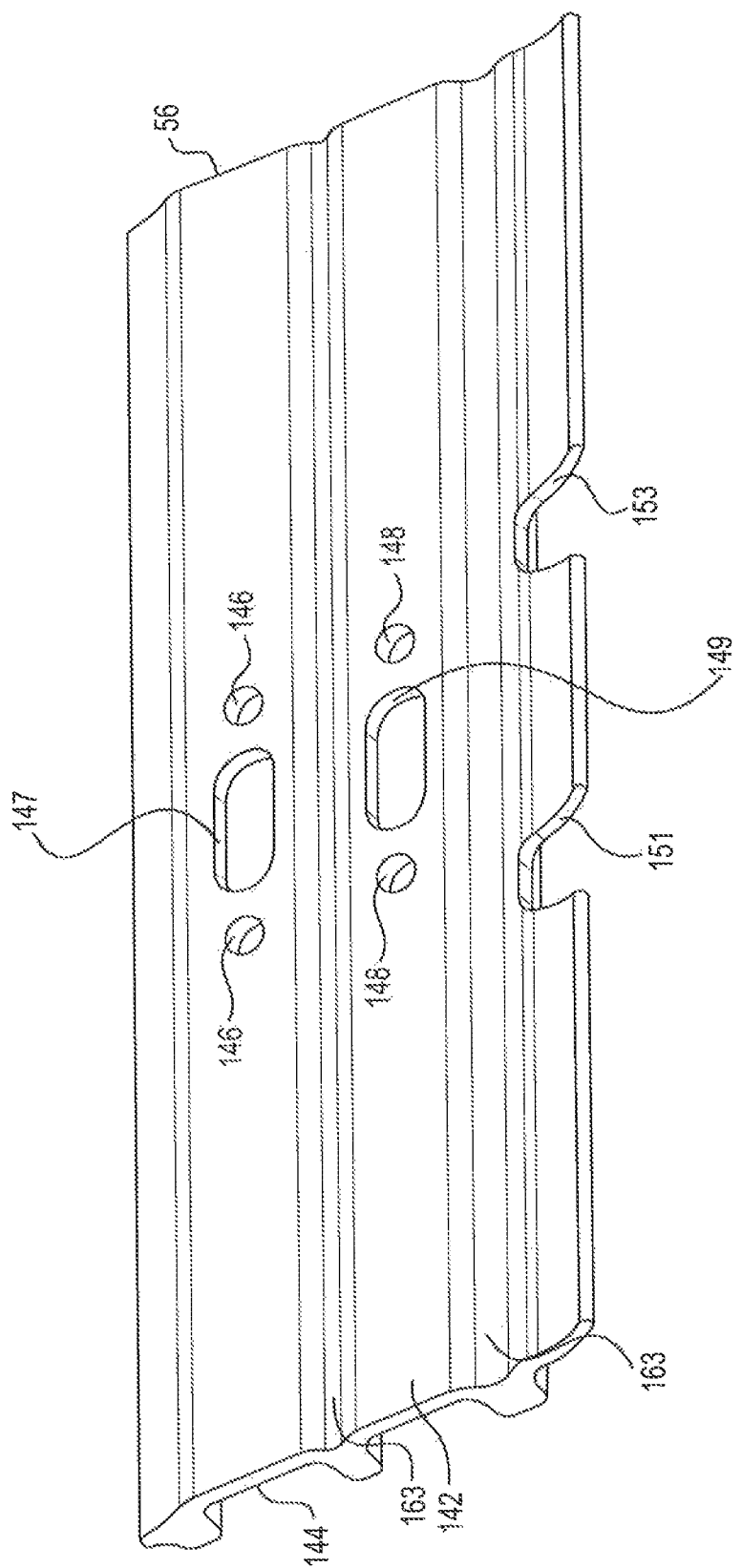
FIG. 5A is a perspective view of one track shoe according to the present disclosure from one side.
Figure 5C:
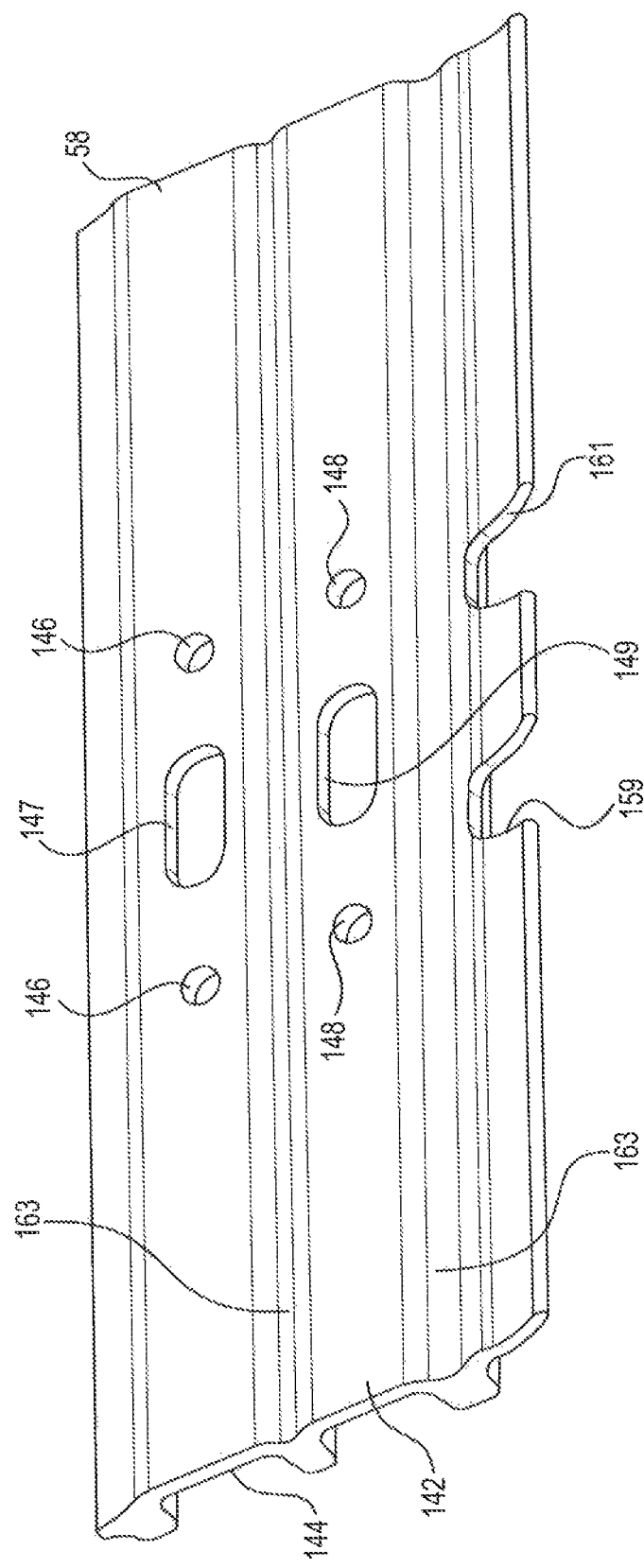
FIG. 5C is a perspective view of another track shoe according to the present disclosure from one side.

FIGS. 5A and 5B illustrate one of shoes 56 in greater detail, and FIGS. 5C and 5D illustrate one of shoes 58 in greater detail. As shown in FIGS. 5A and 5C each shoe 56, 58 may include an inner face 142 for mounting to links 50, 52, respectively. Each shoe 56, 58 may also include reliefs 163 on its inner face 142. In some embodiments, reliefs 163 may be grooves or slots that extend laterally across inner face 142. As shown in FIGS. 5B and 5D, each shoe 56, 58 may also have an outer face 144 for engaging the ground. Each shoe 56, 58 may include two laterally spaced pairs of mounting holes 146, 148. The longitudinal spacing between each mounting hole 146 and the paired mounting hole 148 may equal the spacing between mounting holes 100, 102 of inner and outer links 50, 52. Additionally, each shoe 56 may have its pairs of mounting holes 146, 148 laterally spaced from each other substantially the same distance as the lateral spacing between each pair of inner links 50 in link assembly 48. On the other hand, each shoe 58 may have its pairs of mounting holes 146, 148 laterally spaced from one another substantially the same distance as the lateral spacing between each pair of outer links 52 in link assembly 48. Thus, the lateral spacing between mounting holes 146, 148 of shoe 56 may differ from the lateral spacing between mounting holes 146, 148 of shoe 58.

This arrangement of mounting holes 146, 148 of shoes 56, 58 may allow mounting holes 146, 148 to register with mounting holes 100, 102 of links 50, 52, so that bolts may be secured through mounting holes 146, 148 into mounting holes 100, 102 to retain shoes 56, 58 to link assembly 48. FIGS. 6A-6D illustrate shoes 56, 58 secured to link assembly 48. Each shoe 56 may have its inner face 142 placed against the shoe faces 98 of a laterally spaced pair of inner links 50 with each pair of mounting holes 146, 148 of the shoe 56 registering with the mounting holes 100, 102 of one of the inner links 50. Similarly, each shoe 58 may have its inner face 142 placed against the shoe faces 98 of a laterally spaced pair of outer links 52 with each pair of mounting holes 146, 148 of the shoe 58 registering with the mounting holes 100, 102 of one of the outer links 52.

Each shoe 56, 58 may also include trap holes 147, 149 extending between inner face 142 and outer face 144. Trap holes 147, 149 may provide an escape path for material like dirt or gravel that has worked its way into link assembly 48. In some embodiments, one or both of shoes 56, 58 may omit one or both of trap holes 147, 149. Alternatively, one or both of shoes 56, 58 may include more than two trap holes 147, 149.

Shoes 56, 58 may also include notches in their edges to provide escape paths for material like dirt and gravel. For example, shoe 56 may have notches 151, 153. Notches 151, 153 may be spaced from one another by a distance approximately equal to the lateral spacing between outer links 52 in link assembly 48. Thus, notches 151, 153 may be spaced from one another by a different amount than mounting holes 146, 148 of shoe 56. Shoe 58 may have notches 159, 161 on its edge. Notches 159, 161 may be spaced from one another by a different amount than notches 151, 153 of shoe 58. For example, notches 159, 161 may be laterally spaced from one another by a distance substantially equal to the lateral spacing between inner links 50 of link assembly 48. Thus, the lateral spacing between notches 159, 161 may be different from the lateral spacing between mounting holes 146, 148 of shoe 58.

Figure 6C:
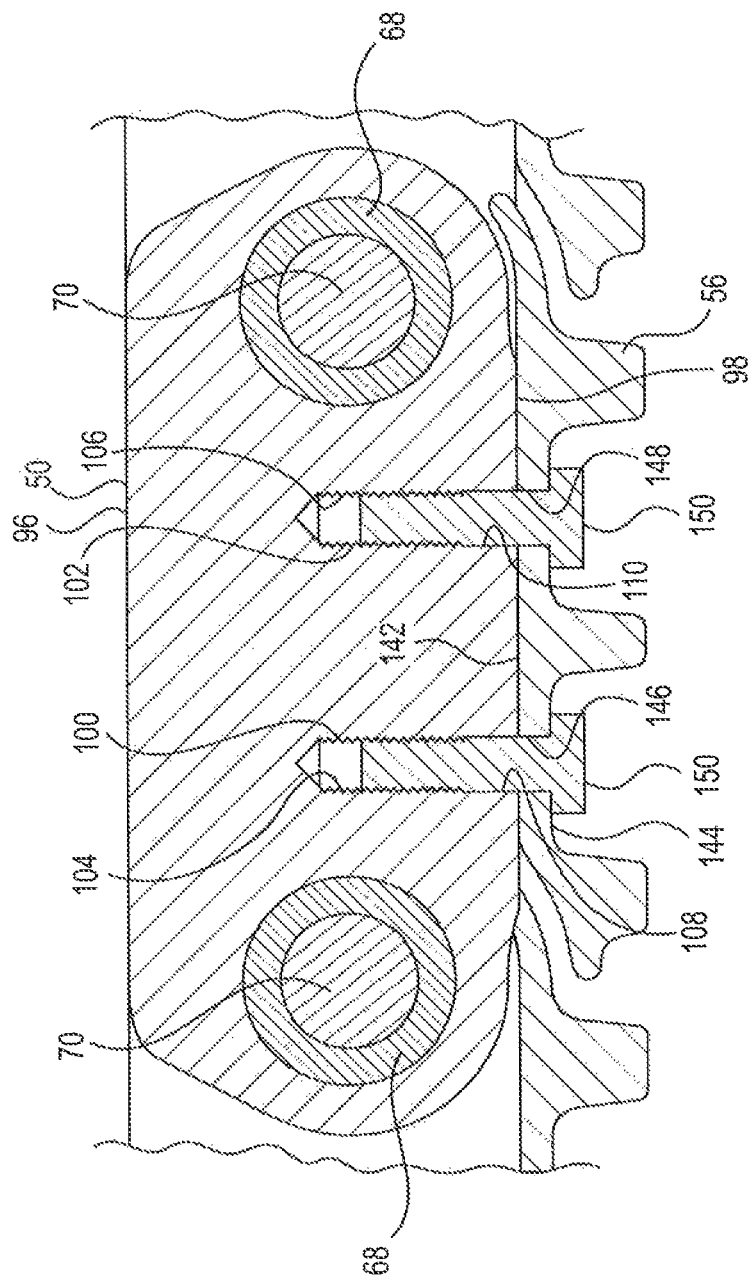
FIG. 6C is a longitudinal cross-section through an inner track link of the assembly shown in FIG. 6A.
Figure 6D:
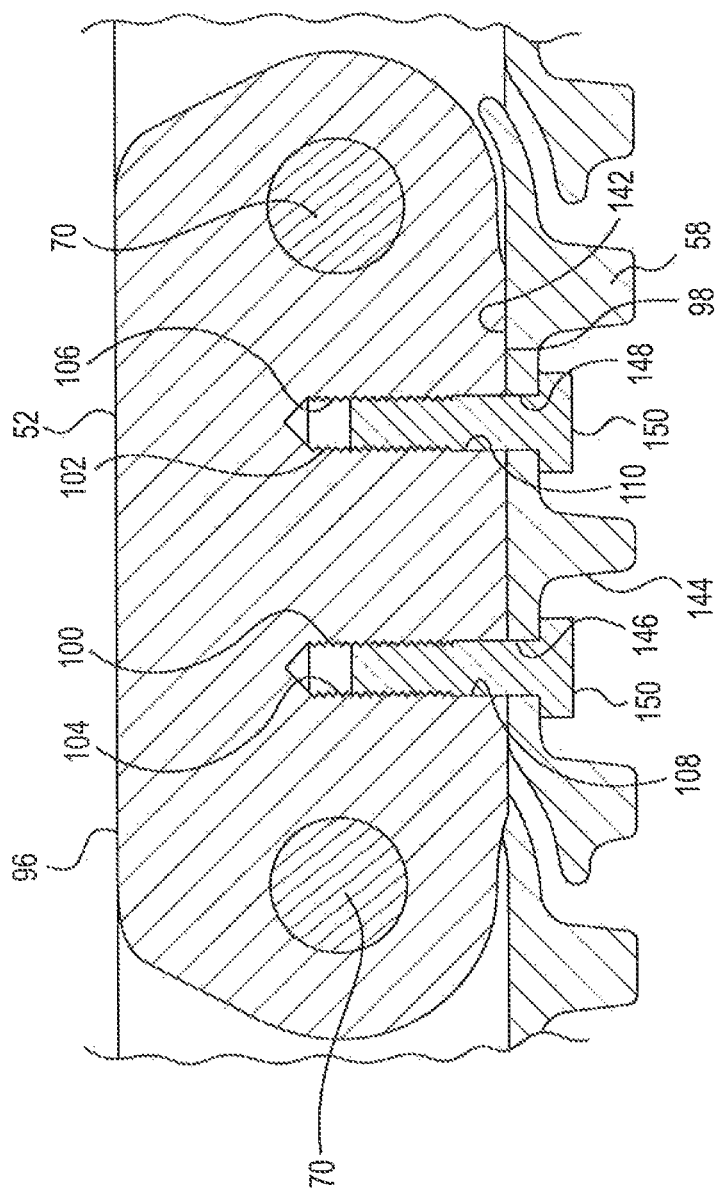
FIG. 6D is a longitudinal cross-section through an outer track link of the assembly shown in FIG. 6A.

As shown in FIGS. 6B-6D, bolts 150 may be secured through each of mounting holes 146, 148 into mounting holes 100, 102 of links 50, 52 to secure shoes 56, 58 to link assembly 48. Bolts 150 may be secured into mounting holes 100, 102 by engaging threads of bolts 150 to threaded portions 104, 106 of each of mounting holes 100, 102. As best shown in FIGS. 6B-6D, the portions of bolts 150 extending through counterbores 108, 110 of mounting holes 100, 102 and through mounting holes 146, 148 of shoes 56, 58 may be free to stretch as bolts 150 are tightened. Because counterbores 108, 110 and mounting holes 146, 148 allow a significant portion of each bolt 150 to stretch, it may be possible to provide a relatively large amount of stretch in each of bolts 150 without unduly stressing the bolts 150. To help achieve this bolt stretch, counterbores 108, 110 may have significant lengths 132, 134. For example, each counterbore 108, 110 may have a length 132, 134 of at least about ½ of its diameter 124, 126. In some embodiments, each counterbore 108, 110 may have a length 132, 134 of at least about ¾ of its diameter 124, 126. Similarly, each counterbore 108, 110 may have a length 132, 134 of at least about ½, or in some embodiments at least about ¾ of the diameter 120, 122 of the associated threaded portion 104, 106.

FIGS. 7A-7D illustrate rollers 34 and 35 in greater detail. In some embodiments, each of rollers 30-33 may have substantially the same configuration as roller 34, and roller 36 may have substantially the same configuration as roller 35. Rollers 34 and 35 may each include a central passage 152 through which the associated axle 64, 65 extends. Each roller 34, 35 may include two roller treads 154, 156 for engaging the roller rails 180 of link assembly 48. Each roller tread 154, 156 may be, for example, a substantially cylindrical surface extending partway along the axis of each roller 34, 35. The roller treads 154, 156 of each roller 34, 35 may be disposed on axially opposite sides of a center plane of the roller 34, 35. As shown in FIGS. 7B and 7D, roller tread 154 may have a width 155, and roller tread 156 may have a width 157. The widths 155, 157 of roller treads 154, 156 may be the same or different. In some embodiments, the width 155, 157 of each roller tread 154, 156 may be at least twice the width 140 of each of inner and outer links 50, 52. Similarly, roller treads 154, 156 may have the same diameter or different diameters.

Each roller 34, 35 may also have provisions for providing lateral guidance between rollers 34, 35 and track 24. For example, axially outward of roller treads 154, 156 each of rollers 34, may include a pair of outer guide flanges 158, 160 extending radially outward of roller treads 154, 156, respectively. As shown in FIGS. 7C and 7D, outer guide flange 158 may have a height 162 from roller tread 154. Outer guide flange 160 may have a height 164 from roller tread 156. The heights 162, 164 of guide flanges 158, 160 may be the same or different. The width (e.g., axial distance) between outer guide flanges 158, 160 may be slightly greater than the width between outer surfaces 92 of outer links 52 in link assembly 48. This may allow outer links 52 of link assembly 48 to fit between outer guide flanges 158, 160.

In addition to outer guide flanges 158, 160, roller 34 may have a single center guide flange 166 disposed between roller treads 154, 156. Center guide flange 166 may extend from one roller tread 154 to the other roller tread 156. In some embodiments, radially outer portions of the lateral edges of center flange 166 may have rounded corners 168, 170. Between corners 168, 170, center guide flange 166 may have a substantially cylindrical surface 172 of substantially constant diameter. Substantially cylindrical surface 172 may include one or more openings. For example, as shown in FIG. 7A, substantially cylindrical surface 172 may include an opening 174 for supplying lubricant into central passage 152 of roller 30.

Center guide flange 166 may have a height 178 relative to adjacent roller treads 154, 156. Height 178 may have various values. In some embodiments, the height 178 of center guide flange 166 may be at least about 10% of the widths 155, 157 of each of roller treads 154, 156. Center guide flange 166 may have a greater height in some embodiments. For example, the height 178 of center guide flange 166 may be at least about 15% of the widths of 155, 157 of each of roller treads 154, 156. Additionally, in some embodiments, the height 178 of center guide flange 166 may be at least about ½ of the heights 162, 164 of outer guide flanges 158, 160.

Configuring center guide flange 166 with such substantial height may help ensure that center guide flange 166 remains in proper guiding arrangement with track 24 as vertical and/or angular movement of one or more shoes 56, 58 occurs.

In contrast to roller 34, roller 35 may lack central guide flange 166. In lieu of central guide flange 166, roller 35 may include a central groove 176. Roller 35 may include central groove 176 in order to allow the central portion of roller 35 to clear components that connect idler 28 to track roller frame 22. As noted above, roller 36 may be configured substantially the same as roller 35. Accordingly, roller 36 may similarly include a central groove 176.

Each of rollers 30-36 may be constructed from a single, unitary piece of parent material without welds or other joining techniques. For example, each of rollers 30-36 may be formed from a piece of bar stock cut, machined, and/or otherwise shaped to include the features discussed above. Structures formed from a single, unitary piece of parent material may include, for example, structures that are formed without welded joints, glued joints, fastened joints, press-fit joints, or the like to hold different portions of the structure together.

Rollers 30-36 are not limited to the configurations shown in the drawings. For example, each roller 30-34 may have multiple central guide flanges in lieu of a single central guide flange 166. Alternatively, in some embodiments, rollers 30-36 may all be configured without any central guide flange. Similarly, a subset or all of rollers 30-36 may omit outer guide flange 158 and/or outer guide flange 160.

FIGS. 8A-8D illustrate in detail how rollers 30-36 may engage link assembly 48. Each of FIGS. 8A-8D shows only a subset of rollers 30-36, but the illustrations of how roller 34 engages link assembly 48 also demonstrate how rollers 30-33 engage link assembly 48, and the illustrations of how roller 35 engages link assembly also demonstrate how roller 36 engages link assembly 48. As shown in the figures, the roller treads 154, 156 of each roller 30-36 may ride on the roller rails 180 of link assembly 48.

Figure 8A:
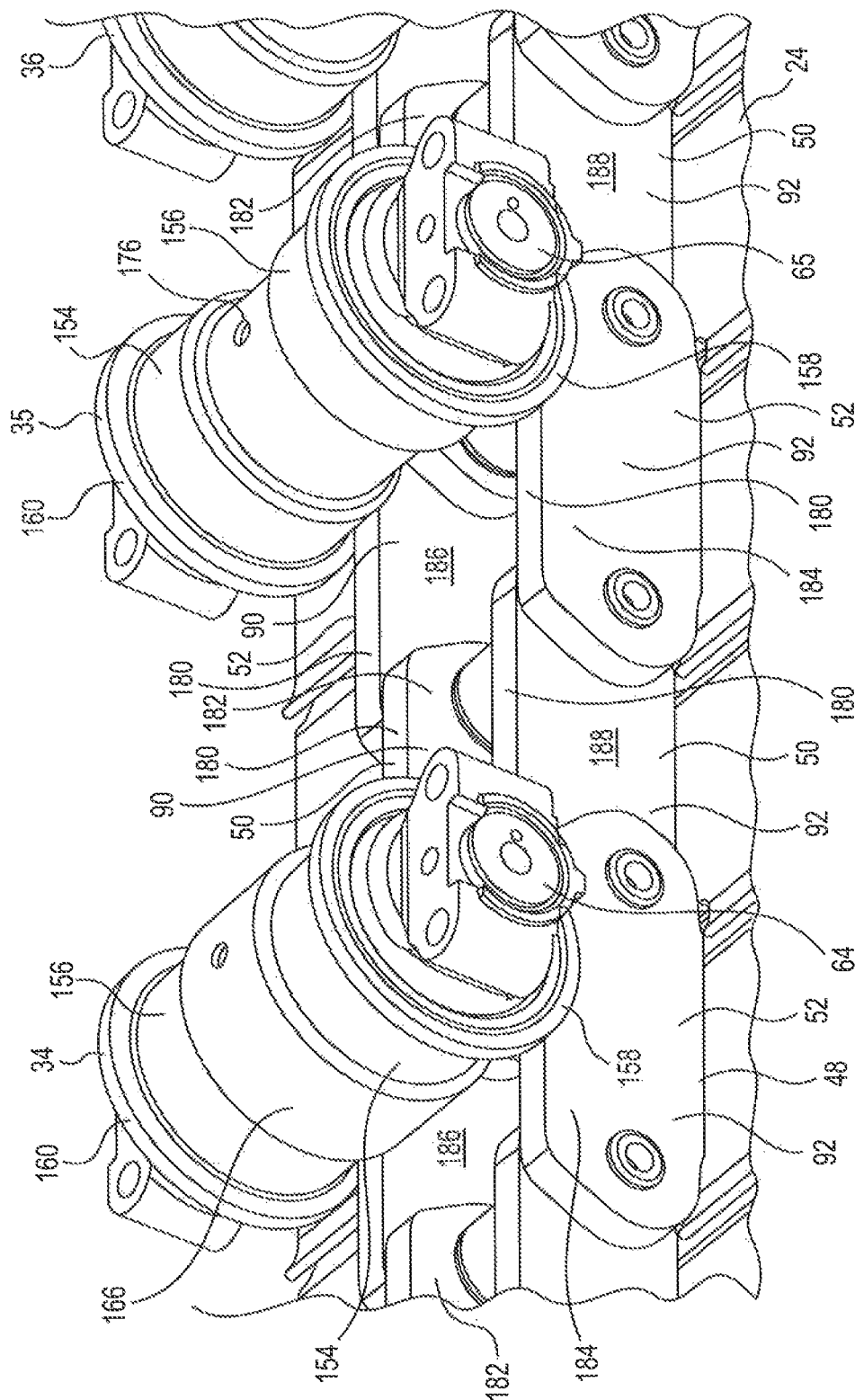
FIG. 8A is a first perspective view of track rollers engaging a track link assembly and shoes according to the present disclosure.
Figure 8B:
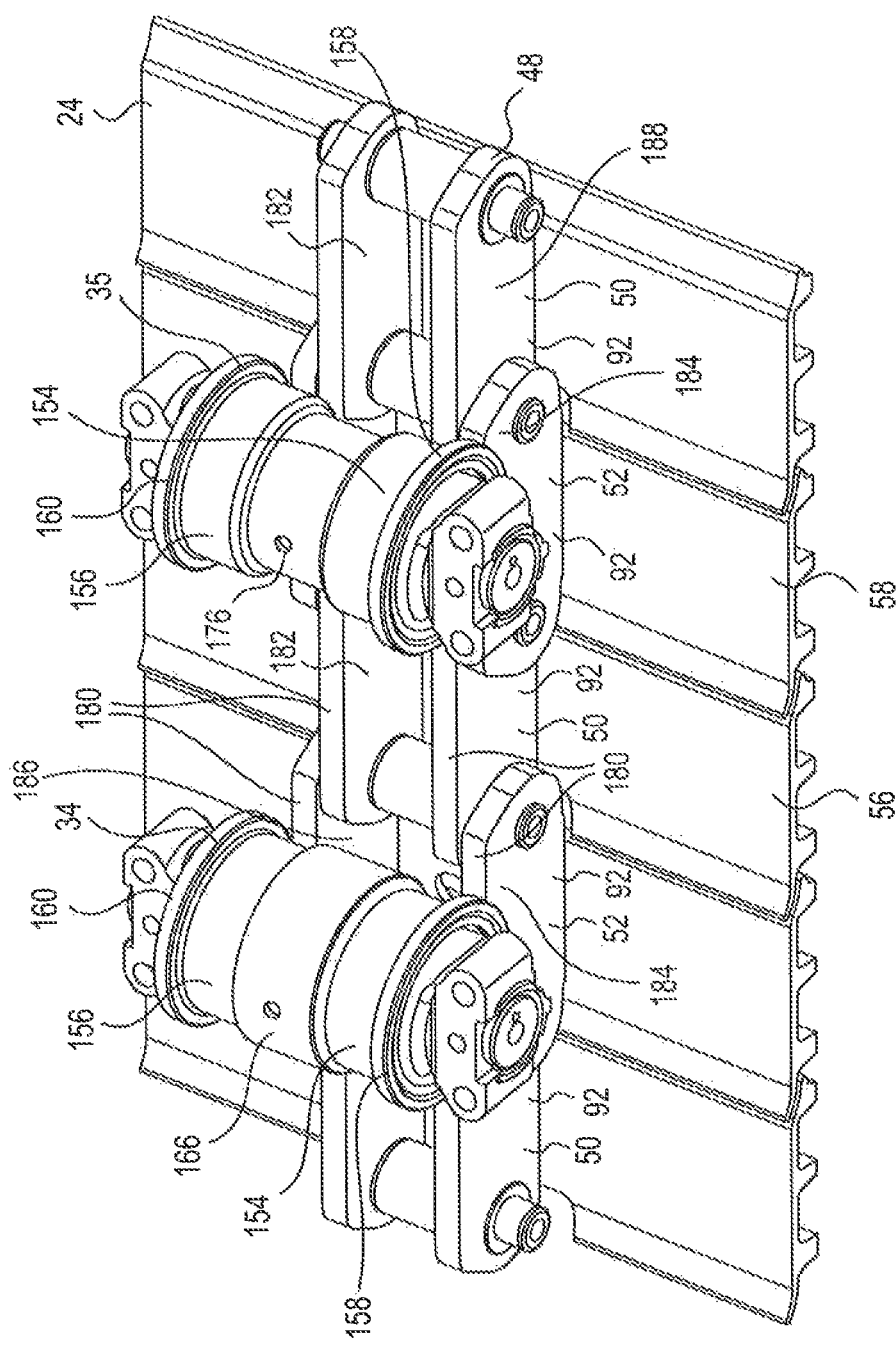
FIG. 8B is a second perspective view of track rollers engaging a track link assembly and shoes according to the present disclosure.
Figure 8C:
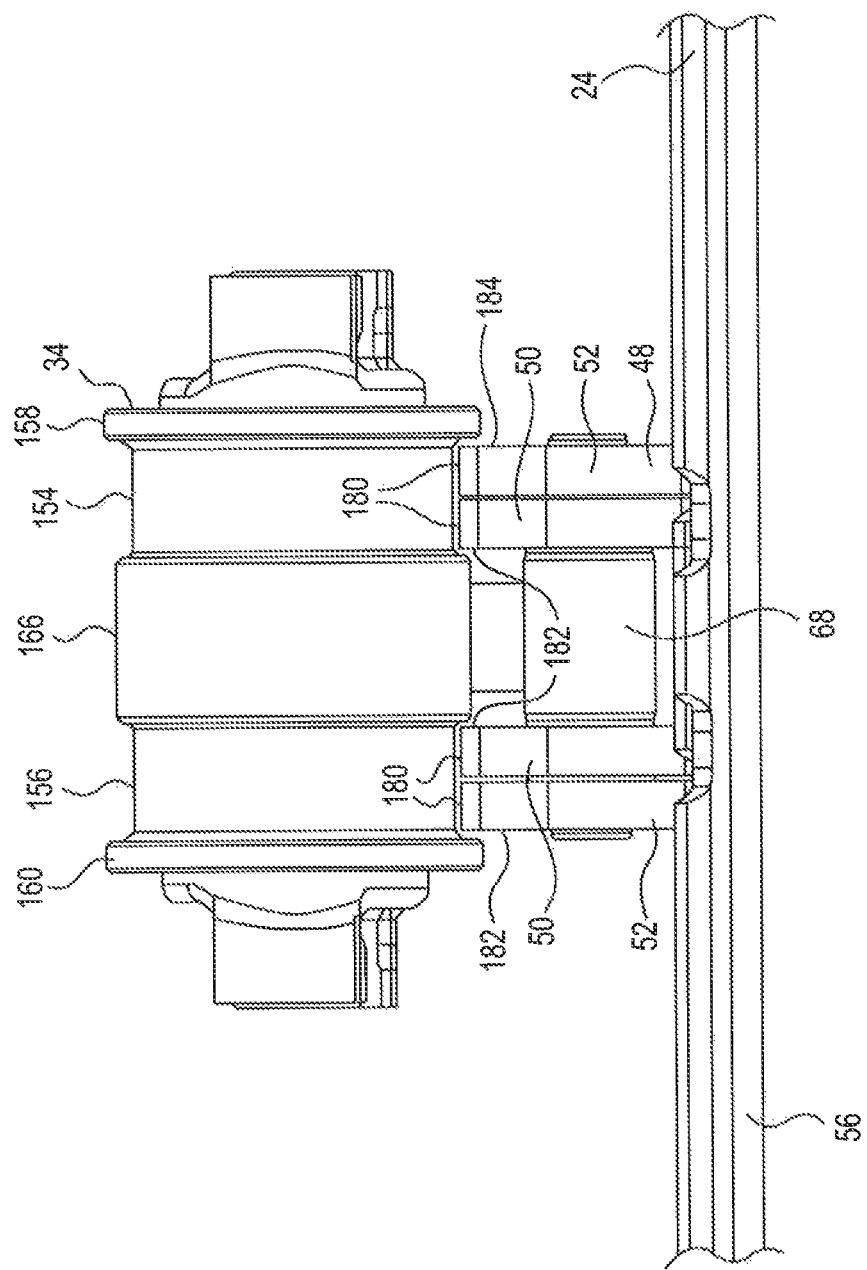
FIG. 8C is an end view of a track roller engaging a track link assembly and shoes according to the present disclosure.
Figure 8D:
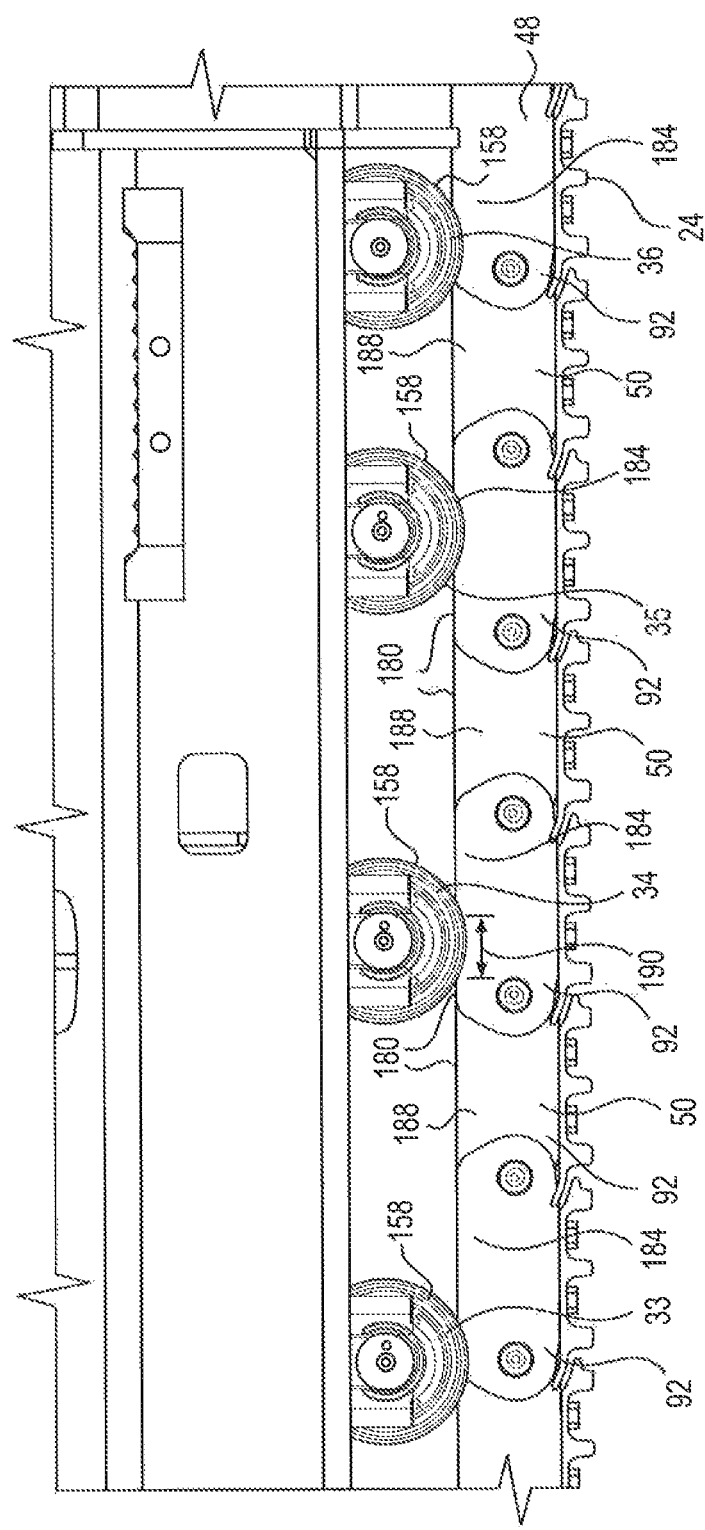
FIG. 8D is a side view of track rollers engaging a track link assembly and shoes according to the present disclosure.

The outer and center guide flanges 158, 160, 166 of rollers 30-34 may guide rollers 30-34 relative to link assembly 48. As best shown in FIG. 8C, when roller treads 154, 156 are riding on roller rails 180 of link assembly 48, outer guide flanges 158, 160 may extend down outside of outer guide surfaces 184 of link assembly 48 formed by outer surfaces 92 of outer links 52. At the same time, center guide flange 166 may extend down between inner guide surfaces 182 of link assembly 48 formed by inner surfaces 90 of inner links 50. As noted above and shown in FIGS. 8A and 8B, inner and outer guide surfaces 182, 184 may be discontinuous, having gaps 186, 188. As shown in FIG. 8D, the gaps 188 in outer guide surfaces 184 may be longer than a chord length 190 of outer guiding flanges 158, 160. The chord length 190 may be the length of a chord across each outer guiding flange 158, 160 coincident with roller rail 180. With gaps 188 having a length greater than the chord length 190 of the outer guiding flanges 158, 160 of rollers 30-34, outer guiding surfaces 184 may not guide outer guiding flanges 158, 160 of a roller 30-34 when the roller 30-34 is disposed in the middle of one of gaps 188. Similarly, gaps 186 of inner guiding surfaces 182 may have lengths greater than a chord length (not shown) of center guiding flange 166, such that inner guiding surfaces 182 may not guide center guiding flange 166 when a roller 30-34 is disposed in the middle of one of gaps 186.

However, including both outer guiding flanges 158, 160 and center guiding flange 166 on rollers 30-34 may ensure proper guiding of rollers 30-34 on link assembly 48 at all times. When one of rollers 30-34 is riding on a pair of outer links 52 in the middle of one of gaps 186 of inner guiding surfaces 182, outer guide flanges 158, 160 may cooperate with the outer surfaces 92 of those outer links 52 to restrain lateral movement between the roller 30-34 and link assembly 48. On the other hand, when one of rollers 30-34 is riding on inner links 50 in the middle of one of gaps 188 in outer guiding surfaces 184, center guide flange 166 may cooperate with inner surfaces 90 of inner links 50 to restrain lateral movement between the roller 30-34 and link assembly 48. When one of rollers 30-34 is riding on ends of both inner links 50 and outer links 52, outer guiding flanges 158, 160 may cooperate with outer surfaces 92 of outer links 52 to provide guiding, while center guiding flange 166 cooperates with inner surfaces 90 of inner links 50 to provide simultaneous guiding.

With rollers 35, 36 omitting center guiding flange 166, additional provisions may be employed to ensure proper guiding of link assembly 48 in the region occupied by rollers 35, 36. For example, track guiding 40-42 may help guide link assembly 48 in the region occupied by rollers 35, 36.

Figure 9A:
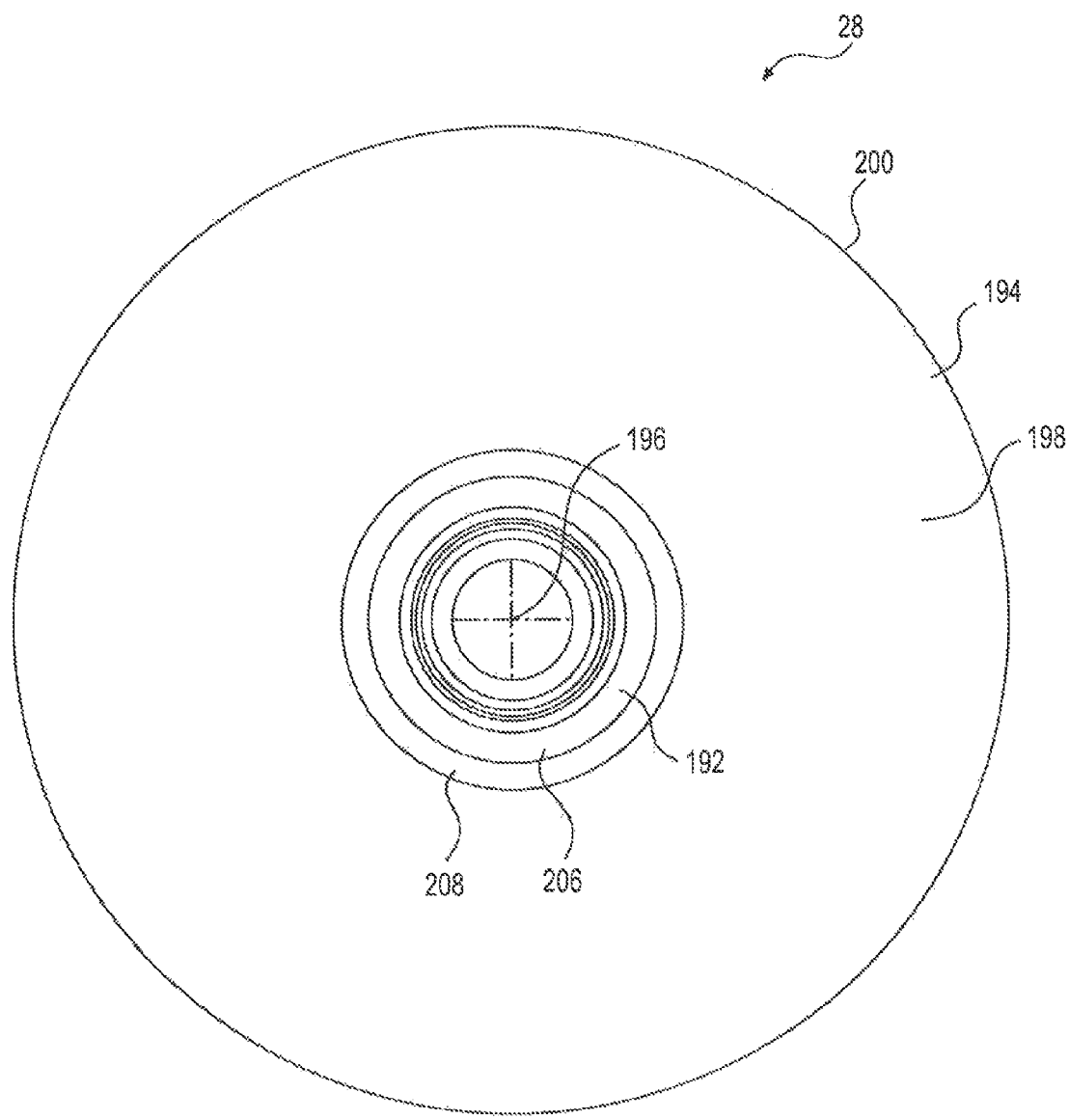
FIG. 9A is a side view of one embodiment of an idler according to the present disclosure.
Figure 9B:
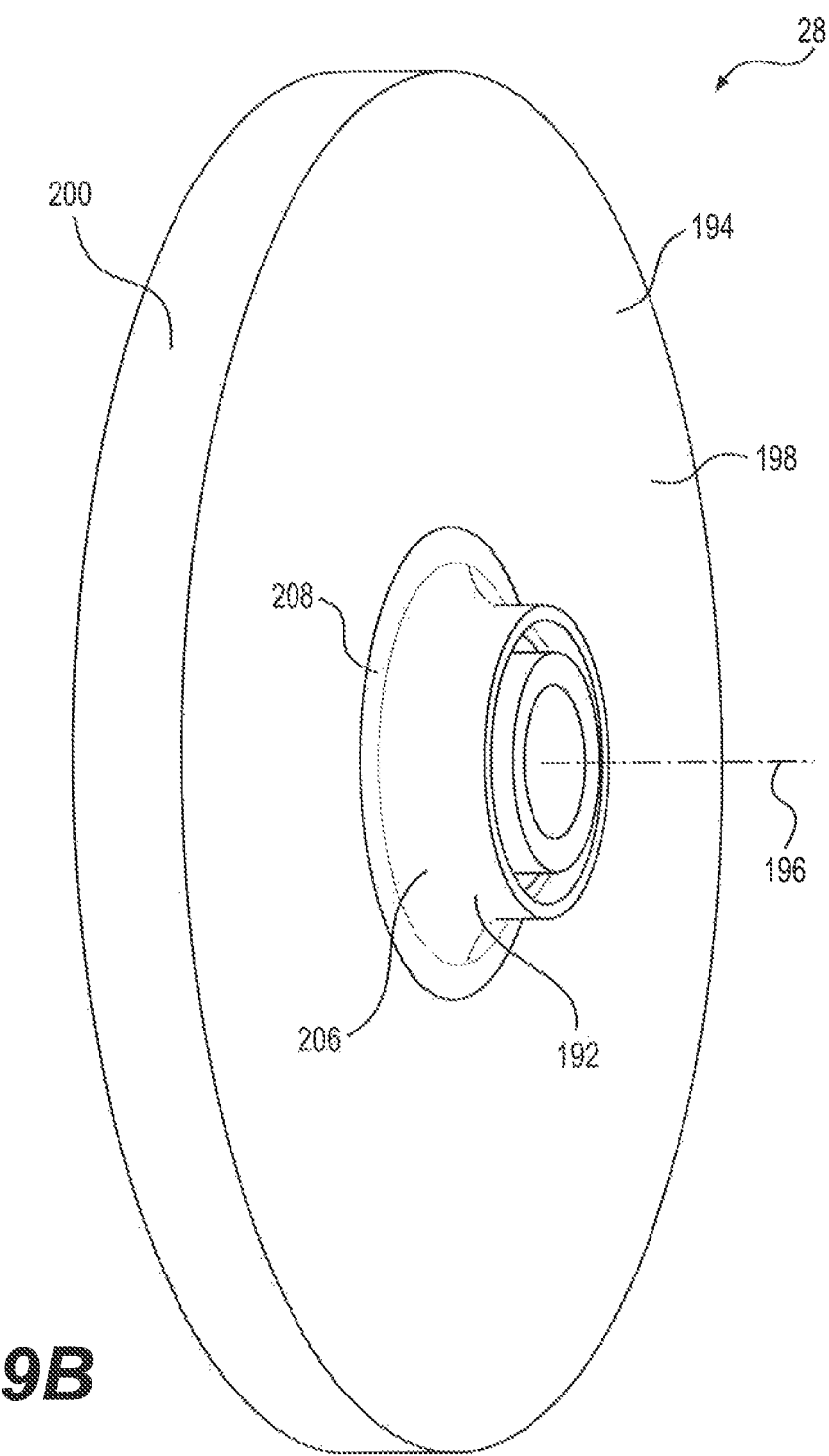
FIG. 9B is a perspective view of the idler of FIG. 9A.
Figure 9C:
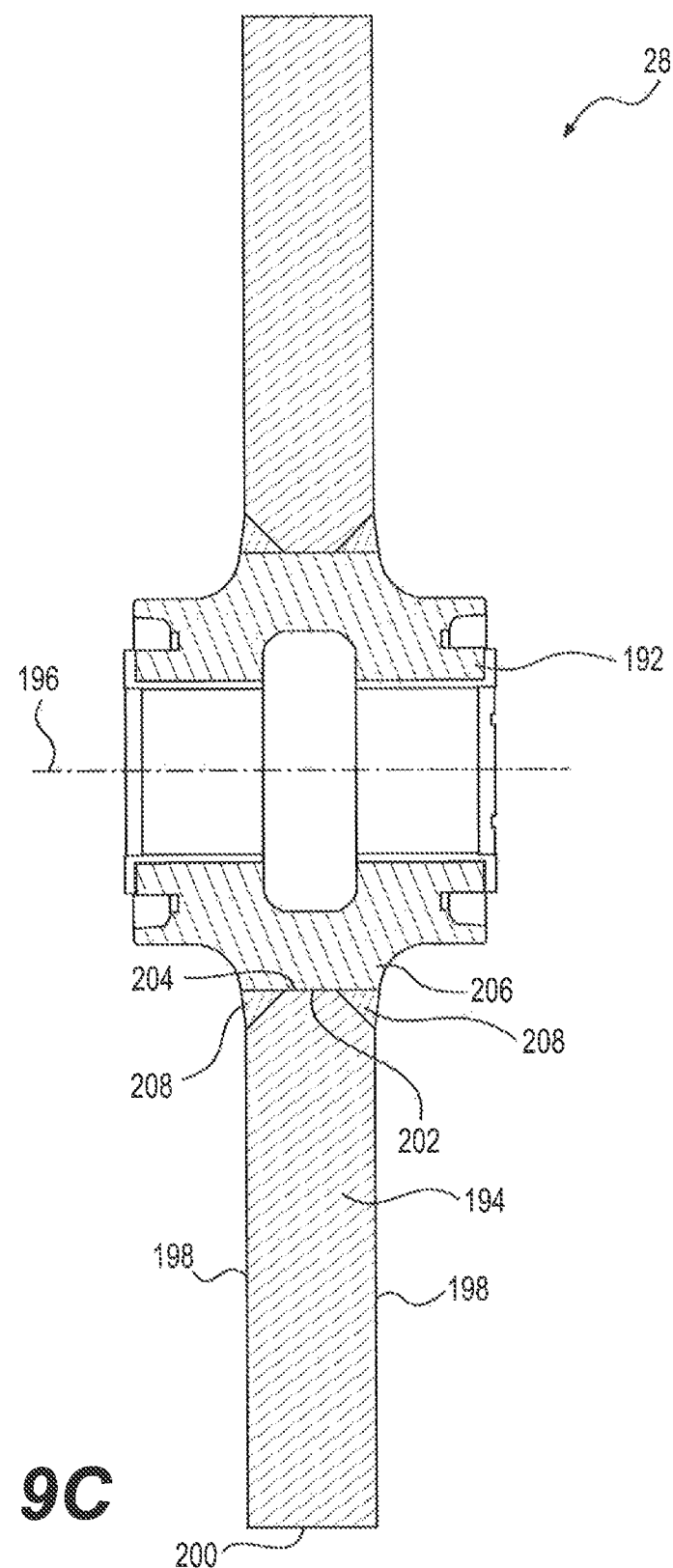
FIG. 9C is a cross-section of the idler of FIG. 9A through its rotational axis.

FIGS. 9A-9C show one embodiment of idler 28 in greater detail. Idler 28 may include a hub 192 and a body 194. Hub 192 may be configured to be connected to track roller frame 22 in such a manner that idler 192 may rotate about a rotational axis 196 relative to track roller frame 22. Body 194 of idler 28 may be fixedly engaged to hub 192.

As best shown in FIG. 9C, in some embodiments, hub 192 may be constructed of a single, unitary piece of parent material. For example, in some embodiments, hub 192 may be machined from a single piece of metal, forged in one piece, or cast in one piece. Alternatively, hub 192 may be formed from multiple pieces joined together by welding, fastening, press-fitting, and/or other means.

Figure 1B:
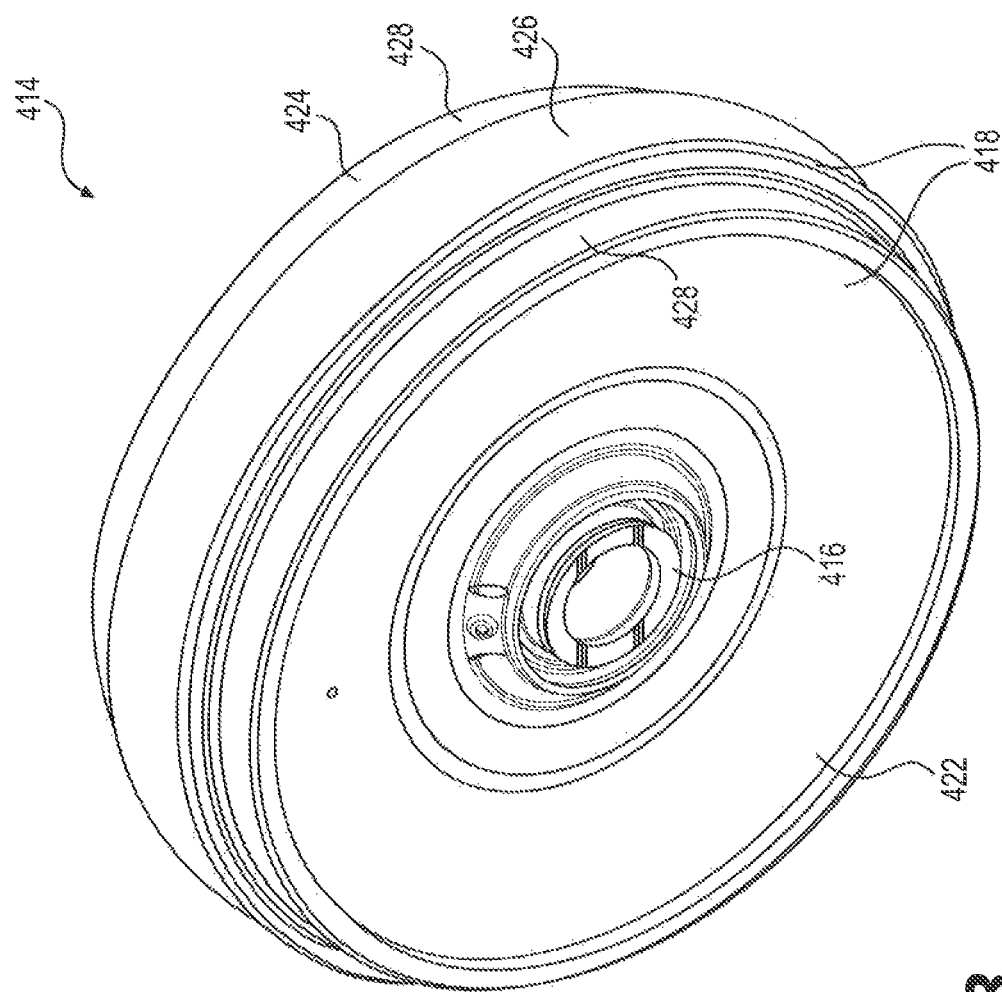
FIG. 1B is a perspective view of a prior art idler.
Figure 1C:
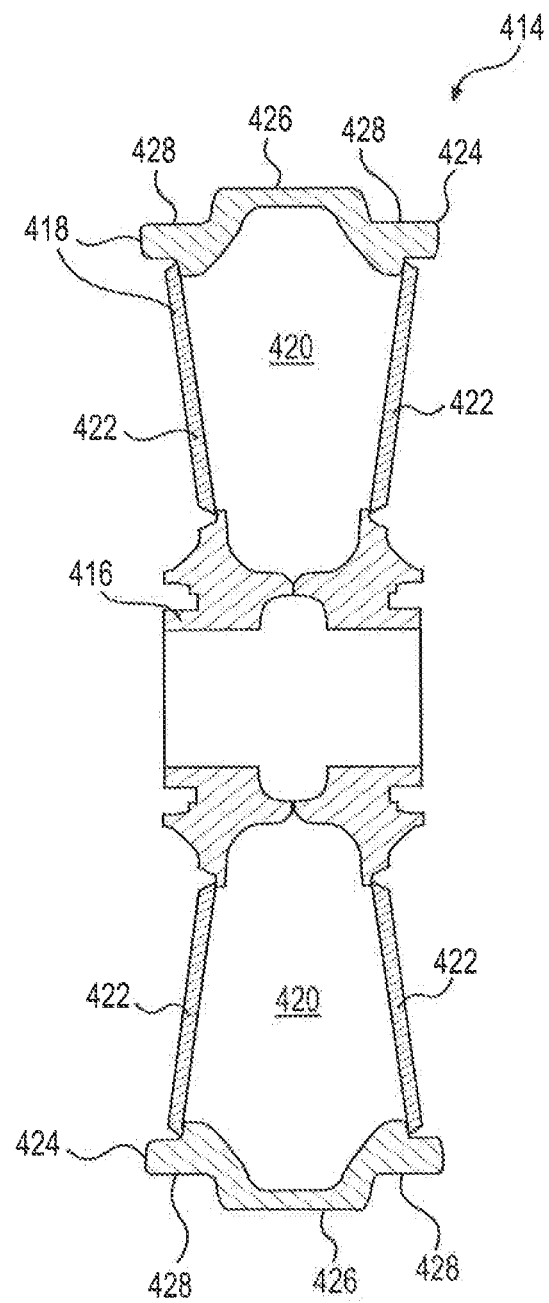
FIG. 1C is a cross-section of a prior art idler.

In some embodiments, body 194 of idler 28 may be a solid disk. Thus, as shown in FIG. 9C, which is a cross-section of idler 28 through its rotation axis 196, body 194 may have no internal cavities like the internal cavity 420 of the idler 414 shown in FIG. 1C. Body 194 may also have substantially planar sides 198. As they extend radially outward, sides 198 may follow substantially straight lines without curves or angles. Additionally, sides 198 may be substantially parallel to one another. At its radially outer perimeter, body 194 may have a center tread surface 200. In contrast to the idler 414 shown FIGS. 1B and 1C, idler 28 may omit tread shoulders 428. In some embodiments, center tread surface 200 may include a substantially cylindrical surface substantially concentric with rotational axis 196. In some such embodiments, the substantially cylindrical portion of center tread 200 may extend from the outer radial portion of one side 198 to the outer radial portion of the other side. In such embodiments, center tread portion 200 may be flat and straight across the full width of body 194. In other embodiments, some portions of center tread portion 200 may curve and/or slope as they extend in the direction of the width of body 194. For example, center tread portion 200 may include radiuses and/or bevels (not shown) adjacent sides 198.

In some embodiments, body 194 of idler 28 may be locally hardened. For example, the radially outer portion of body 194, including center tread 200, may be hardened, while portions radially inward may not be hardened. Local hardening may be achieved by any suitable method, including, but not limited to, induction hardening, flame hardening, hardfacing and/or cladding. Alternatively, body 194 may be uniformly hardened or not hardened at all.

Various approaches may be employed to attach hub 192 and body 194 of idler 28 to one another. In some embodiments, hub 192 may include an outwardly facing mounting face 202, and body 194 may include an inwardly facing mounting face 204 configured to mate with mounting face 202. For example, mounting face 202 may be an outwardly facing cylindrical surface on hub 192, and mounting face 204 may include an inwardly facing cylindrical surface of substantially the same size on body 194. An inwardly facing cylindrical mounting face 204 may be formed, for example, by forming a circular opening in the center of the disk forming body 194. In some embodiments, mounting face 202 of hub 192 may be formed on the radially outer portion of a rib 206 of hub 192. Sides of rib 206 may include concave radiused surfaces, which may limit stress concentrations in these regions. Body 194 may be positioned on hub 192 with mounting face 204 surrounding mounting face 202, and body 194 may be secured in this position using various approaches. In some embodiments, idler 28 may have welds 208 connecting body 194 to hub 192. In combination with or in lieu of welds 208, press-fitting and/or staking may be used to secure body 194 to hub 192.

Figure 10A:
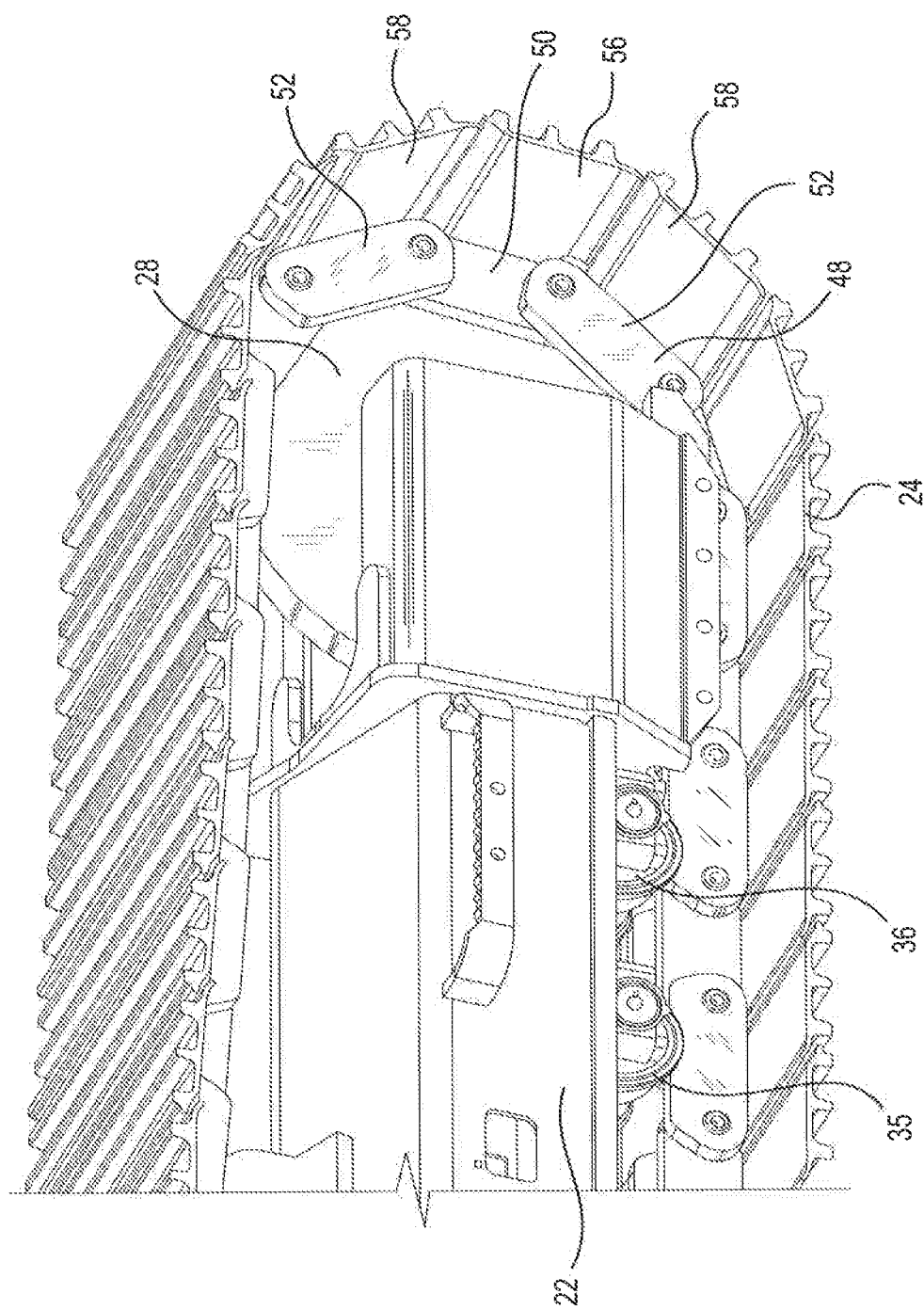
FIG. 10A is a perspective view of the idler of FIG. 9A engaging a track link assembly and shoes according to the present disclosure.
Figure 10B:
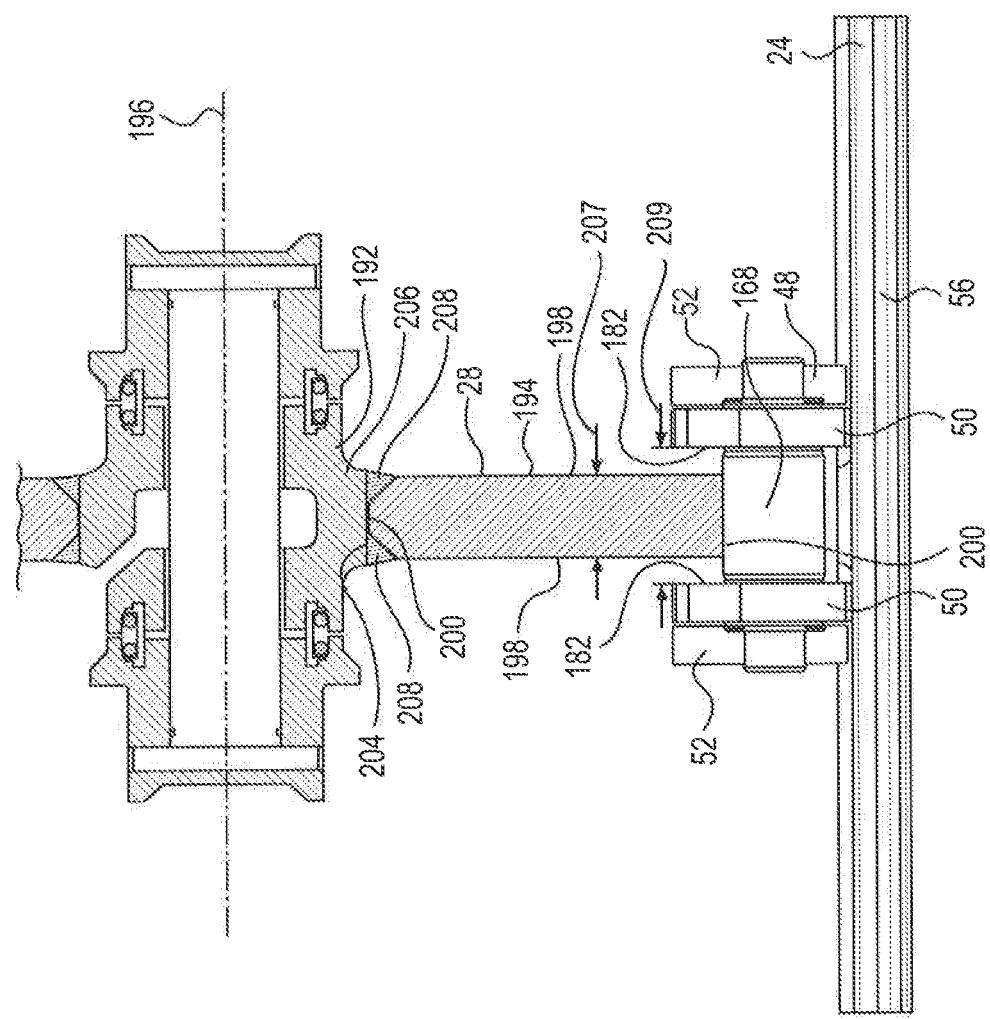
FIG. 10B is a cross-section of the idler of FIG. 9A engaging a track link assembly and shoes according to the present disclosure.
Figure 10C:
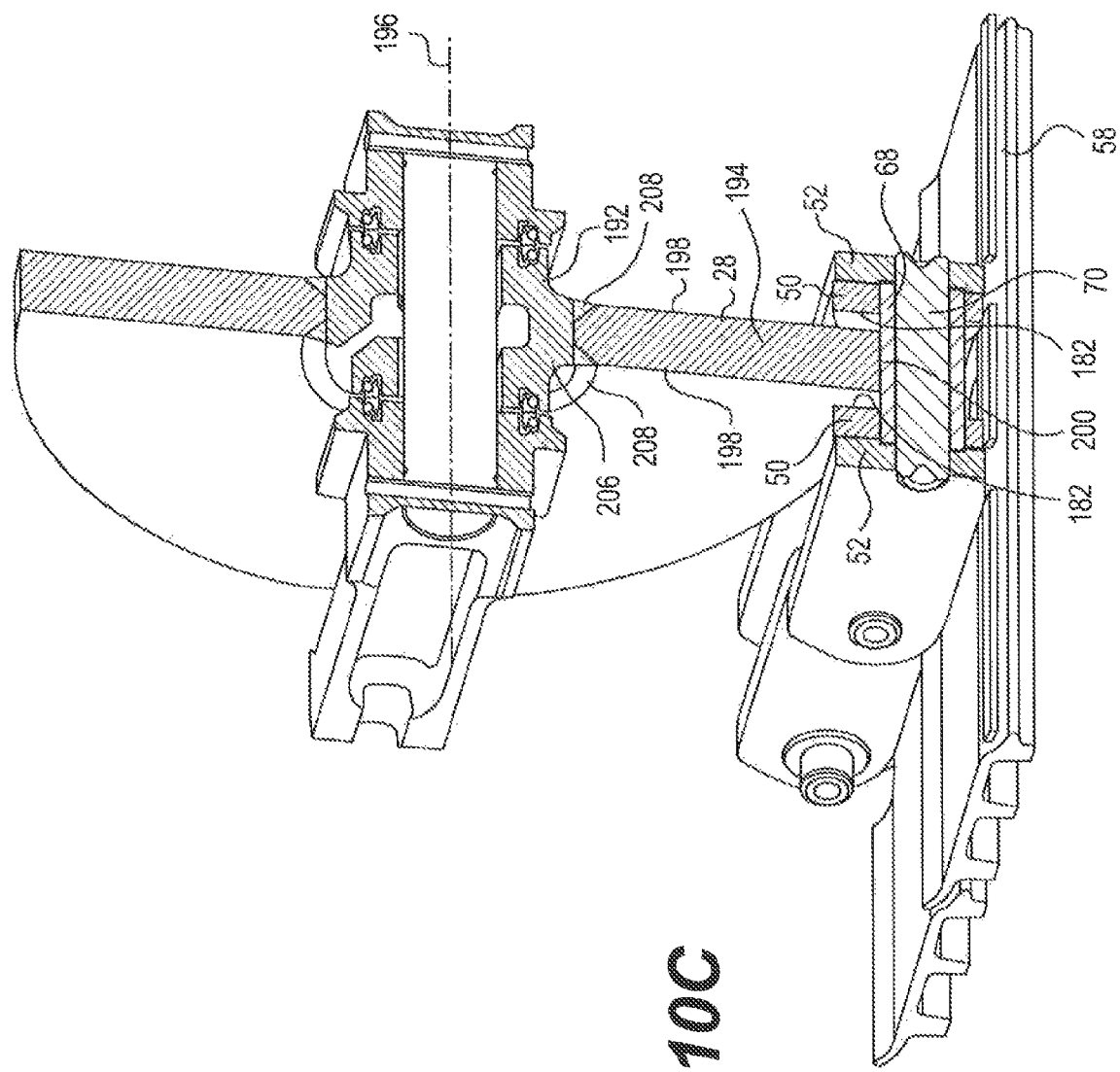
FIG. 10C is cut-away perspective view of the idler of FIG. 9A engaging a track link assembly and shoes according to the present disclosure.
Figure 11B:
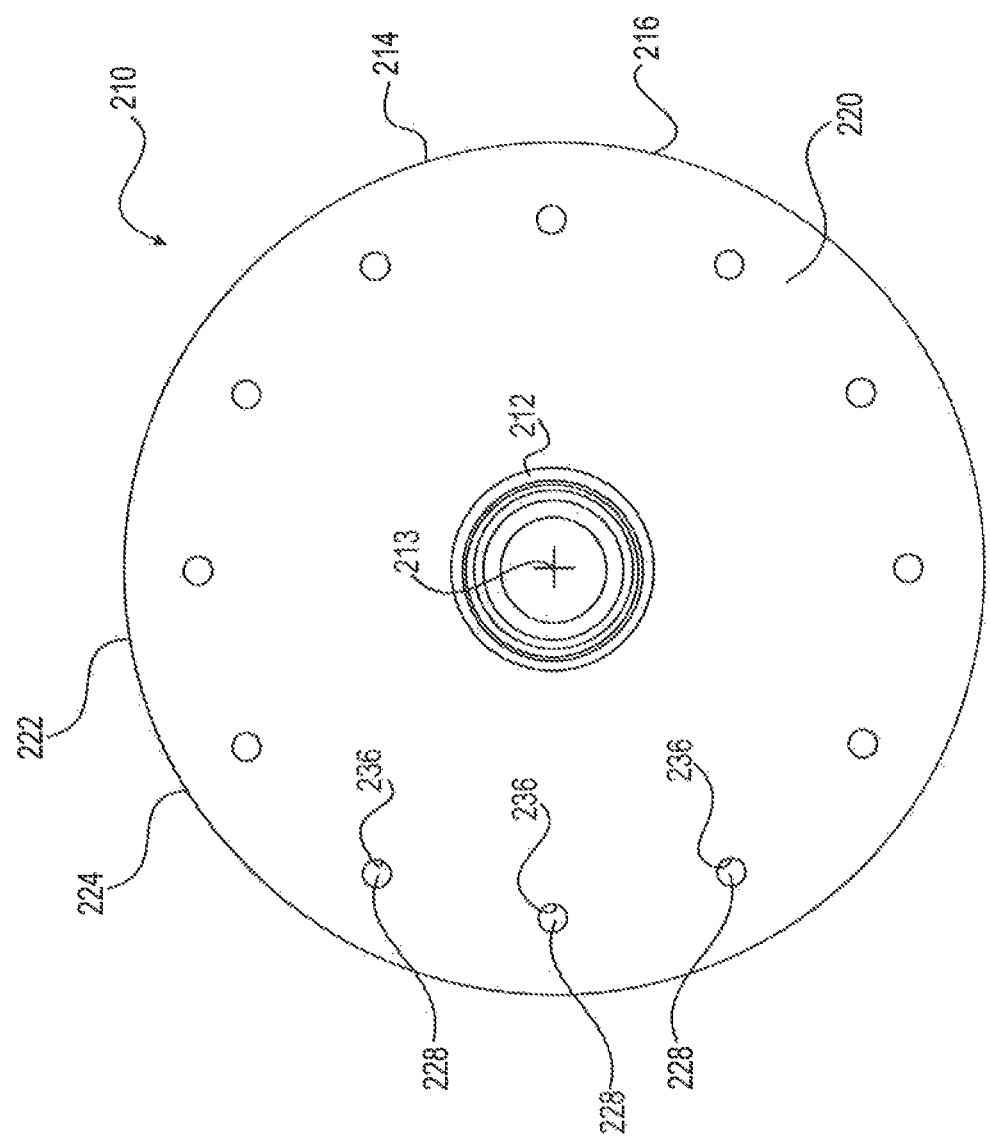
FIG. 11B is a side view of the idler of FIG. 11A.

FIGS. 10A-10C provide greater detail regarding the manner in which idler 28 may engage track 24. As shown in FIG. 10A, an end portion of link assembly 48 of track 24 may wrap around idler 28. As shown in FIGS. 10B and 10C, radially outer portions of body 194 of idler 28 may extend into the spaces between laterally spaced pairs of inner links 50 and outer links 52. This may create some limits on lateral movement between link assembly 48 and idler 28, thereby helping to guide link assembly 48 laterally. Center tread 200 of idler 28 may abut the bushings 68 at the pivot joints 54 of link assembly 48. At the lower side of idler 28, center tread 200 may ride atop one or more of bushings 68, as shown in FIGS. 10B and 10C. At the upper side of idler 28, one or more of bushings 68 may ride atop center tread 200. Abutting center tread 200 against bushings 68 may place body 194 deep within the space between links 50, 52 of link assembly 48, which may help ensure that proper guiding engagement is maintained between idler 28 and link assembly 48

As best shown in FIG. 10B, the disk forming body 194 of idler 28 may have a width 207, and link assembly 48 may have a gap width 209. Gap width 209 may be a lateral distance between the laterally innermost portions of links 50, 52. In the case of the embodiment shown in FIG. 10B, this may be the lateral distance between inner side surfaces 90 of inner links 50. Width 207 of body 194 and gap width 209 may have various values. In some embodiments, width 207 may be at least about 50% of gap width 209. Configuring disk body 194 of idler 28 with a width of at least about this magnitude may help ensure sufficient contact area between center tread surface 200 and bushings 68 to keep stresses at this interface desirably low. Additionally, configuring disk body 194 of idler 28 with a width of at least about 50% of the gap width 209 may help ensure effective lateral guiding between idler 28 and link assembly 48. On the other hand, in some embodiments, width 207 of disk body 194 may have a value of less than about 90% of gap width 209. This may help ensure sufficient clearance between idler 28 and links 50, 52 of link assembly 48 to allow material like dirt and or gravel to escape from this space.

FIGS. 11A-11E illustrate another embodiment of an idler 210. Idler 210 may include a hub 212 and a body 214. Hub 212 may be configured to be connected to track roller frame 22 in a manner such that idler 210 may rotate around a rotation axis 213. Body 214 may be fixedly engaged to hub 212.

Hub 212 may have various configurations. As best shown in FIG. 1D, in some embodiments, hub 212 may have a first side 212A and a second side 212B secured to one another. Sides 212A, 212B may be secured to one another using means including, but not limited to, welding, fastening, and/or press-fitting. Alternatively, in some embodiments, hub 212 may be constructed from a single, unitary piece of parent material.

Body 214 may include two disks 216 laterally spaced relative to one another. Between disks 216, idler 210 may include a gap 226. Each disk 216 may have an inner side surface 218 and an outer side surface 220. In some embodiments, inner and outer side surfaces 218, 220 of each disk 216 may be substantially planar and substantially parallel to one another. Additionally, disks 216 may be substantially parallel to one another with inner and outer side surfaces 218, 220 of one disk 216 substantially parallel to inner and outer side surfaces 218, 220 of the other disk 216. Outer side surfaces 220 of disks 216 may form the outer side surfaces of idler 210. Outer side surfaces 220 of disks 216 may be spaced from one another by a distance less than the distance between inner side surfaces 90 of inner links 50 in link assembly 48, so that idler body 214 may fit between inner links 50.

Outer radial portions of disks 216 may form a split center tread surface 222 of idler 210 for engaging link assembly 48. The outer radial portion of each disk 216 may include, for example, a substantially cylindrical outer surface 224 that forms half of the split center tread surface 222. Like idler 28, idler 210 may omit the depressed tread shoulders 428 possessed by the idler 414 shown in FIGS. 1B and 1C.

Idler body 214 may also include a plurality of reinforcing spacers 228 extending laterally between disks 216 radially outward of hub 212. In some embodiments, reinforcing spacers 228 may be circumferentially spaced from one another. For example, reinforcing spacers 228 may be placed at equal angular intervals around rotation axis 213 of idler 210. Reinforcing spacers 228 may have various configurations. In some embodiments, reinforcing spacers 228 may be bars extending substantially parallel to rotation axis 213 of idler 210. Reinforcing spacers 228 may be round bars with substantially circular cross-sections. Alternatively, reinforcing spacers 228 may be bars with other cross-sectional shapes, including, but not limited to, square, hexagonal, or octagonal. In other embodiments, one or more of reinforcing spacers 228 may have shapes other than bars. For example, in some embodiments, one or more of reinforcing spacers 228 may be plates that extend laterally between disks 216 and radially outward relative to rotation axis 213.

Various approaches may be implemented to engage reinforcing spacers 228 between disks 216. As shown in FIG. 11), in some embodiments, each reinforcing spacer 228 may include a center section 230 and two end sections 232 with smaller cross-sections than the center section 230. Where the center section 230 and end sections 232 meet, each reinforcing spacer 228 may include shoulders 234. Where reinforcing spacers 228 are round bars with substantially circular cross-sections, center section 230 may have a substantially circular cross-section with one diameter, and each end section 232 may have a substantially circular cross-section with a smaller diameter. Each disk 216 may have provisions for mating with end sections 232. For example, disks 216 may include openings 236 that are each configured to receive an end section 232 of one of reinforcing spacers 228. Each opening 236 may have a cross-section large enough to receive an end section 232 but too small to receive center section 230. As shown in FIG. 11D, each reinforcing spacer 228 may have each of its end sections 232 installed in an opening 236 of one of disks 216 with the shoulders 234 of the reinforcing spacer 228 abutted against inner side surfaces 218 of disks 216.

Various means may be used to secure each reinforcing spacer 228 in these positions. In some embodiments, reinforcing spacers 228 may be welded to each disk 216. For example, each end section 232 of a reinforcing spacers 228 may be welded to one of disks 216 at the interface between the end section 232 and the surrounding opening 236. Other securing means may be used in combination with or instead of welding. For example, end sections 232 may be press fit into openings 236.

Various approaches may be used to secure body 214 to hub 212. In some embodiments, hub 212 may include outwardly facing mounting faces 238, and body 214 may include inwardly facing mounting faces 240 configured to mate with mounting faces 238. Mounting faces 240 of body 214 may include, for example, inwardly facing surfaces of central openings in disks 216. In some embodiments, mounting faces 240 may each include an inwardly facing substantially cylindrical surface. In such embodiments, mounting faces 238 may include outwardly facing substantially cylindrical surfaces configured to fit inside of and mate with the inwardly facing substantially cylindrical surfaces of mounting faces 240. Adjacent each mounting face 238, hub 212 may have a laterally outwardly facing shoulder 239. Body 214 may be positioned on hub 212 with inwardly facing mounting surfaces 240 surrounding outwardly facing mounting faces 238 of hub 212 and inner side surfaces 218 of disks 216 abutting shoulders 239. Various means may be used to secure body 214 in this position. In some embodiments, body 214 may be welded to hub 212 at the interface between each inwardly facing mounting face 240 and each outwardly facing mounting face 238. Additionally, or alternatively, body 214 may be press-fit and/or staked to hub 212.

The configuration of the mounting structures for securing body 214 to hub 212 is not limited to the example shown in FIG. 11D. In some embodiments, these mounting structures may have features for suppressing stress concentrations adjacent the interface between body 214 and hub 212. For example, similar to the idler 28 shown in FIGS. 9A-9C, idler 210 may have outwardly facing mounting faces 238 formed on one or more ribs with concave radiused side surfaces.

Idler 210 may engage link assembly 48 in much the same way that idler 28 does. For example, an end portion of link assembly 48 may wrap around idler 210. Additionally, as FIG. 11E shows, outer radial portions of body 214 of idler 210 may extend into spaces between inner and outer links 50, 52 of the portion of link assembly 48 wrapped around idler 210. Thus, radially outer portions of side surfaces 220 of disks 216 may be disposed between inner side surfaces 90, 92 of links 50, 52. The split center tread surface 222 formed by the radially outermost portions of disks 216 may abut bushings 68 between links 50, 52.

Figure 12A:
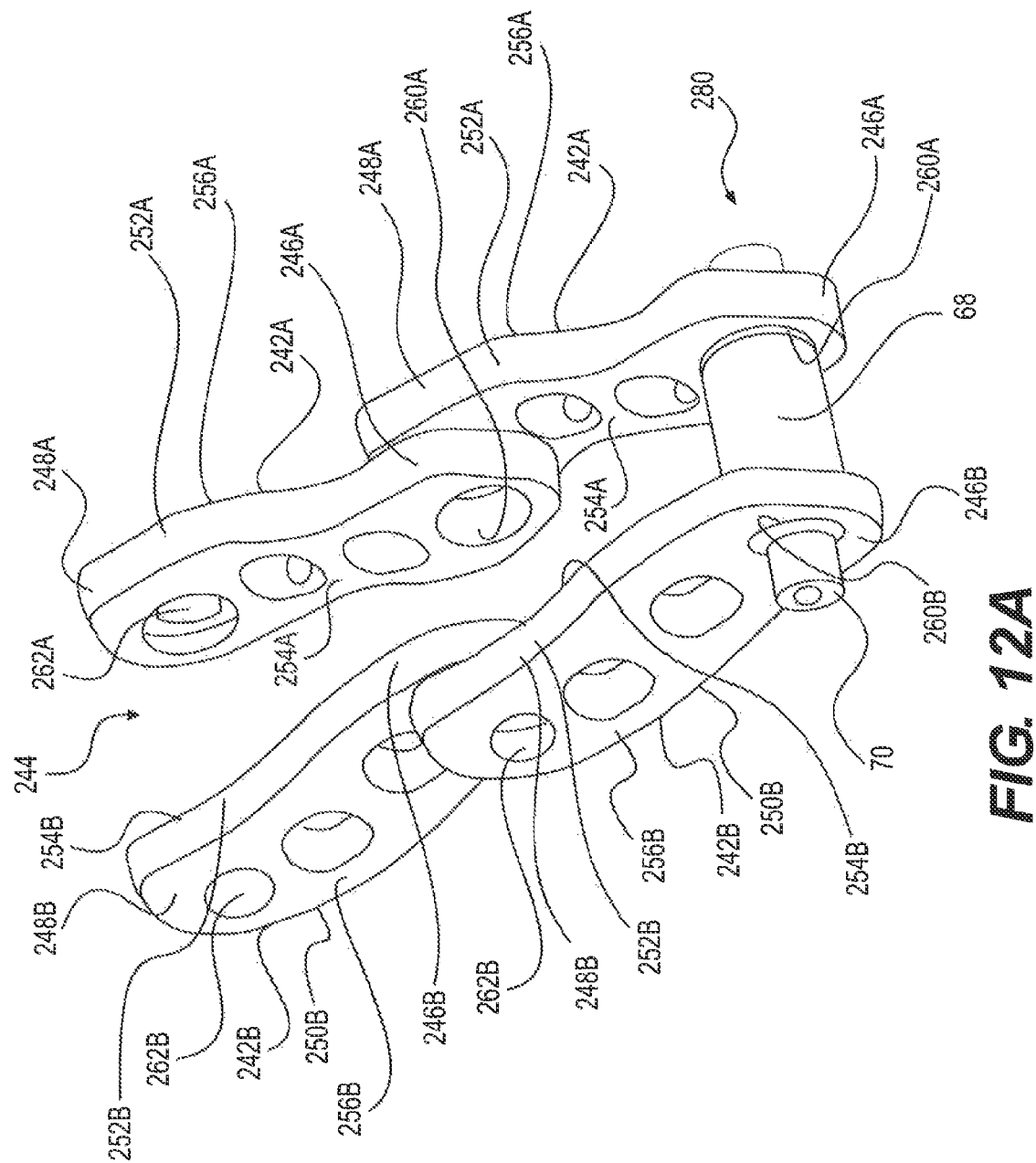
FIG. 12A is a perspective view of a section of another embodiment of a track link assembly according to the present disclosure.

FIG. 12A illustrates another embodiment of a link assembly 244 constructed with a different configuration of track links 242A, 242B. FIGS. 12B-12K illustrate track links 242A, 242B in greater detail. Link 242A may have ends 246A, 248A, a shoe face 250A on its bottom side, a roller rail 252A on its top side, and side surfaces 254A, 256A. As best shown in FIGS. 12D and 12E, ends 246A, 248A, shoe face 250A, and roller rail 252A may collectively form a perimeter 282A of link 242A. Link 242B may have ends 246B, 248B, a shoe face 250B on its bottom side, a roller rail 2521 on its top side, and side surfaces 254B, 256B. As best shown in FIGS. 12I and 12J, ends 246B, 248B, shoe face 25013, and roller rail 252B may collectively form a perimeter 282B of link 242B. In some embodiments, perimeters 282A, 282B of links 242A, 242B may be substantially identical.

In some embodiments, links 242A, 242B may have a nonplanar configuration. As viewed from above, link 242A may offset to the right as it extends from end 246A to end 248A. Between end 248A and end 246A, link 242A may have one or more portions that angle and/or curve to the right. For example, a center section 258A of link 242A may angle and/or curve to the right as it extends away from end 246A toward end 248A. On the other hand, link 242B may have its end 248B offset to the left relative to its end 246B, with a center section 25813 that angles and/or curves to the left as it extends away from end 246B toward end 248B. Thus, the portions of side surfaces 254A, 256A, 254B, 256B adjacent ends 246A, 246B may be laterally offset relative to the portions of side surfaces 254A, 256A, 254B, 256B adjacent ends 248A, 248B. And portions of sides surfaces 254A, 256A, 254B, 256B between ends 246A, 246B and ends 248A, 248B, such as portions in the middle of links 242A, 242B, may curve and/or angle laterally.

Side surfaces 254A, 256A, 254B, 256B may be free of protrusions. In some embodiments, side surfaces 254A and 256A of link 242A may extend substantially parallel to one another. Similarly, side surfaces 254B and 256B of link 242B may extend substantially parallel to one another. Link 242A may have a substantially constant thickness (i.e., the distance between its side surfaces 246A and 248A) between its ends 246A and 248A. Similarly, link 242B may have a substantially constant thickness (i.e., the distance between its side surfaces 246B and 248B) between its ends 246B and 248B. Additionally, in some embodiments, at each point between ends 246A, 248A, each of sides surfaces 254A, 256A may extend straight vertically. Similarly, at each point between ends 246B, 248B, each of sides surfaces 254B, 256B may extend straight vertically.

Links 242A, 242B may be constructed with various amounts of offset. In some embodiments, the lateral offset between the ends 246A, 248A of link 242A may be substantially the same as the thickness between its sides 254A, 256A. Additionally, the portion of side surface 256A at end 246A may be substantially coplanar with the portion of side surface 254A at end 248A. Similarly, the lateral offset between the ends 246B, 248B of link 242B may be substantially the same as the thickness between its sides 254B, 256B, and the portion of side surface 256B at end 246B may be substantially coplanar with the portion of side surface 254B at end 248B.

Figure 12C:
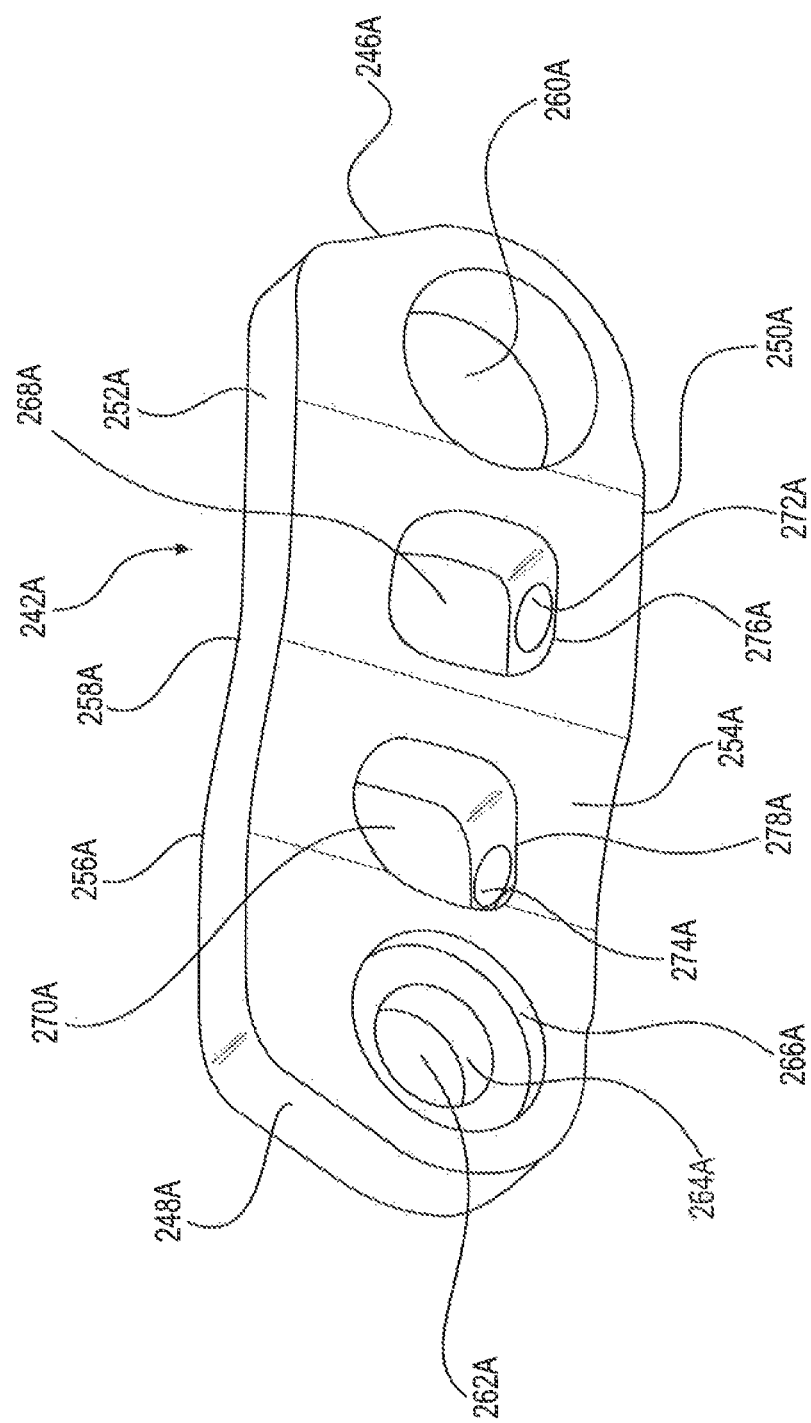
FIG. 12C is a perspective view of the track link of FIG. 12B from another side.
Figure 12D:
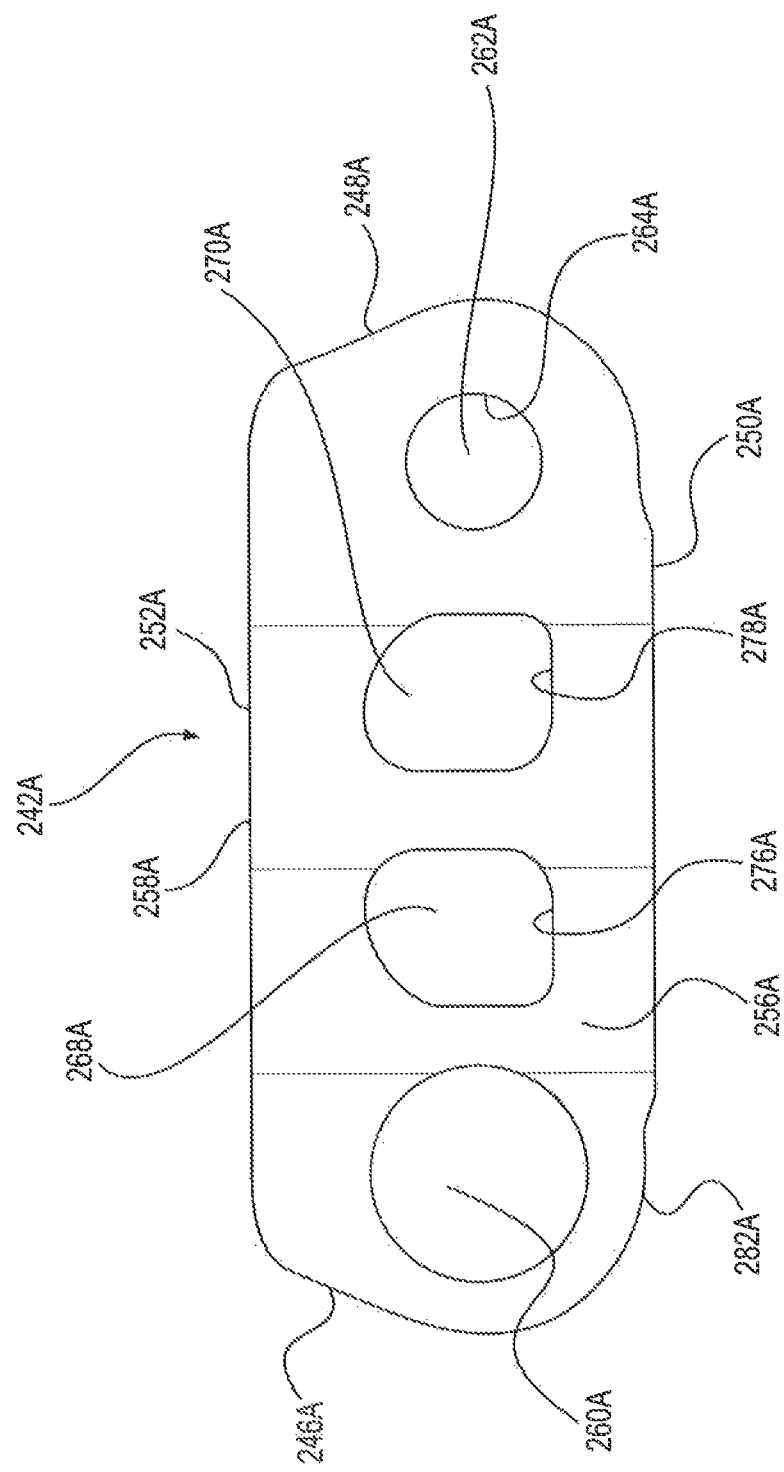
FIG. 12D is a side view of the track link of FIG. 12B from the side of FIG. 12B.
Figure 12E:
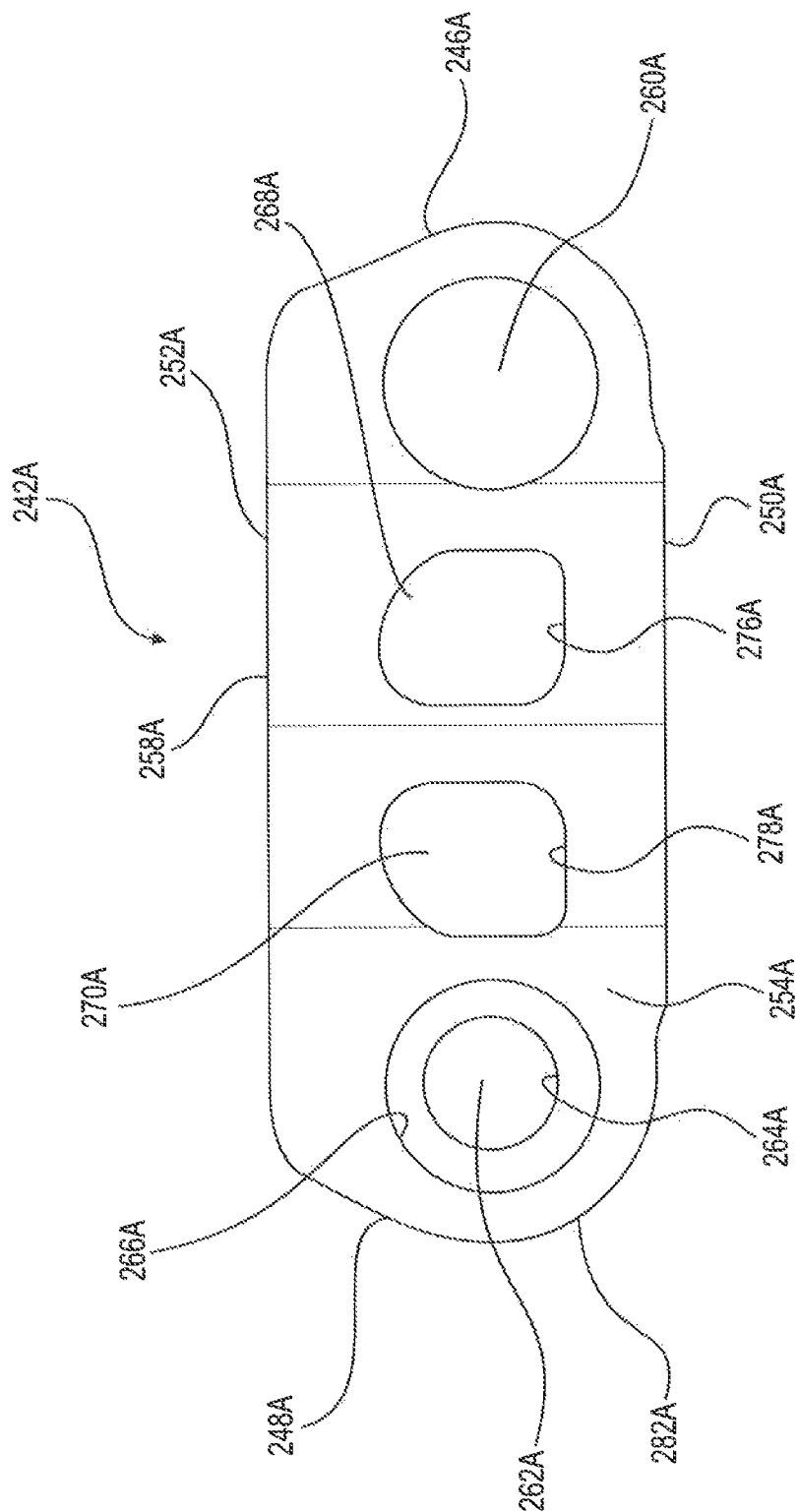
FIG. 12E is a side view of the track link of FIG. 12B from the side of FIG. 12C.
Figure 12F:
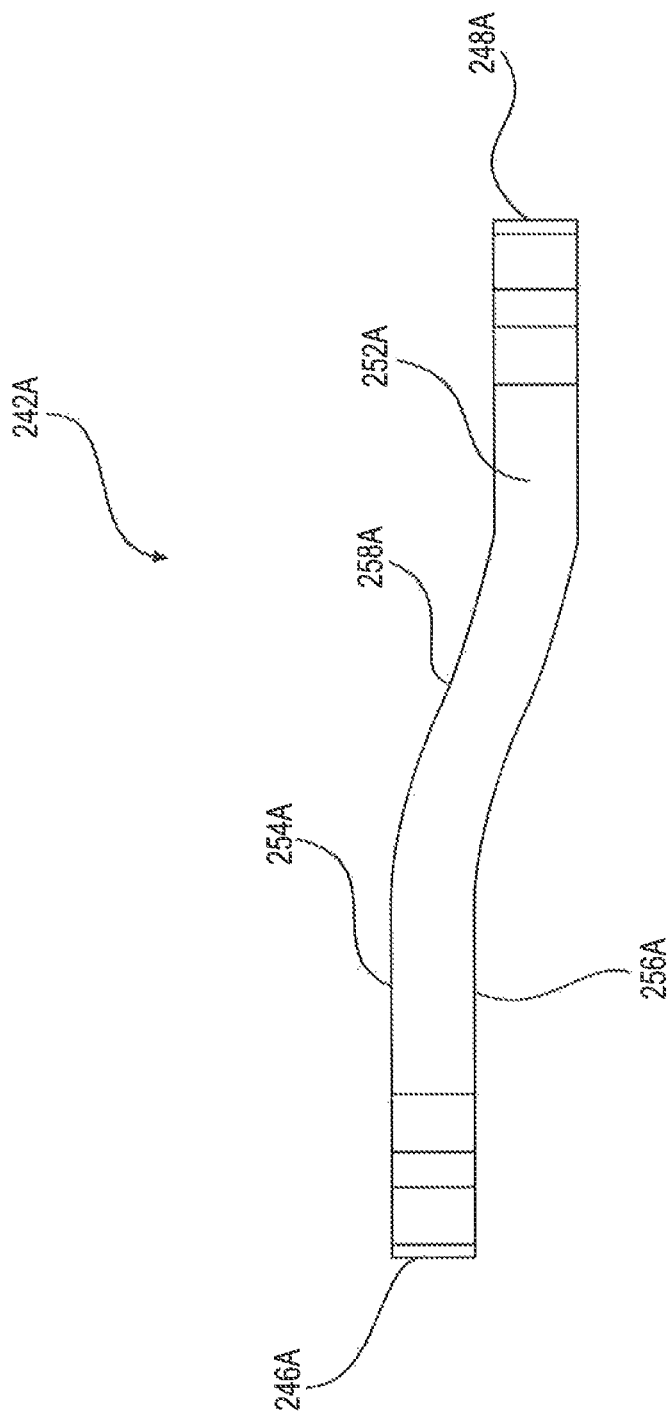
FIG. 12F is a top view of the track link of FIG. 12B.
Figure 12G:
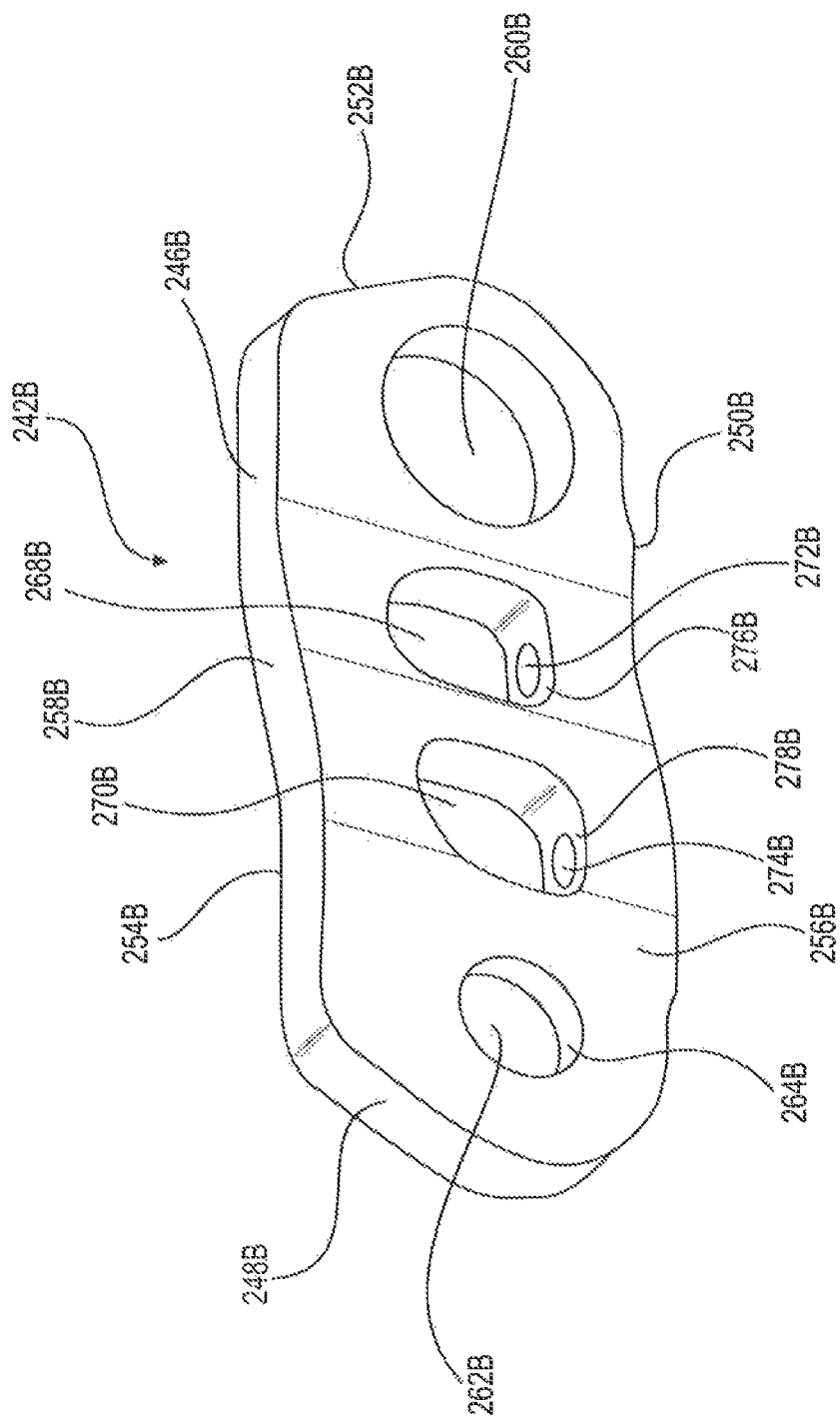
FIG. 12G is a perspective view of another one of the track links of FIG. 12A from one side.
Figure 12H:
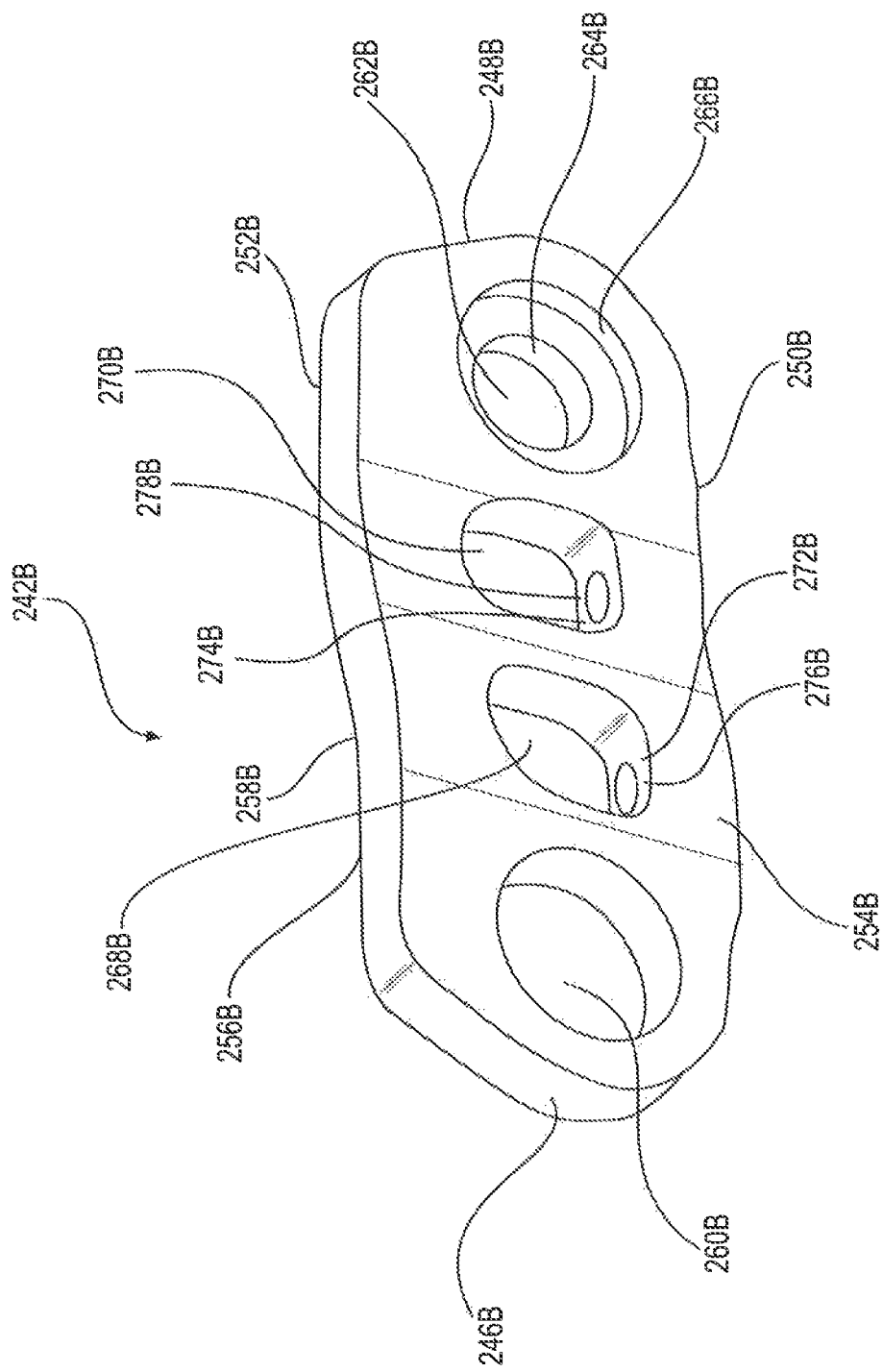
FIG. 12H is a perspective view of the track link of FIG. 12G from another side.
Figure 12I:
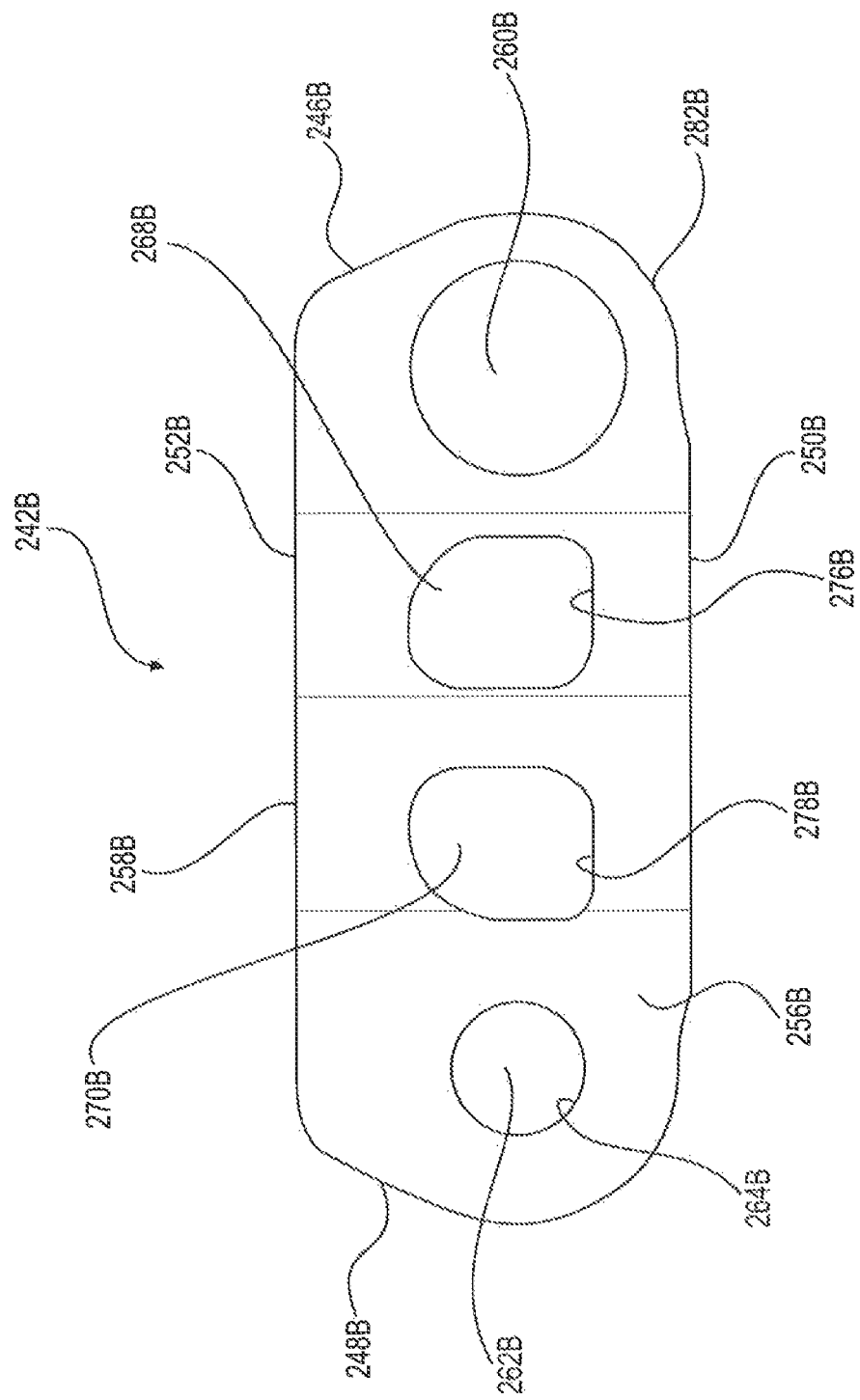
FIG. 12I is a side view of the track link of FIG. 12G from the side of FIG. 12G.
Figure 12J:
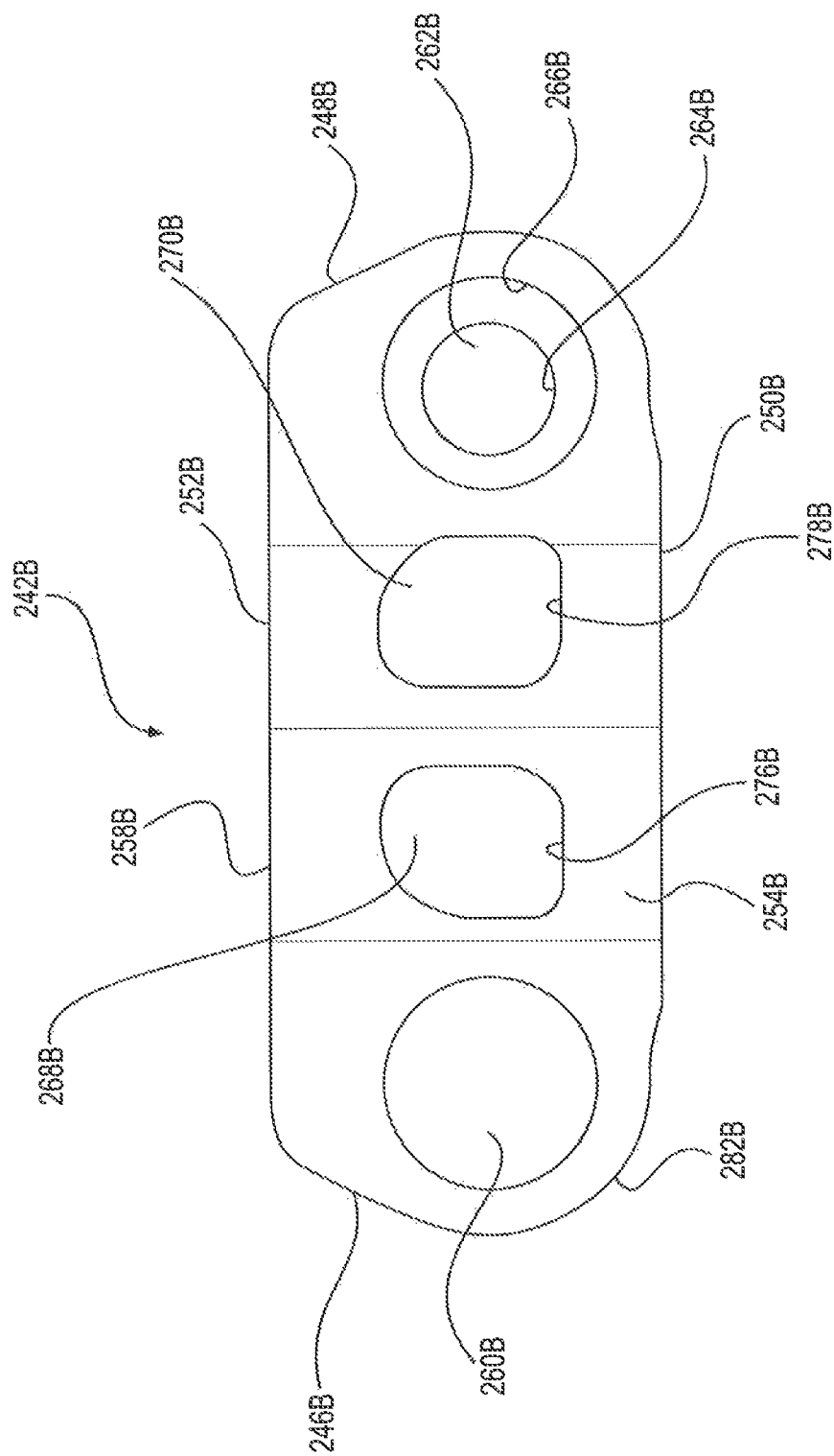
FIG. 12J is a side view of the track link of FIG. 12G from the side of FIG. 12H.
Figure 12K:
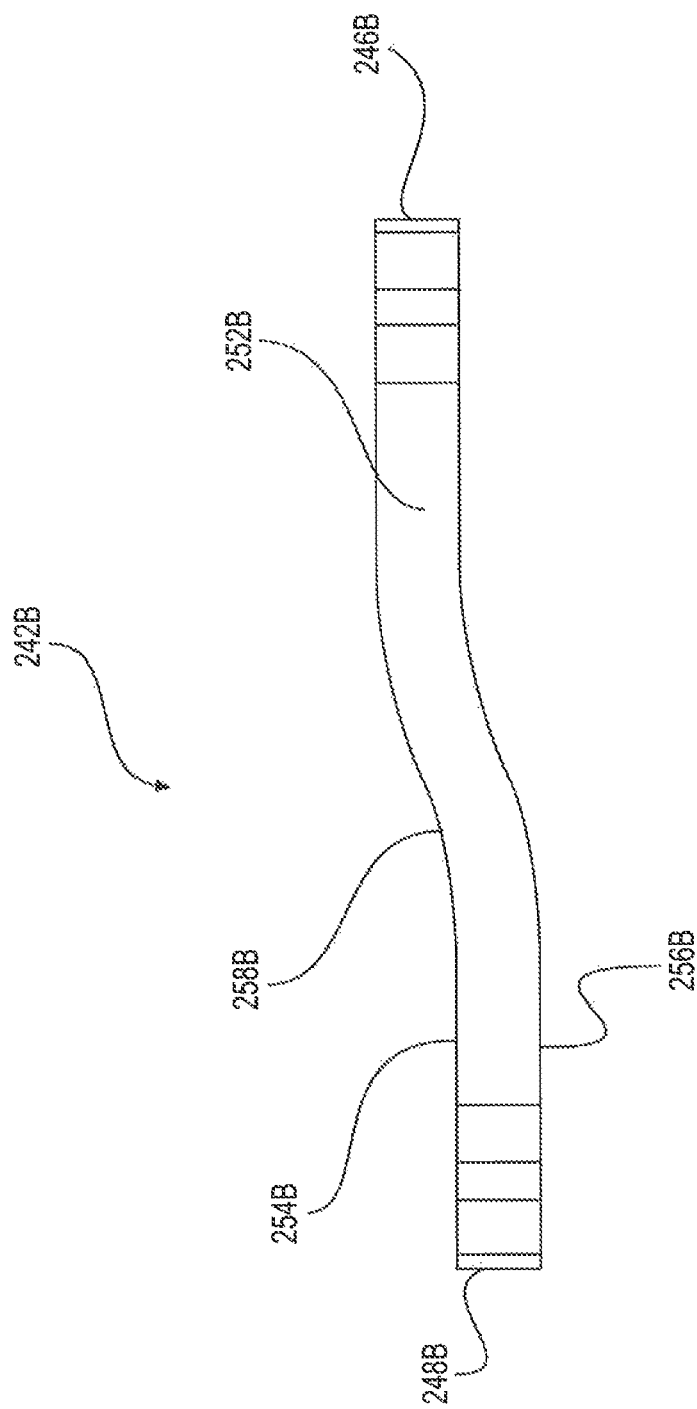
FIG. 12K is a top view of the track link of FIG. 12G.

As best shown in FIGS. 12C and 12H, links 242A, 242B may include openings 260A, 260B adjacent their ends 246A, 246B. Opening 260A may extend through link 242A between its side surfaces 254A, 256A. Similarly, opening 260B may extend through link 242B between its side surfaces 254B, 256B. Each of openings 260A may be configured to receive the bushing 68 discussed above. For example, each of openings 260A may be configured to have a press-fit with bushing 68.

Links 242A, 242B may also include openings 262A, 262B adjacent their ends 248A, 248B. Opening 262A may extend through link 242A between its side surfaces 254A, 256A. Opening 262A may include a pin bore 264A and a counterbore 266A. Counterbore 266A may extend from side surface 254A into link 242A. Pin bore 264A may extend from the inner portion of counterbore 266A to side surface 256A. Similarly, opening 262B may include a counterbore 266B extending from side surface 254B into link 242B, as well as a pin bore 264B extending from the inner portion of counterbore 266B to side surface 256B.

Each pin bore 264A, 264B and counterbore 266A, 266B may have various configurations. In some embodiments, each pin bore 264A, 264B may be configured to receive an end of one of the pins 70 discussed above. For example, in some embodiments, each pin bore 264A, 264B may be configured to have a press-fit with one end of one of pins 70. Each counterbore 266A, 266B may have a cross-section larger than the cross-section of the associated pin bore 264A, 264B. In some embodiments, each counterbore 266A, 266B may have a cross-section larger than end portions of bushing 68. This may enable each counterbore 266A, 266B to receive an end portion of a bushing 68 while allowing relatively free rotation between the bushing 68 and the counterbore 266A, 266B.

Each counterbore 266A, 266B may also be configured to partially or fully contain one of the seals 82 in the manner discussed above in connection with FIG. 4C. Each counterbore 266A, 266B may, for example, have a length of between about 1 and about 5 times the in-use length of seal 82. Additionally, the length of each counterbore 266A, 266B may be less than about ¼ of the thickness of the link 242A, 242B. Thus, the length of each counterbore 266A, 266B may be less than about ⅓ of the length of the associated pin bore 264A, 264B.

In addition to openings 260A, 260B, 262A, 262B, links 242A, 242B may include other openings. For example, link 242A may include windows 268A, 270A extending from side surface 254A to side surface 256A. Similarly, link 242B may include windows 268B, 270B extending from side surface 254B to side surface 256B.

Links 242A, 242B may include various types of shoe-mounting structure. In some embodiments, link 242A may include mounting holes 272A, 274A extending from shoe face 250A to nut seats 276A, 278A at the bottom sides of windows 268A, 270A. Similarly, link 242B may include mounting holes 272B, 274B extending from shoe face 250B to nut seats 276B, 278B at the bottom sides of windows 268B, 270B. Nut seats 276A, 278A, 276B, 278B may include substantially planar surfaces adjacent mounting holes 272A, 274A, 272B, 274B. Mounting holes 272A, 274A, 272B, 274B may be used to secure track shoes to links 242A, 242B by installing bolts through openings in the track shoes into mounting holes 272A, 274A, 272B, 274B and securing nuts on the ends of the bolts against nut seats 276A, 278A, 276B, 278B. The track shoes to be mounted to links 242A, 242B would have mounting holes arranged to align with mounting holes 272A, 274A, 272B, 274B.

The shoe-mounting structure of links 242A, 242B is not limited to the configurations shown in FIGS. 12B-12K. In some embodiments, for example, links 242A, 242B may have blind, threaded mounting holes (like mounting holes 100, 102 discussed above) extending up from shoe faces 250A, 250B. In such embodiments, the mounting holes may include threaded portions and unthreaded counterbores with the same dimensions and configurations discussed above in connection with links 50, 52. Alternatively, the shoe-mounting structure of links 242A, 242B may include features for riveting, welding, or otherwise securing track shoes.

As shown in FIG. 12A, in link assembly 244, each link 242A may be paired with and laterally spaced from a link 242B. Each pair of links 242A, 242B may have side surfaces 254A, 254B facing each other, such that links 242A, 242B splay laterally outward from one another as they extend from their ends 246A, 246B to their ends 248A, 248B. This may allow the ends 246A, 246B of one pair of links 242A, 242B to fit between the ends 248A, 248B of another pair of links 242A, 242B with openings 260A, 260B of one pair of links 242A, 242B substantially aligned with openings 262A, 262B of the other pair of links 242A, 242B.

Each pair of links 242A, 242B may be pivotally connected to the adjacent pair of links 242A, 242B at a pivot joint 280. Openings 260A, 260B of one pair of links 242A, 242B may be secured around a bushing 68. For example, in some embodiments, openings 260A, 260B of a first pair of links 242A, 242B may be press-fit around end portions of bushing 68, which may hold the first pair of links 242A, 242B in laterally spaced relationship and prevent rotation between the first pair of links 242A, 242B and the bushing 68. A pin 70 may be installed inside the through bore 74 of bushing 68 with ends of the pin 70 protruding out of each end of the bushing 68. A second pair of laterally spaced links 242A, 242B may have its openings 262A, 262B secured around the ends of pin 70, such as by press-fitting. This may fix the second pair of links 242A, 242B in laterally spaced relation with its link ends 248A, 248B disposed outward of the link ends 246A, 246B of the first pair of links 242A, 242B. With the second pair of links 242A, 242B fixed to pin 70 and the first pair of links 68 fixed to bushing 68, pin 70 may rotate within bushing 68, allowing the second pair of links 242A, 242B and pin 70 to pivot relative to the first pair of links 242A, 242B and bushing 68.

Figure 13A:
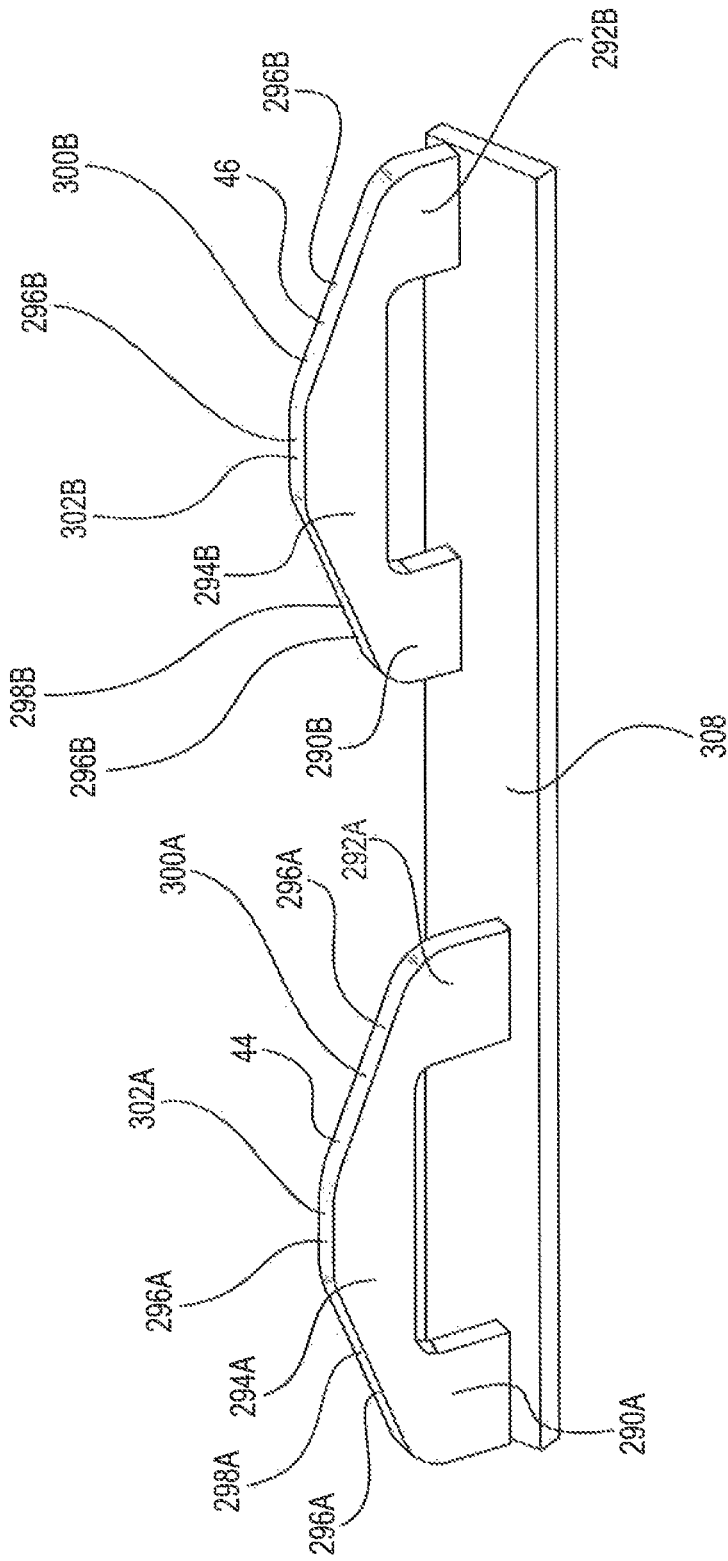
FIG. 13A is perspective view of carrier skids mounted to an inclined surface according to one embodiment of the present disclosure.
Figure 13B:
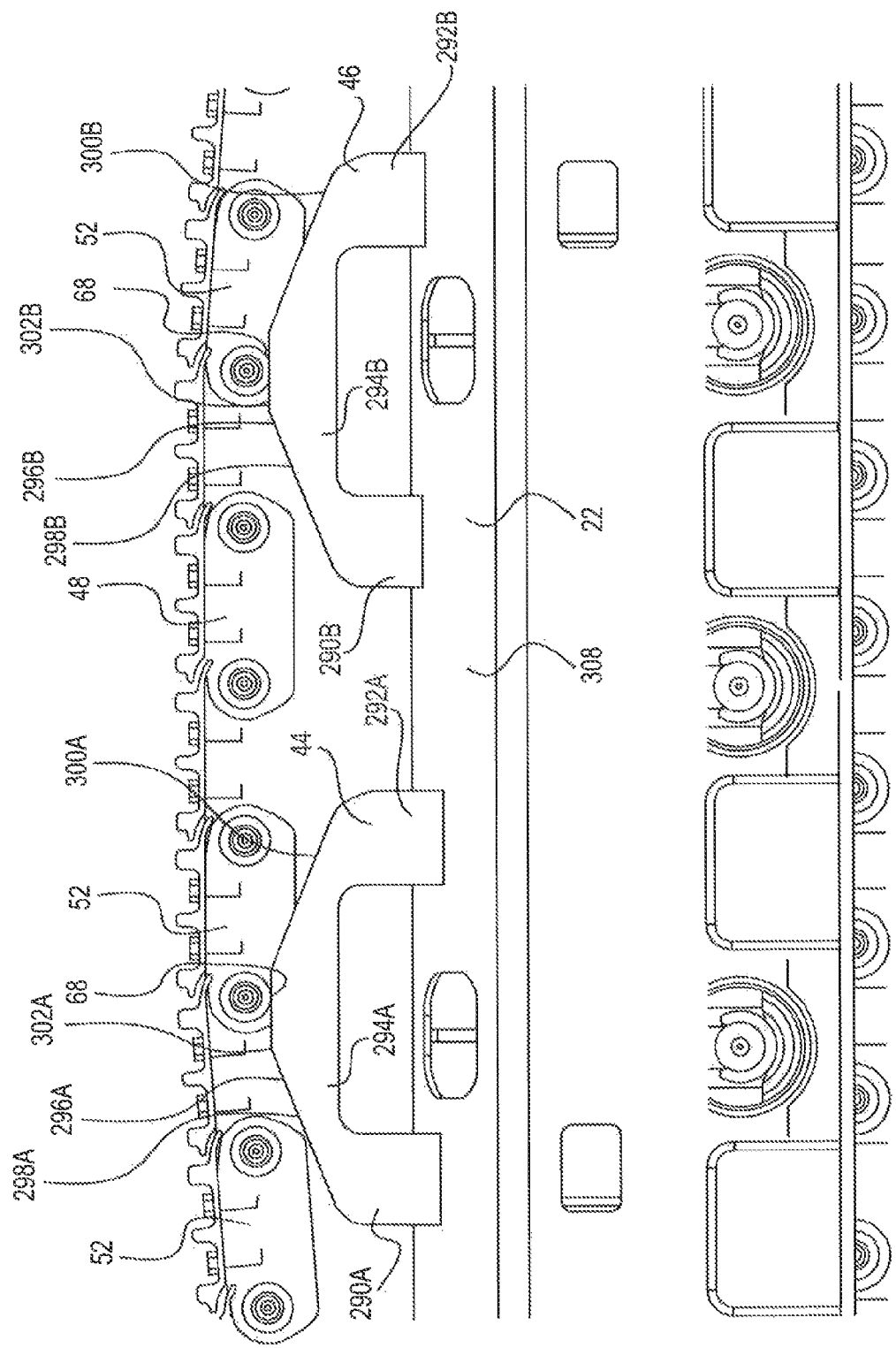
FIG. 13B is a side view of the carrier skids of FIG. 13A assembled in an undercarriage system.
Figure 13C:
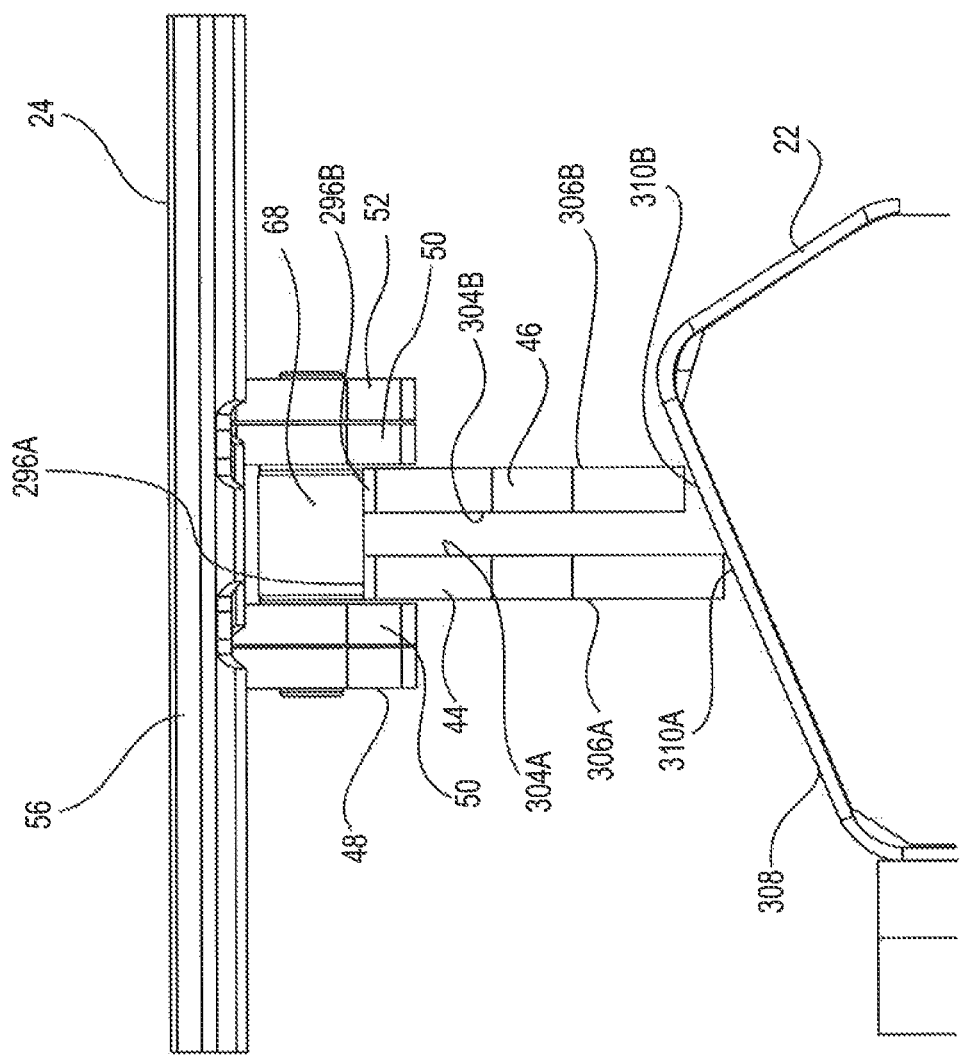
FIG. 13C is an end view of the carrier skids of FIG. 13A assembled in an undercarriage system.

FIGS. 13A-13C show carriers 44, 46 in greater detail. In the embodiment shown in the drawings, carriers 44, 46 are carrier skids. FIG. 13A shows carrier skids 44, 46 and a portion of track roller frame 22 separate from the rest of undercarriage system 14. FIG. 13B is a close up side view of carrier skids 44, 46 assembled in undercarriage system 14. FIG. 13C is a close up end view of carrier skids 44, 46 assembled in undercarriage system 14. Carrier skid 44 may include a first vertically extending leg 290A, a second vertically extending leg 292A, and a bridge 294A connecting first and second vertically extending legs 290A, 292A. In some embodiments, first vertically extending leg 290A, second vertically extending leg 292A, and bridge 294A may be constructed from a piece of plate material. An upper side of bridge 294A may include a first carrier surface 296A. Carrier surface 296A may include a first ramp 298A that slopes upward as it extends away from first vertically extending leg 290A toward second vertically extending leg 292A. Carrier surface 296A may also include a second ramp 300A that slopes upward as it extends away from the second vertically extending leg 292A toward the first vertically extending leg 290A. In some embodiments, carrier surface 296A may include a crown 302A disposed between ramps 298A, 300A.

Carrier skid 46 may include a first vertically extending leg 290B, a second vertically extending leg 292B, and a bridge 294B connecting first and second vertically extending legs 290B, 292B. In some embodiments, first vertically extending leg 290B, second vertically extending leg 292B, and bridge 294B may be constructed from a piece of plate material. An upper side of bridge 294B may include a first carrier surface 296B. Carrier surface 296B may include a first ramp 298B that slopes upward as it extends away from first vertically extending leg 290B toward second vertically extending leg 292B. Carrier surface 296B may also include a second ramp 300B that slopes upward as it extends away from the second vertically extending leg 292B toward the first vertically extending leg 290B. In some embodiments, carrier surface 296B may include a crown 302B disposed between ramps 298B, 300B.

As best shown in FIG. 13C, carrier skid 44 may include a laterally inner side surface 304A and a laterally outer side surface 306A. Carrier skid 46 may include a laterally inner side surface 304B and a laterally outer side surface 306B. Laterally inner side surface 304A may extend substantially parallel to laterally outer side surface 306A. In some embodiments, laterally inner side surface 304A and laterally outer side surface 306A may be substantially planar. In some embodiments, laterally inner and outer side surfaces 304B, 306B of carrier skid 46 may also be substantially planar and parallel to one another. Additionally, side surfaces 304A, 306A of carrier skid 44 may be substantially parallel to side surfaces 304B, 306B of carrier skid 46.

Carrier skids 44, 46 may be mounted to an inclined surface 308 of track roller frame 22 with the vertically extending legs 290A, 292A, 290B, 292B extending upward. Carrier skids 44, 46 may be secured to surface 308 by various means, including, but not limited to, welds and/or fasteners. Inclined surface 308 may slope in a lateral direction. Carrier skids 44, 46 may be laterally spaced from one another. Carrier skid 44 may extend upward from a point 310A on inclined surface 308. Carrier skid 46 may extend vertically upward from a point 310B on inclined surface 308. Points 310A, 310B may be laterally spaced from one another. Accordingly, the height of surface 308 at point 310A may differ from the height of surface 308 at point 310B. Specifically, the height of surface 308 at point 310A may be lower than the height of surface 308 at point 310B. Carrier skid 44 may be taller than carrier skid 46. In other words, the vertical distance between the portion of carrier skid 44 engaged to inclined surface 308 and the top of carrier surface 296A may be greater than the vertical distance between the portion of carrier skid 46 engaged to inclined surface 308 and the top of carrier surface 296B. In some embodiments, carrier skid 44 may be taller than carrier skid 46 by an amount substantially equal to the difference between the height of surface 308 at points 310A and 310B of inclined surface 308. This may place carrier surfaces 296A, 296B at substantially the same height.

As best shown in FIG. 13C, carrier skids 44, 46 may extend vertically upward into spaces between the laterally spaced pairs of inner and outer links 50, 52 of link assembly 48. Carrier surfaces 296A, 296B may engage the undersides of bushings 68 of link assembly 48. Carrier surfaces 296A, 296B may be laterally spaced from one another, such that carrier surfaces 296A, 296B engage different lateral portions of bushings 68. This may help reduce wear on bushings 68 by ensuring that a given lateral portion of each bushing 68 slides along only one of carrier skids 44, 46 during each revolution of track 24. Laterally inner side surfaces 304A, 304B of carrier skids 44, 46 may face toward one another, and laterally outer side surfaces 306A, 306B of carrier skids 44, 46 may face away from one another. In some embodiments, laterally outer side surfaces 306A, 306B may be disposed adjacent inner side surfaces 90 of inner and outer links 50, 52. This may help guide link assembly 48 in lateral directions.

The components of undercarriage system 14 may be constructed of various materials. In some embodiments, rollers 30-36, inner links 50, outer links 52, shoes 56, shoes 58, bushings 68, pins 70, hub 192 of idler 28, and body 194 of idler 28 may be constructed of metal. For example, each of these components may be constructed of a ferrous metal, such as steel or iron.

The configuration of undercarriage system 14 is not limited to the configurations discussed above and shown in the drawings. For example, different approaches may be used to secure various of the components to one another. In lieu of having a press fit to hold outer links 52 and/or links 242A, 242B to pins 70, other approaches may be used, including, but not limited to, welding each pin 70 to outer links 52. Similarly, instead of having shoes 56, 58 secured to inner and outer links 50, 52 with bolts 150, shoes 56, 58 may be secured to inner and outer links 50, 52 by other means, including, but not limited to welding and/or riveting. In embodiments where shoes 56, 58 are welded to inner and outer links 50, 52, shoes 56, 58 may omit mounting holes 146, 148. Likewise, means other than those discussed above and shown in the drawings may be used to secure various of the other components of undercarriage system 14 to one another. Additionally, the various components of undercarriage system 14 may have different shapes and/or sizes than those discussed above and shown in the drawings. Furthermore, undercarriage system 14 may have different numbers of its various components than shown in the drawings. For example, undercarriage system 14 may include different numbers of rollers 30-36, links 50, 52, and/or shoes 56, 58 than shown in the drawings.

Additionally, undercarriage system 14 may use known configurations of certain components in combination with components of the configuration shown in the drawings. For example, undercarriage system 14 may use a known configuration of an idler with the configuration of link assembly 48 and rollers 30-36 shown in the drawings. In some such configurations, the idler used may have tread surfaces that ride on links 50, 52, rather than bushings 68. Similarly, undercarriage system 14 may use a known configuration of a link assembly with one of the idlers 28, 210 shown in the drawings. The disclosed components and known configurations of components may be used in any suitable combination within undercarriage system 14.

INDUSTRIAL APPLICABILITY

The disclosed embodiments may have use in any application where it may be beneficial to provide a mobile machine with a tracked undercarriage. The configurations of the disclosed embodiments may provide a number of benefits. Among the advantages of the disclosed embodiments, the configurations of many of the components lend themselves to cost-effective manufacturing methods. Additionally, the disclosed embodiments may have greater strength and better performance than known configurations. Thus, the disclosed embodiments may provide for a lower cost, higher performance undercarriage.

The configurations of inner and outer links 50, 52 may lend themselves to low cost manufacturing. An inner link 50 or an outer link 52 with parallel, substantially planar sides may be manufactured from a plate of material having a thickness substantially the same as the desired width 140 of the inner link 50 or outer link 52. Various methods may be employed to make from such plate material a blank having a perimeter approximating or matching the desired perimeter 94 of the finished inner link 50 or outer link 52. For example, laser cutting could be used to separate the blank from the plate material by cutting the plate material along a path approximating or matching the desired perimeter of the finished links 50, 52. The processes used to separate the blank from the plate material could also be used to rough in or finish other features. For example, in connection with a process of laser cutting a blank from the plate material, openings corresponding to through bores 72 (for inner link 50) or openings 76 (for outer link 52) could be laser-cut into the blank. Alternatively, the entire process of forming through bores 72 or openings 76 may be performed after completion of the blank.

In some instances, various finishing processes may be performed on the blank to produce a finished inner link 50 or outer link 52. For example, machining operations may be performed to refine the perimeter 94, to refine the through bores 72 or features of the openings 76 (e.g., pin bores 78 and counterbores 80), and/or to create other features, such as mounting holes 100, 102. Additionally, various other finishing processes, including, but not limited to, heat treating and painting, may be performed to produce the final inner link 50 or outer link 52. Thus, the disclosed configurations of inner links 50 and outer links 52 may reduce or eliminate the need for expensive manufacturing processes like forging.

Similar processes may be used to manufacture the embodiment of links 242A, 242B shown in FIGS. 12A-12K. In some embodiments, the process of making one of links 242A, 242B may begin by cutting a link blank from plate material, such as by cutting the plate material along a path matching or approximating the perimeter 282A, 282B of the link 242A, 242B. This may be done, for example, by laser cutting. Openings 260A, 260B, 262A, 262B, windows 268A, 268B, 270A, 270B, mounting holes 272A, 274A, 272B, 274B, and nut seats 276A, 278A, 276B, 278B may be formed using various processes, including, but not limited to laser cutting and/or machining operations. The offset in each link 242A, 242B may be created at any point in the process by bending the workpiece. As with links 50, 52, various finishing processes may be performed to create the finished links 242A, 242B. These finishing operations may include, but are not limited to, machining, heat treating, and painting.

The disclosed configurations of rollers 30-36 may similarly reduce or eliminate the need for certain expensive manufacturing processes. In some embodiments, each roller 30-36 may be manufactured from round bar stock with a diameter that approximates or matches the largest diameter part or parts (e.g. outer guide flanges 158, 160) of the finished roller 30-36. From this bar stock, a roller blank may be generated by cutting off a piece of the bar stock with a length approximating or equaling the overall width of the finished roller 30-36. In some embodiments, the roller blank may then be transformed into a finished roller 30-36 by machining the various features of the roller 30-36. For example, the central passage 152 may be machined through the center of the blank. To form the outer features, such as roller treads 154, 156 and center guide flange 166 or center groove 176, machining operations may be performed to remove material from the outer surface of the roller blank. For instance, these features may be machined into the roller 30-36 by turning the roller blank in a lathe. Subsequently, various other finishing operations may be performed on the roller 30-36, including, but not limited to heat treating and painting operations. Thus, the need for certain expensive manufacturing processes like forging and/or welding may be reduced or eliminated. Manufacturing each roller 30-36 from a single, unitary piece of parent material may also give the roller good strength and durability by avoiding joints that may be subject to fatigue failures.

The configuration of idler 28 may also lend itself to cost-effective manufacturing processes and may give idler 28 good strength and durability. For example, construction of hub 192 from a single, unitary piece of parent material may contribute to achieving these benefits. Similar to rollers 30-36, hub 192 may be manufactured from round bar stock with a diameter that approximates or matches the largest diameter part or parts (e.g. mounting face 202) of the finished hub 192. From this bar stock, a hub blank may be generated by cutting off a piece of the bar stock with a length approximating or equaling the overall width of the finished hub 192. In some embodiments, various features of the hub 192 may be machined. For example, material may be removed from radially outer portions of the blank to form rib 206. As with producing the other components, producing hub 192 may also involve various finishing processes, including, but not limited to, machining, heat treating, and painting.

Additionally, in embodiments where body 194 of idler 28 includes a solid disk with substantially flat, planar sides, the solid disk may be readily formed from plate metal. To form the flat disk from plate metal, various technologies may be employed to separate from the plate metal a disk that approximates or matches the desired final shape of the disk. In some embodiments, laser cutting may be used to form a disk blank by cutting one circle in the plate for the center opening of the disk and cutting a larger circle in the plate to simultaneously form an outer perimeter of the disk and separate the disk blank from the rest of the plate. Subsequently, various finishing processes may be performed on the blank to form a finished disk. For example, in some embodiments where the disk will be welded to hub 192 of idler 194, machining operations may be used to refine and/or shape mounting face 204 of the disk. Similarly, various processes may be used to refine the shape of other parts of the disk, such as the mounting face 202. Additionally, other finishing processes may be performed on the disk, including, but not limited to heat treating and painting. Thus, the disclosed configurations of idler 28 may also reduce or eliminate the need for expensive manufacturing processes like forging and welding.

Idler 210 may also lend itself to cost-effective manufacturing methods. Disks 216 of idler 210 may be readily formed from plate material. For example, a blank for each disk 216 may be formed by cutting one circle in the plate for the center opening of the disk 216 and cutting a larger concentric circle to separate the disk from the plate. Subsequently, various finishing operations like those discussed above may be executed to form a finished disk 216. The openings 236 in each disk 216 may be formed using cutting and/or machining processes. Similarly, the reinforcing spacers 228 of idler 210 may be formed using cutting and/or machining processes. In the case of the embodiment shown in FIGS. 11A-11E, for example, making each reinforcing spacer 228 may involve making spacer blanks by cutting a length of bar stock having a cross-section matching or approximating the desired final cross-section of the center section 230 of the reinforcing spacer 228. Machining processes may be used to give end sections 232 smaller cross-sections than center section 230. Cutting processes may be performed by laser cutting or by other cutting methods.

Like many of the other components of undercarriage system 14, carrier skids 44, 46 may be manufactured from plate material. A blank may be formed by cutting the plate material along a path matching or approximating the outer perimeter of the vertically extending legs 290, 292 and the bridge 294. As with the other components, various finishing operations may be performed to produce the finished carrier skids 44, 46. These finishing operations may include, but are not limited to, machining, heat treating, and painting.

The use of carrier skids 44, 46 in lieu of carrier rollers may also help reduce the cost of undercarriage system 14. Carrier skids 44, 46 may be significantly less expensive to produce than carrier rollers. Additionally, using carrier skids 44, 46 instead of carrier rollers may eliminate the need to include bearings and/or other expensive components for rotationally supporting carrier rollers.

Methods of manufacturing the disclosed embodiments are not limited to those discussed above. While the disclosed embodiments may reduce the need for forging and welding operations, these processes may be used to make the disclosed parts. Additionally, processes other than those explicitly discussed may be used in the manufacture of the disclosed components.

It will be apparent to those skilled in the art that various modifications and variations can be made in the disclosed systems without departing from the scope of the disclosure. Other embodiments of the disclosed systems will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. A roller for a machine undercarriage, comprising:
   a roller body constructed from a single, unitary piece of parent material, the roller body including
     a first roller tread disposed between a first end of the roller body and a second end of the roller body,
     a second roller tread disposed between the first and second ends of the roller body, and having a diameter that is the same as a diameter of the first roller tread
     at least one center guide flange disposed between the first roller tread and the second roller tread, and extending outward further than the roller treads along a radius of the roller, and
     an outer guide flange on a side of the first roller tread opposite the at least one center guide flange, and extending outward further than the roller treads and the at least one center guide flange.

2. The roller of claim 1, wherein the at least one center guide flange has a height, as measured from the roller treads, of at least about 10% of a width of the first roller tread.

3. The roller of claim 2, wherein:
   the at least one center guide flange has a height, as measured from the roller treads, of at least about ½ of a height of the outer guide flange.

4. The roller of claim 1, wherein:
   the at least one center guide flange has a height, as measured from the roller treads, of at least about ½ of a height of the outer guide flange.

5. The roller of claim 1, wherein the roller body further comprises a single center guide flange between the first roller tread and the second roller tread.

6. A roller for a machine undercarriage, comprising:
   a first outer guide flange;
   a second outer guide flange;
   a first roller tread disposed between the first outer guide flange and the second outer guide flange;
   a second roller tread disposed between the first outer guide flange and the second outer guide flange, and having a diameter that is the same as a diameter of the first roller tread; and
   a single center guide flange disposed between the first roller tread and the second roller tread, and extending outward further than the roller treads along a radius of the roller.

7. The roller of claim 6, wherein the single center guide flange has a height, as measured from the roller treads, of at least about 10% of a width of the first roller tread.

8. The roller of claim 7, wherein the single center guide flange has a height, as measured from the roller treads, of at least about ½ of a height of the first outer guide flange.

9. The roller of claim 8, wherein the single center guide flange extends from the first roller tread to the second roller tread.

10. The roller of claim 7, wherein the single center guide flange extends from the first roller tread to the second roller tread.

11. The roller of claim 6, wherein the single center guide flange has a height, as measured from the roller treads, of at least about 15% of a width of the first roller tread.

12. The roller of claim 11, wherein the single center guide flange has a height, as measured from the roller treads, of at least about ½ of a height of the first outer guide flange.

13. The roller of claim 6, wherein the single center guide flange has a height, as measured from the roller treads, of at least about ½ of a height of the first outer guide flange.

14. The roller of claim 6, wherein the single center guide flange extends from the first roller tread to the second roller tread.

15. The roller of claim 6, wherein the single center guide flange includes a substantially cylindrical outer surface.

16. A roller for a machine undercarriage, comprising:
   a roller body constructed from a single, unitary piece of parent material, the roller body including
     a first outer guide flange,
     a second outer guide flange,
     a first roller tread disposed between the first outer guide flange and the second outer guide flange,
     a second roller tread disposed between the first outer guide flange and the second outer guide flange, and having a diameter that is the same as a diameter of the first roller tread, and
     a single center guide flange disposed between the first roller tread and the second roller tread; and
   wherein the single center guide flange has a height, as measured from the roller treads, of at least about 10% of a width of the first roller tread.

17. The roller of claim 16, wherein the single center guide flange extends from the first roller tread to the second roller tread.

18. The roller of claim 16, wherein the single center guide flange has a height, as measured from the roller treads, of at least about ½ of a height of the first outer guide flange.

* * * * *